US007493183B2

(12) United States Patent
Bjornson et al.

(10) Patent No.: US 7,493,183 B2
(45) Date of Patent: Feb. 17, 2009

(54) APPARATUS AND METHOD FOR SELECTING A MECHANICAL SEAL

(75) Inventors: Carl C. Bjornson, Tiverton, RI (US); David G. Greenlie, Malden, MA (US)

(73) Assignee: Northeast Equipment, Inc., Fall River, MA (US)

( * ) Notice: Subject to any disclaimer, the term of this patent is extended or adjusted under 35 U.S.C. 154(b) by 0 days.

(21) Appl. No.: 11/709,600

(22) Filed: Feb. 22, 2007

(65) Prior Publication Data

US 2007/0173963 A1 Jul. 26, 2007

Related U.S. Application Data

(60) Division of application No. 11/011,916, filed on Dec. 14, 2004, now Pat. No. 7,191,026, which is a continuation of application No. 10/700,781, filed on Nov. 4, 2003, now Pat. No. 6,832,123, which is a division of application No. 09/687,393, filed on Oct. 13, 2000, now Pat. No. 6,662,062, which is a continuation of application No. 09/179,506, filed on Oct. 27, 1998, now Pat. No. 6,173,210, which is a continuation of application No. 09/033,194, filed on Mar. 2, 1998, now abandoned.

(51) Int. Cl.
*G06F 19/00* (2006.01)

(52) U.S. Cl. ............................................ 700/99; 700/3

(58) Field of Classification Search .................. 700/97, 700/96, 100, 67, 18, 180, 200, 210; 264/297.2, 264/297.3; 425/570

See application file for complete search history.

(56) References Cited

U.S. PATENT DOCUMENTS 4,739,488 A 4/1988 Asakura (Continued)

FOREIGN PATENT DOCUMENTS

EP 0801355 A2 * 10/1997
WO WO 96/36921 11/1996

OTHER PUBLICATIONS

PCT/US98/09692 (WO 98/52144), Web-enable system and method for designing and manufacturing laser scannes, Harry et al., Nov. 19, 1998.*

(Continued)

*Primary Examiner*—Kidest Bahta
(74) *Attorney, Agent, or Firm*—Kenneth P Robinson

(57) ABSTRACT

An automated seal selection, seal design, manufacturing, and post sales system allow a distributor or untrained user to select a replacement seal for a pump. The automated system designs and engineers the seal, whether standard or special, and creates all drawings, documentation, quotations, and other output forms. The automated system initiates selection from inventory or purchasing of materials to be used in the manufacturing operations, creates all manufacturing CNC programs for the components to be manufactured and downloads to CNC from manufacturing equipment. The system allows selection of a seal based upon a seal part number, or selection of a seal based upon the pump into which the seal will be installed and the operating conditions of the pump. The pump may be defined by searching through a database of existing pumps, or may be defined as a new pump if it is not in the pump database.

20 Claims, 61 Drawing Sheets

U.S. PATENT DOCUMENTS

| | | | | | |
|---|---|---|---|---|---|
| 4,896,101 | A | * | 1/1990 | Cobb | 324/73.1 |
| 5,089,970 | A | | 2/1992 | Lee et al. | |
| 5,297,054 | A | | 3/1994 | Kienzle et al. | |
| 5,319,541 | A | | 6/1994 | Blanchard et al. | |
| 5,367,622 | A | * | 11/1994 | Coggins | 345/853 |
| 5,552,995 | A | * | 9/1996 | Sebastian | 700/97 |
| 5,577,364 | A | | 11/1996 | Wang et al. | |
| 5,593,839 | A | | 1/1997 | Hubbell et al. | |
| 5,673,533 | A | | 10/1997 | Wang et al. | |
| 5,717,595 | A | | 2/1998 | Cherrington et al. | |
| 5,721,903 | A | | 2/1998 | Anand et al. | |
| 5,730,356 | A | | 3/1998 | Mongan | |
| 5,745,390 | A | | 4/1998 | Daneshgari | |
| 5,754,450 | A | * | 5/1998 | Solomon et al. | 702/35 |
| 5,754,738 | A | * | 5/1998 | Saucedo et al. | 706/11 |
| 5,757,664 | A | * | 5/1998 | Rogers et al. | 700/232 |
| 5,774,372 | A | * | 6/1998 | Berwanger | 700/301 |
| 5,836,136 | A | | 11/1998 | Highberger | |
| 5,923,552 | A | | 7/1999 | Brown et al. | |
| 5,940,290 | A | | 8/1999 | Dixon | |
| 5,968,110 | A | | 10/1999 | Westrope et al. | |
| 5,970,471 | A | * | 10/1999 | Hill | 705/26 |
| 6,023,683 | A | * | 2/2000 | Johnson et al. | 705/26 |
| 6,219,005 | B1 | * | 4/2001 | Szafranek | 343/872 |

OTHER PUBLICATIONS

Aesseal—Technical & Seal Management Database Updates, Web Site Print -out of Database Updates, http://www.aesseal.co.uk/dataupdt.htm (printed Aug. 25, 1999), 2 pages.

Parker Filtration Advertisement entitled "Get Accurate Filtration Facts, Figures and Formulas *Instantly*, with Parker's new inPHorm software," 1 page, date unknown.

Author Unknown, "Database Matches Chemicals to Mechanical Seals," Business Financial, date unknown, 2 pages.

PS Plus Seal Dimension Drawing Numbers and Sleeve Diameter chart, from ITT Industries, Jun. 1997, 1 page.

Goulds Pumps, Inc., Industrial Products Group Engineered Products Div., Packed Box Envelope Dimensions, 1 page, Revision Jan. 20, 1992.

Fluid Sealing Association, "Mechanical Seal Material Selection Guide," Mechanical Seal Handbook, 1990.

Shaft Sealing System For Centrifugal And Rotary Pumps, API Standard 682, First Edition, Oct. 1994.

Shaft Sealing System For Centrifugal And Rotary Pumps, API Standard 610, Seventh Edition, Oct. 1994.

Parker Seals, O-Ring Reference Guide, "Fluid Compatibility Tables," p. 15, date unknown.

"Chemical Resistance and Fluid Compatibility," Kairez parts ratings, Oct. 1993, p. 4 and Appendix A and B (2 pages).

Aflas Technical Information, 3M Corporation, Jan. 1988.

Viton Fluid Resistance Guide, DuPont, date unknown.

Titanium, Titanium Corrosion Rate Data, Titanium Development Assoc., Appendix 2, date unknown.

Corrosion Resistance of Hatelloy Alloys, Cabot Corporation, p. 6, date unknown.

Hastelloy Alloy C-276, Haynes International, p. 7, date unknown.

Hastelloy Alloy C-22, Haynes International, p. 8, date unknown.

Hastelloy Alloy B-3, Haynes International, p. 4, date unknown.

Hastelloy Alloy B-2, Haynes International, p. 6, date unknown.

* cited by examiner

Please Enter Customer Data Below

Billing and Mailing Information:     *110*

Code
Company                 Contact
Address 1               Phone
Address 2               Fax
City, State              E-mail
Zip Code                Discount   *112*
Country                  Ship Via:

Ship To Information:     *111*

Complete only if different than mailing address.

Company
Address 1
Address 2
City, State
Zip Code
Country 4.0

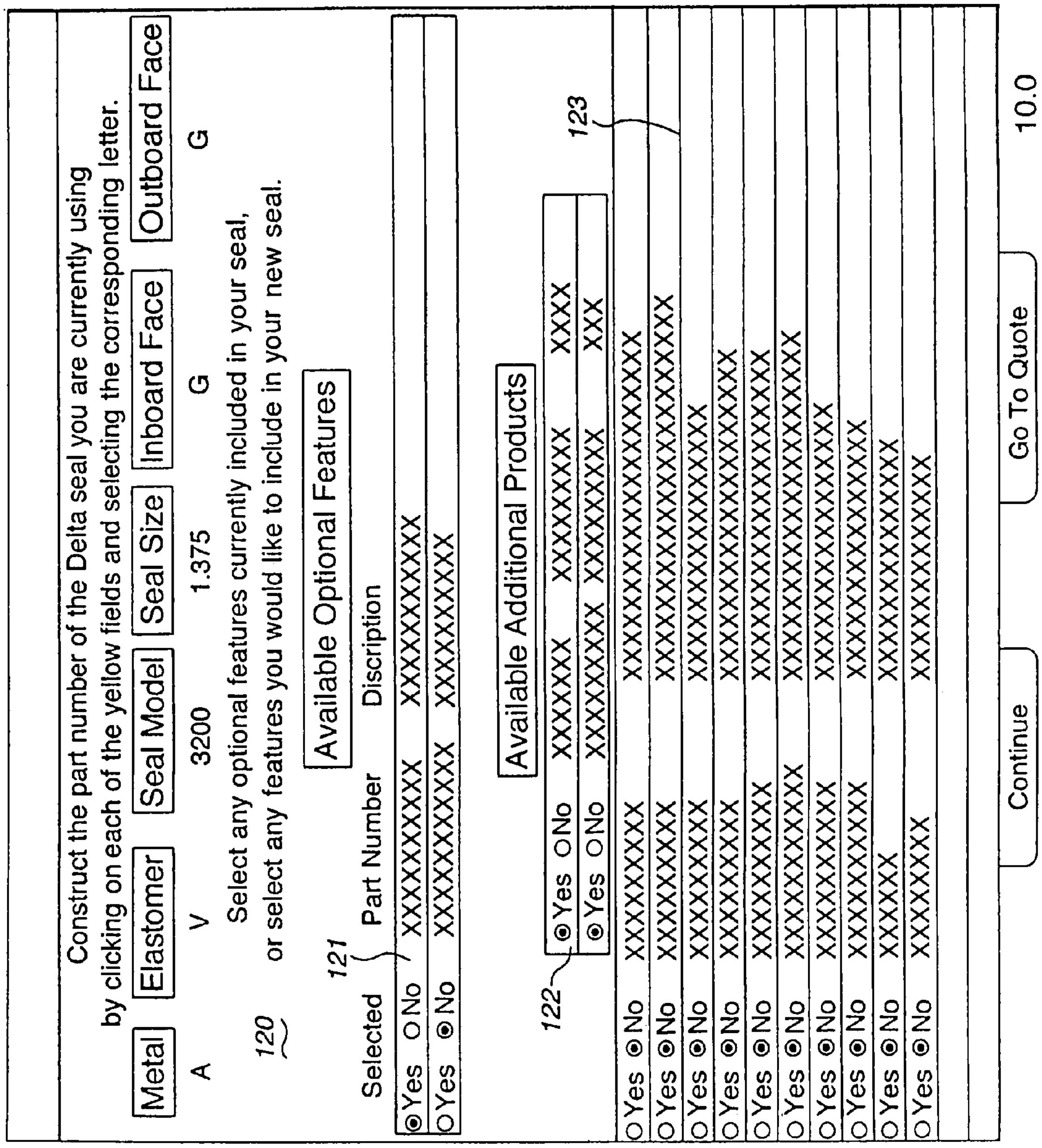

FIG. 6

Construct the part number of the Delta seal you are currently using by clicking on each of the yellow fields and selecting the corresponding letter.

| Metal | Elastomer | Seal Model | Seal Size | Inboard Face | Outboard Face |
|-------|-----------|------------|-----------|--------------|----------------|
| A     | V         | 3200       | 1.375     | G            | G              |

120

Select any optional features currently included in your seal, or select any features you would like to include in your new seal.

Available Optional Features

| Selected | Part Number | Discription |
|----------|-------------|-------------|
| ⦿Yes ○No | XXXXXXXXXX | XXXXXXXXX |
| ○Yes ⦿No | XXXXXXXXXX | XXXXXXXXX |

121

122

Available Additional Products

| | | | |
|---|---|---|---|
| ⦿Yes ○No | XXXXXXX | XXXXXXX XXXXXXXX | XXXX |
| ⦿Yes ○No | XXXXXXXX | XXXXXXX XXXXXXXX | XXX |
| ○Yes ⦿No | XXXXXXXX | XXXXXXXXXXXXXXXXXXXX | |
| ○Yes ⦿No | XXXXXXXX | XXXXXXXXXXXXXXXXX | |
| ○Yes ⦿No | XXXXXXXX | XXXXXXXXXXXXXXXXXXXXXX | |
| ○Yes ⦿No | XXXXXXXX | XXXXXXXXXXXXXXXXX | |
| ○Yes ⦿No | XXXXXXXX | XXXXXXXXXXXXXXX | |
| ○Yes ⦿No | XXXXXX | XXXXXXXXXXXXXX | |
| ○Yes ⦿No | XXXXXXX | XXXXXXXXXXXXXXXXX | |

123

[Continue]        [Go To Quote]

10.0

Quote #

Please select your pump from the following list or click Search Again to try again:

Manufacturer XXXXXX —140

Number of Matching Pumps found= X —141

| PumpID | Model | Frame or Group | Bore Type ⓘ | Packing or SealSleeve ⓘ | Pump Size Summary | |
|--------|-------|----------------|-------------|-------------------------|-------------------|---|
| 91 —142 | XXX | X | XXXXXX XXXX | XXXXXX XXXX XXXX | XXXXXXXXXXXX XXXXX | [Select a Pump] —143 |
| 92 —142 | XXX | XXXX | XXXXXX XXXX | XXXXXX XXXXXXX XXXXX | XXXXXXXXXXXX XXXX | ▭ —143 |
| 94 —142 | XXX | X | XXXXX XXXXXXXX XXX XXXXXXXXXX | XXXXXX XXXXXXX XXXXX | XXXXXXXXXXXX XXXX | ▭ —143 |

Please scroll down or up for more pumps.

[Search again] —144

12.0

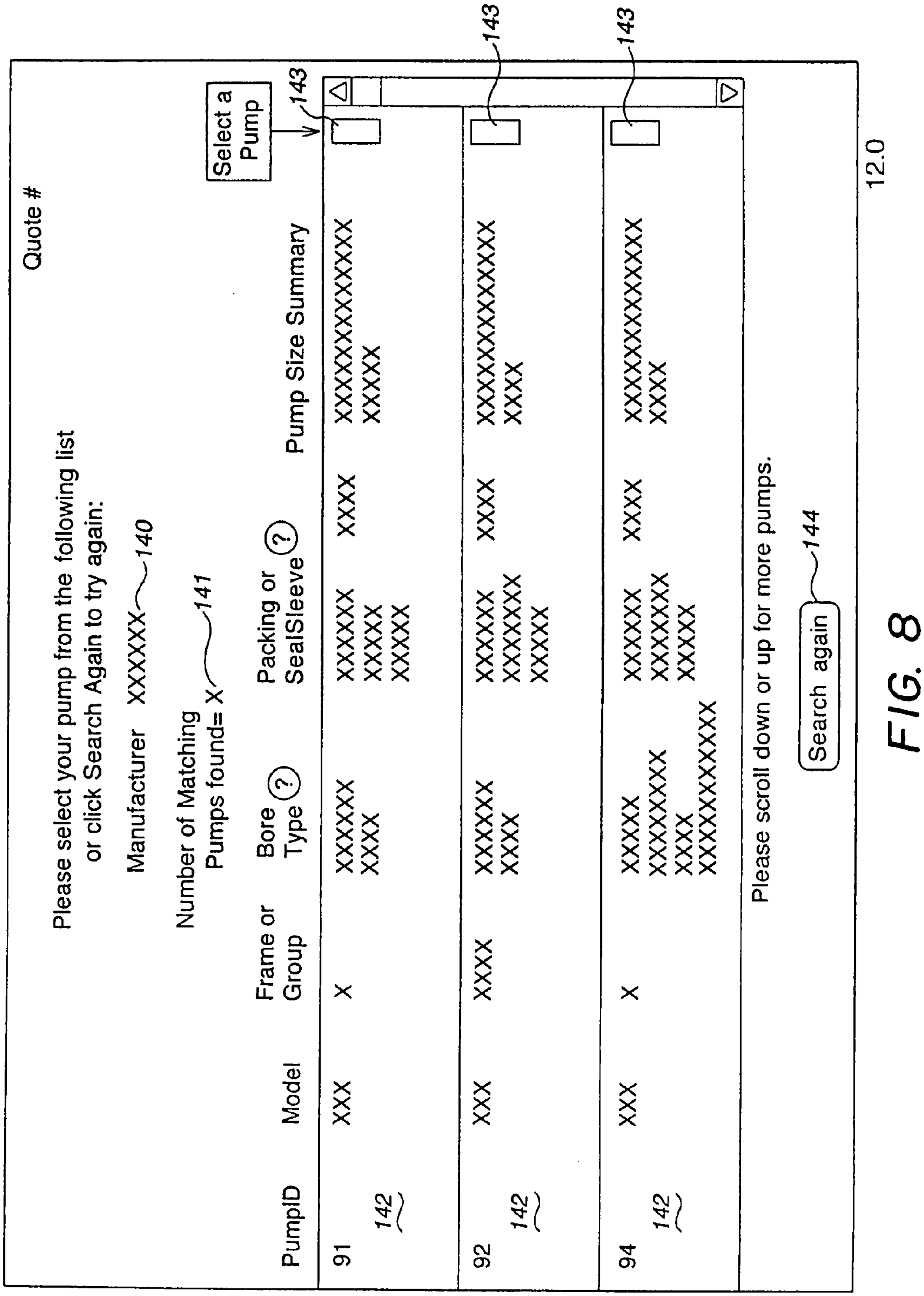

FIG. 8

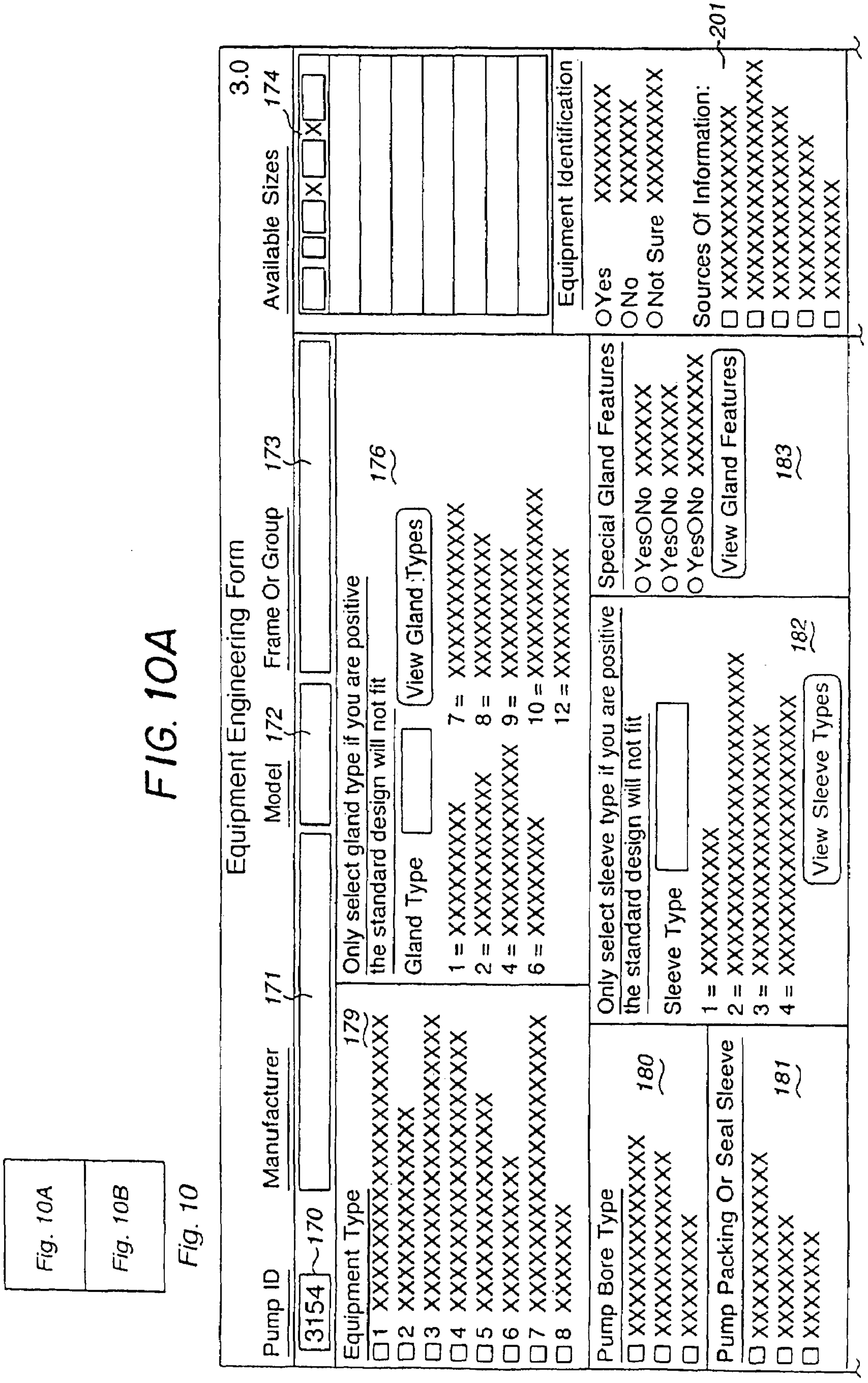

FIG. 10A

Equipment Engineering Form 3.0

Pump ID  3154 ~170   Manufacturer 171   Model 172   Frame Or Group 173   Available Sizes 174

Equipment Type  179
- 1 = XXXXXXXXXXXXXXX
- 2 = XXXXXXXXXXXXX
- 3 = XXXXXXXXXXXXX
- 4 = XXXXXXXXXXXXXXXXX
- 5 = XXXXXXXXX
- 6 = XXXXXXXX
- 7 = XXXXXXXXXXXXXXXXXXXXX
- 8 = XXXXXXX Only select gland type if you are positive the standard design will not fit
Gland Type  [View Gland Types] 176
- 1 = XXXXXXXX    7 = XXXXXXXXXXXX
- 2 = XXXXXXXXXXX  8 = XXXXXXXXX
- 3 = XXXXXXXXXX   9 = XXXXXXX
- 4 = XXXXXXXXXXXXX 10 = XXXXXXXXXXXX
- 5 = XXXXXXXXX    11 = XXXXXXXXXXXXXX
- 6 = XXXXXXXXX    12 = XXXXXXXX Special Gland Features
○ Yes ○ No XXXXXX
○ Yes ○ No XXXXXX
○ Yes ○ No XXXXXXXX
[View Gland Features] 183

Pump Bore Type 180
- ☐ XXXXXXXXXXXXX
- ☐ XXXXXXXXXXX
- ☐ XXXXXXX

Only select sleeve type if you are positive the standard design will not fit
Sleeve Type
- 1 = XXXXXXXXX
- 2 = XXXXXXXXXXXXXXXXXXXX
- 3 = XXXXXXXXXXXXXXXXX
- 4 = XXXXXXXXXXXXXXXXXX
[View Sleeve Types] 182

Equipment Identification ~201
○ Yes    XXXXXXXX
○ No     XXXXXXX
○ Not Sure XXXXXXXXXX Pump Packing Or Seal Sleeve 181
- ☐ XXXXXXXXXXX
- ☐ XXXXXXXXX
- ☐ XXXXXXXX Sources Of Information:
- ☐ XXXXXXXXXXXXXXXXX
- ☐ XXXXXXXXXXXXXXXXXXXX
- ☐ XXXXXXXXXXXXXXX
- ☐ XXXXXXXXX

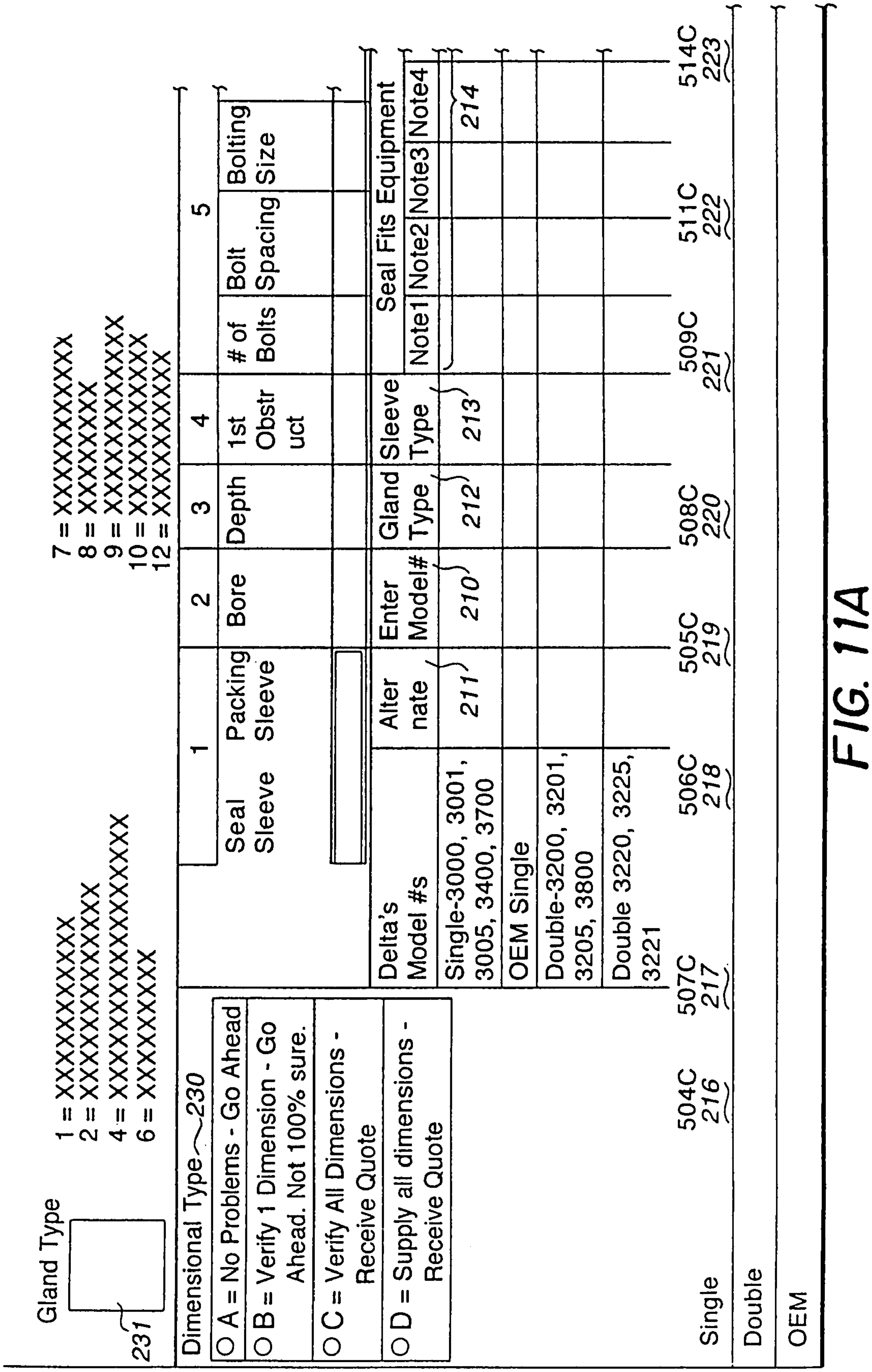

FIG. 11A

Gland Type  231

1 = XXXXXXXXXX
2 = XXXXXXXXXXXX
4 = XXXXXXXXXXXXXXXX
6 = XXXXXXXXX
7 = XXXXXXXXXXX
8 = XXXXXXXXX
9 = XXXXXXXXXXXX
10 = XXXXXXXXXXXX
12 = XXXXXXXXXXXX

Dimensional Type ~230
- ○ A = No Problems - Go Ahead
- ○ B = Verify 1 Dimension - Go Ahead. Not 100% sure.
- ○ C = Verify All Dimensions - Receive Quote
- ○ D = Supply all dimensions - Receive Quote

| | | 1 | 2 | 3 | 4 | | 5 | | |
|---|---|---|---|---|---|---|---|---|---|
| | | Packing Sleeve | Bore | Depth | 1st Obstruct | # of Bolts | Bolt Spacing | Bolting Size | |
| | | Seal Sleeve | Alternate 211 | Enter Model# 210 | Gland Type 212 | Sleeve Type 213 | | | Seal Fits Equipment |
| | Delta's Model #s | | | | | | Note1 | Note2 | Note3 | Note4 |
| Single | Single-3000, 3001, 3005, 3400, 3700 | 506C 218 | 505C 219 | 508C 220 | 509C 221 | 511C 222 | 514C 223 | | 214 |
| | OEM Single | 507C 217 | | | | | | | |
| Double | Double-3200, 3201, 3205, 3800 | | | | | | | | |
| | Double 3220, 3225, 3221 | | | | | | | | |
| OEM | | | | | | | | | |

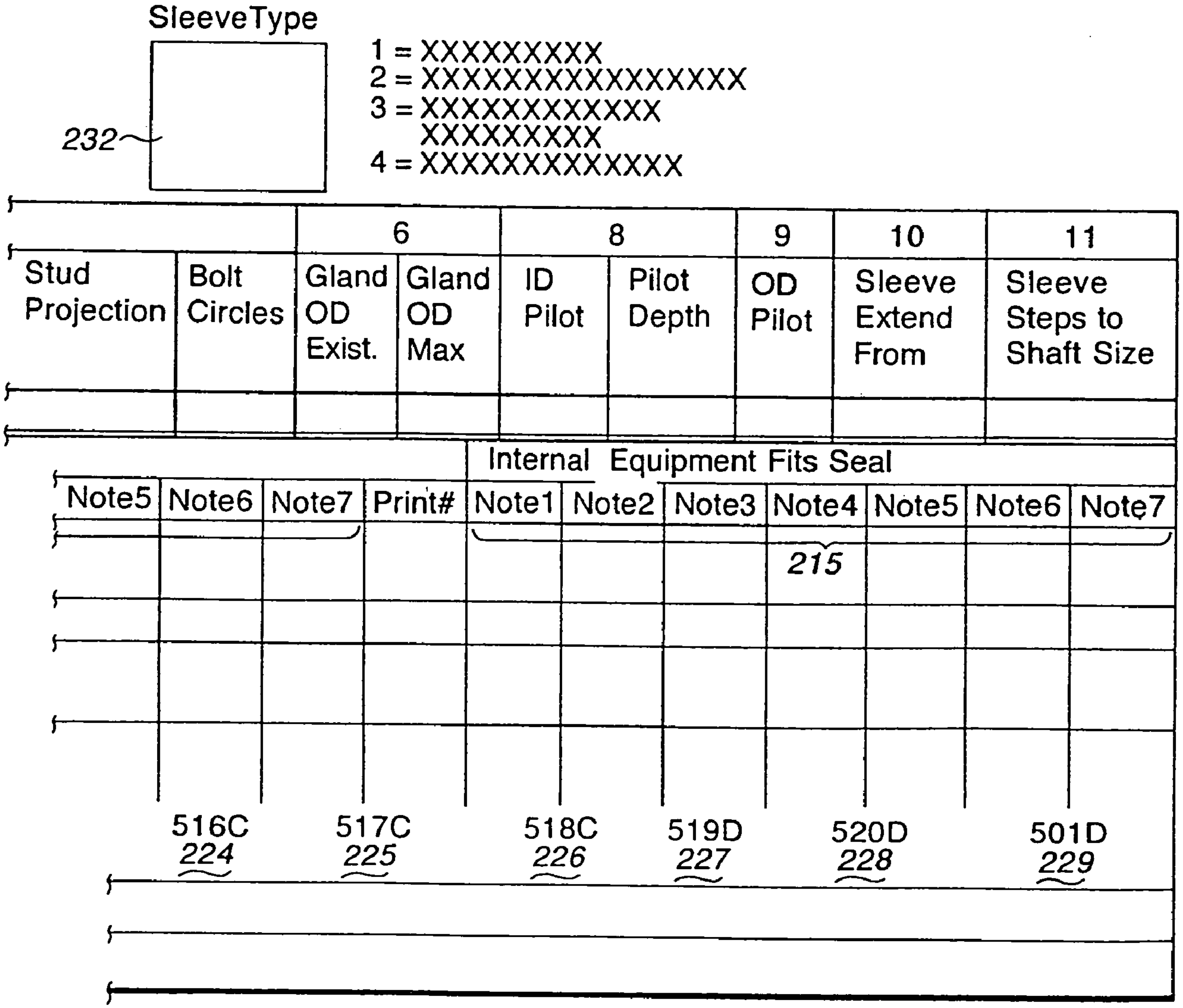
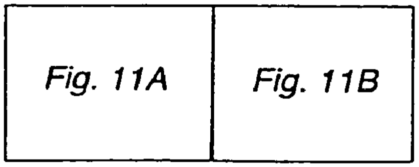
Fig. 11
FIG. 11B
| Fig. 11A | Fig. 11B |
|---|---|
SleeveType  
1 = XXXXXXXXXX  
2 = XXXXXXXXXXXXXXXXX  
3 = XXXXXXXXXXXXXX  
4 = XXXXXXXXXXXXXX  
232
| Stud Projection | Bolt Circles | Gland OD Exist. | Gland OD Max | ID Pilot | Pilot Depth | OD Pilot | Sleeve Extend From | Sleeve Steps to Shaft Size |
|---|---|---|---|---|---|---|---|---|
| | | 6 | | 8 | | 9 | 10 | 11 |
| | | | | Internal Equipment Fits Seal | | | | |
| Note5 | Note6 | Note7 | Print# | Note1 | Note2 | Note3 | Note4 | Note5 | Note6 | Note7 |
| 516C 224 | 517C 225 | | 518C 226 | 519D 227 | 520D 228 | 501D 229 |
| | | | | | 215 | | |

| Seal Model | DS Seal Size | D2 Min | L2 Inside Max Length | L1 Outside Length | 3/8 | 1/2 | 5/8 | 3/4 | Slot Width | D3 Gland OD | D4 Gland Flat | D1 Sleeve OD | L3 Gland Length |
|---|---|---|---|---|---|---|---|---|---|---|---|---|---|
| 250 | 251 | 252 | 253 | 254 | 255 | 256 | 257 | 258 | 259 | 260 | 261 | 262 | 263 |

| Actual Casting OD | Actual Slot ID | OD of Shroud on Casting | Actual Gasket OD | Counter Bore ID | Bar In Shroud | Inboard Balance Gland OD | Outboard Balance | Internal Diameter | Outboard Diameter Obstruction |
|---|---|---|---|---|---|---|---|---|---|
| 271 | 272 | 273 | 274 | 275 | 276 | 277 | 278 | 279 | |

| Bar Gland Length | Pos1 | Pos2 | Pos3 | Pos4 | Pos5 | Pos6 |
|---|---|---|---|---|---|---|
| 264 | 265 | 266 | 267 | 268 | 269 | 270 |

| Inboard Internal Obstruction | Internal Internal Obstruction | Depth Obstruction |
|---|---|---|
| 280 | | 281 |

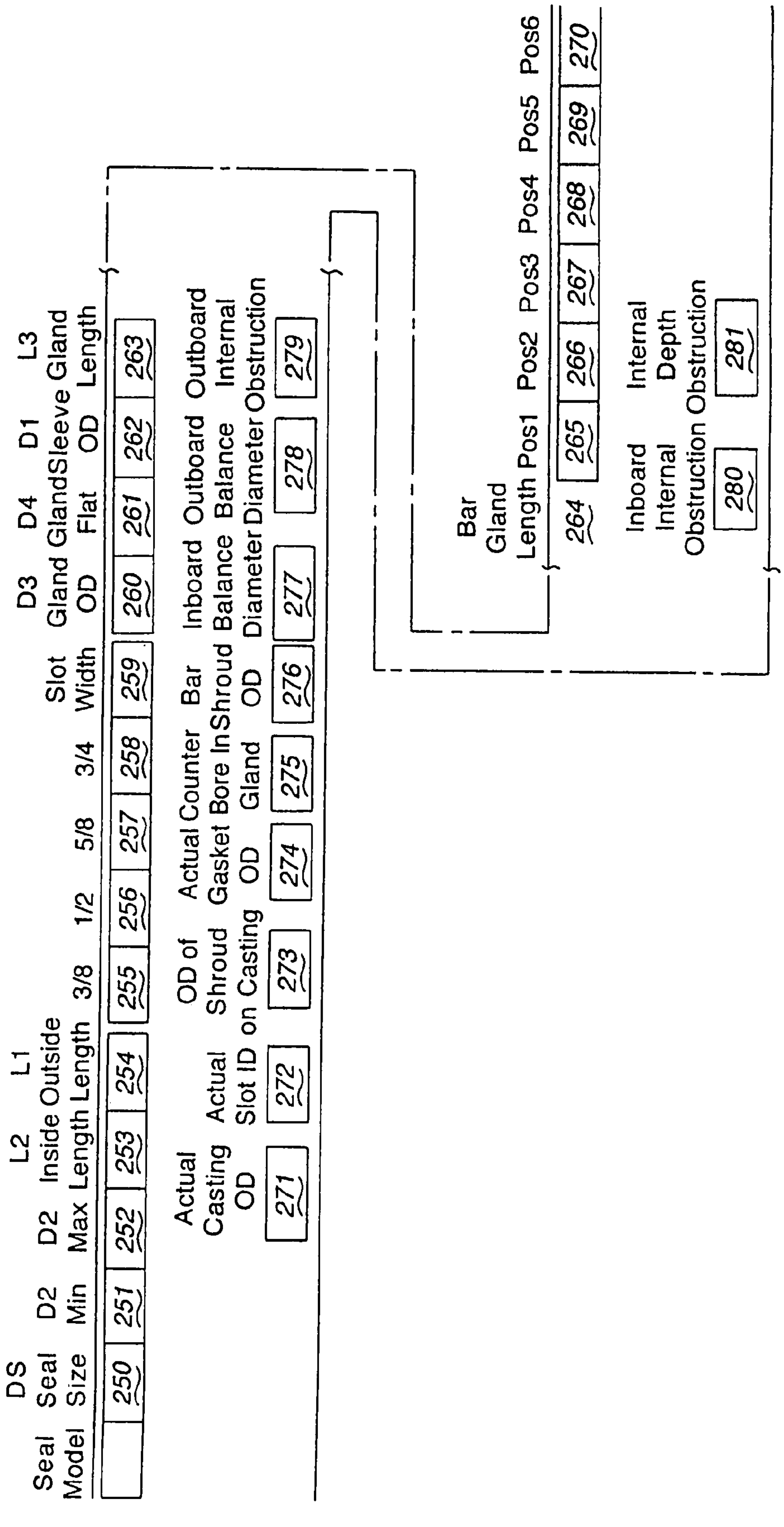

FIG. 12

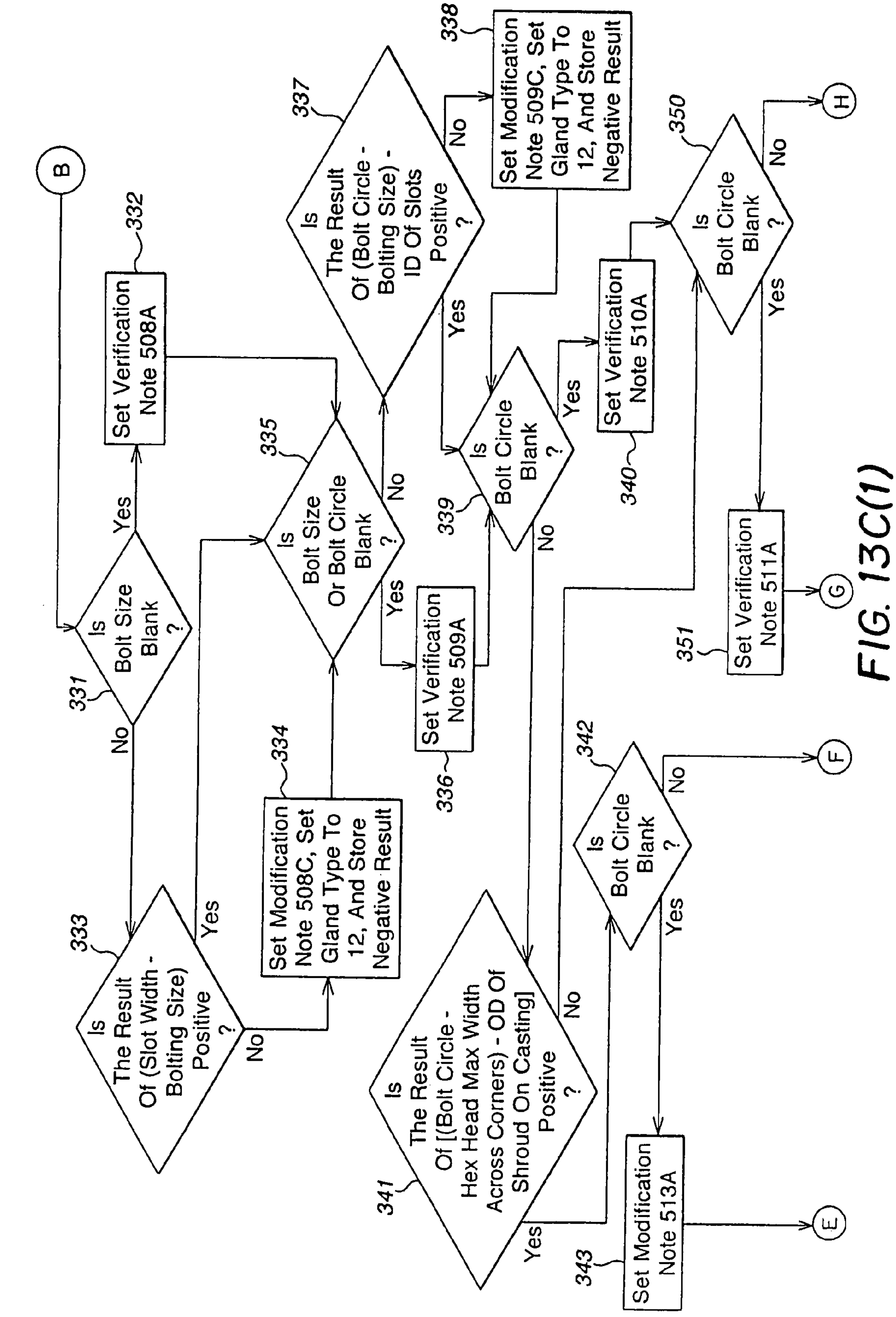
FIG. 13C(1)

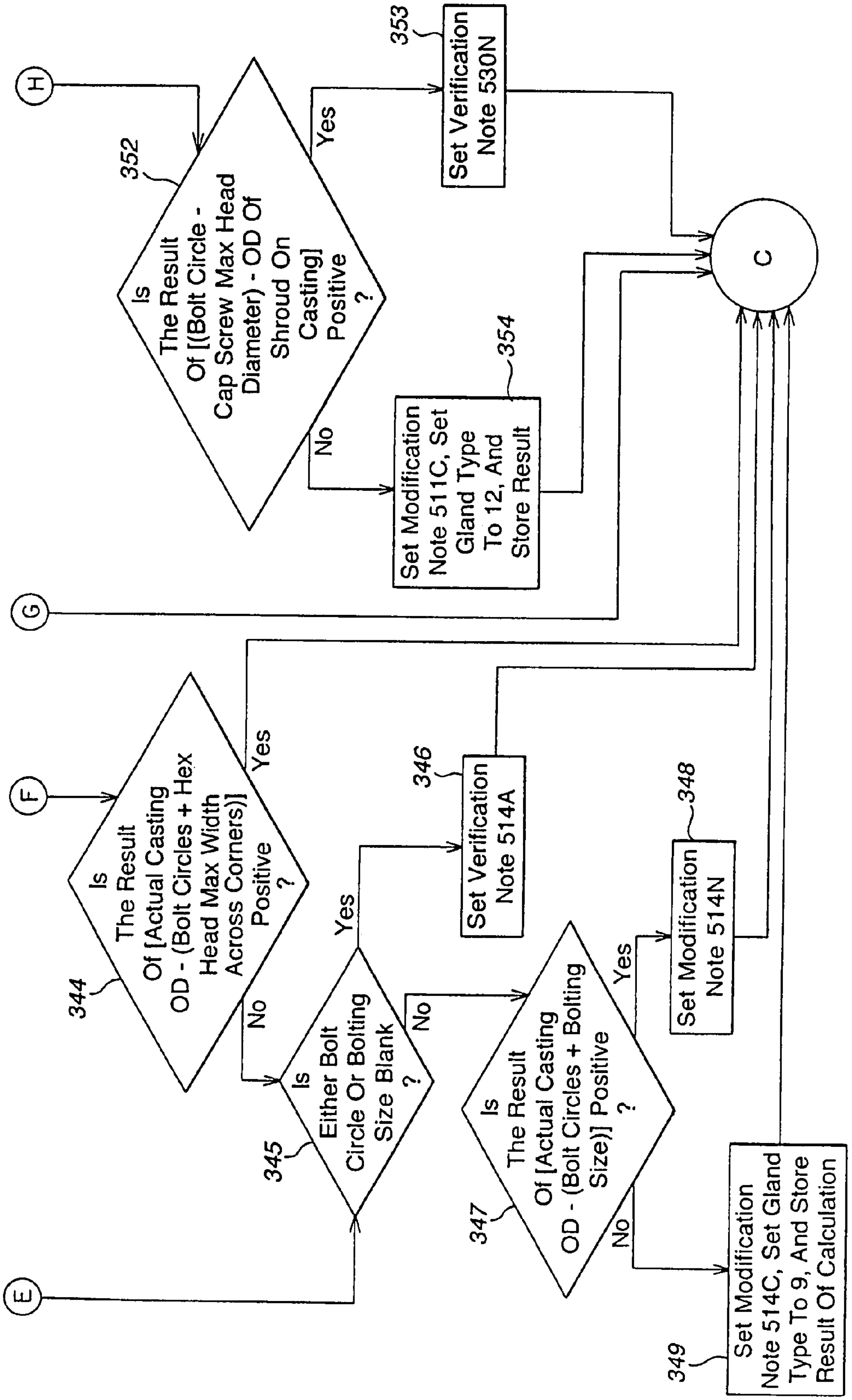
FIG. 13C(2)

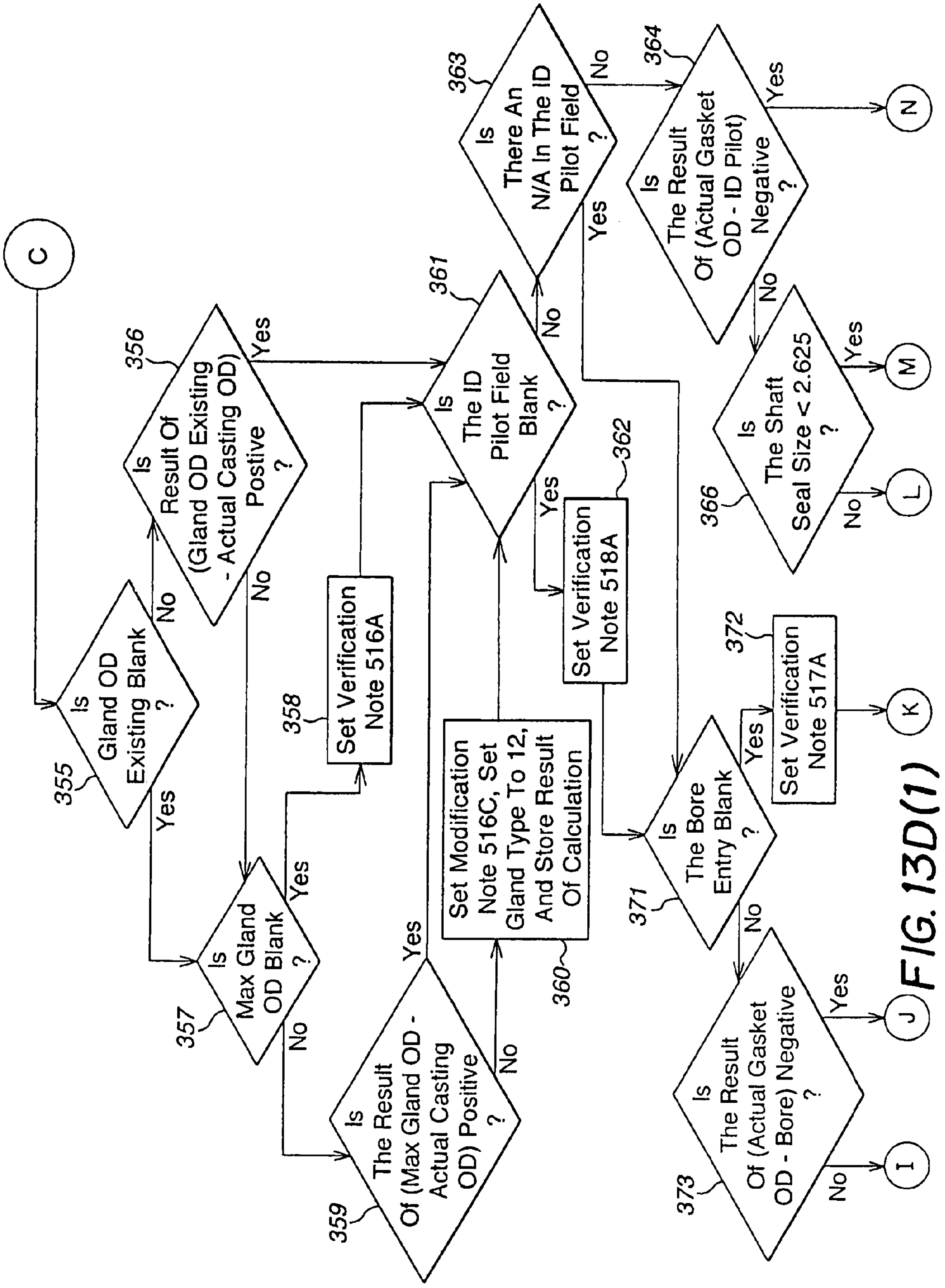
FIG. 13D(1)

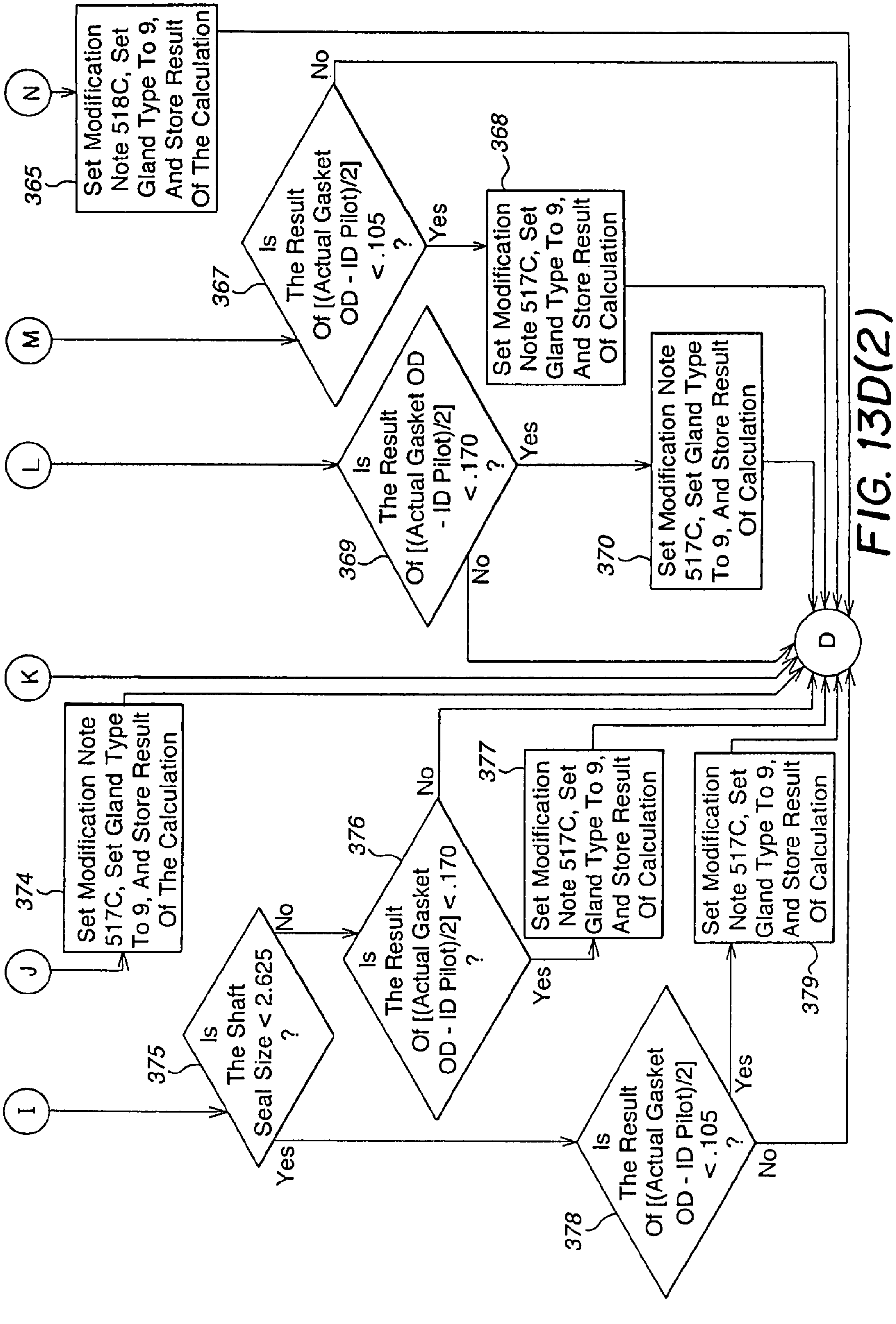
FIG. 13D(2)

Quote#

For a recommended Seal Selection Method from the list below please choose the Seal Model you are currently using: 420

Current Seal Model: AnchorModel 16/ Single Seal

The manufacturer suggests selecting option 3 from the menu below

421 — Competitive Analysis

422 — Internal Analysis

Material Code Key

To cross reference your current seal by the materials of construction, click the Cross Reference button.      437 — Cross Reference

Seal Selection Method:

System recommends a single or double cartridge seal for a given chemical and pump combination, selecting from single cartridge models 3000, 3001, 3005, 3400, and 3700, and double cartridge models 3220, 3221, and 3800, with seal sizes 1 inch to 5 inches.

Please change seal selection method or "continue":

○1 You pick the seal — 423
⊙2 System recommends a single or double cartridge seal — 424
○3 System recommends a single cartridge seal — 425
○4 System recommends a double cartridge seal — 426
○5 System recommends a double cartridge seal with pumping ring — 427    429
○6 System recommends an OEM single cartridge seal — 428
○7 System recommends a split seal — 431
○8 System recommends a single bellows cartridge seal — 432     View Product Brochure
○9 System recommends a double bellows cartridge seal — 433
○10 Various OEM "Component"; Rotaries, Stationaries, Glands — 434

Select Materials

430

13.0

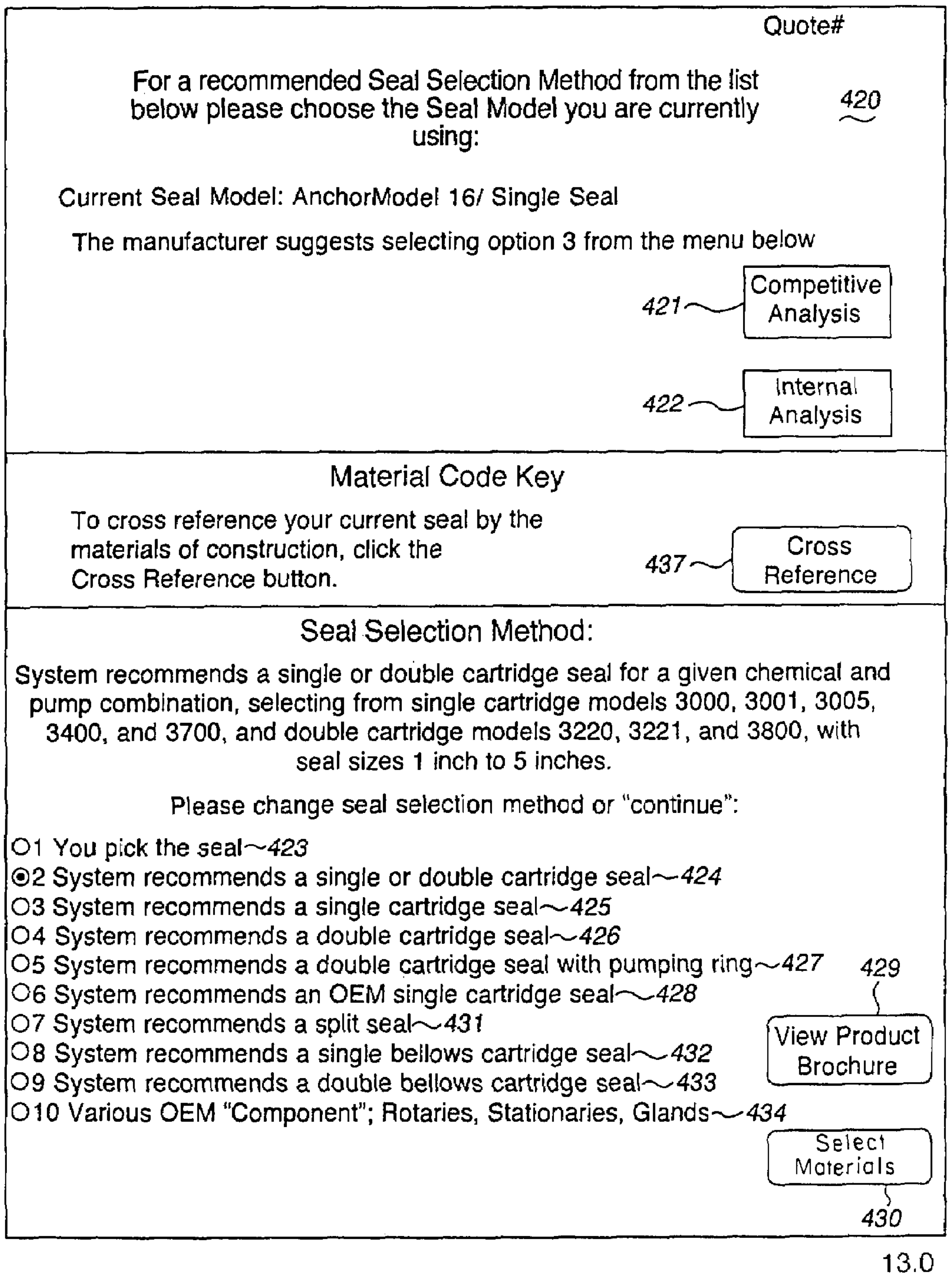

*FIG. 14*

| Process Fluid Information | | | | | | | |
|---|---|---|---|---|---|---|---|
| ETHANE (Methylmethane) 480 | | 483 | | 484 | 485 | | 486 |
| % Concen 481 | Temp 482 | SEC-1 | SEC-2 | SH&C | DEC-1 | DEC-2 | DH&C |
| ORingSeal sc2 | | 11 | Single-3000, 3001, 3005, 3400, 3700, sc3 | Alter nate | 53 | 97 | |
| | | 1:AV A | | | Single-3500, sc6 | | |
| 21AV AA | | | | | 1:AV A | | |
| 487 | | 488 | | 489 | 488 | | 489 |

Figure 21:
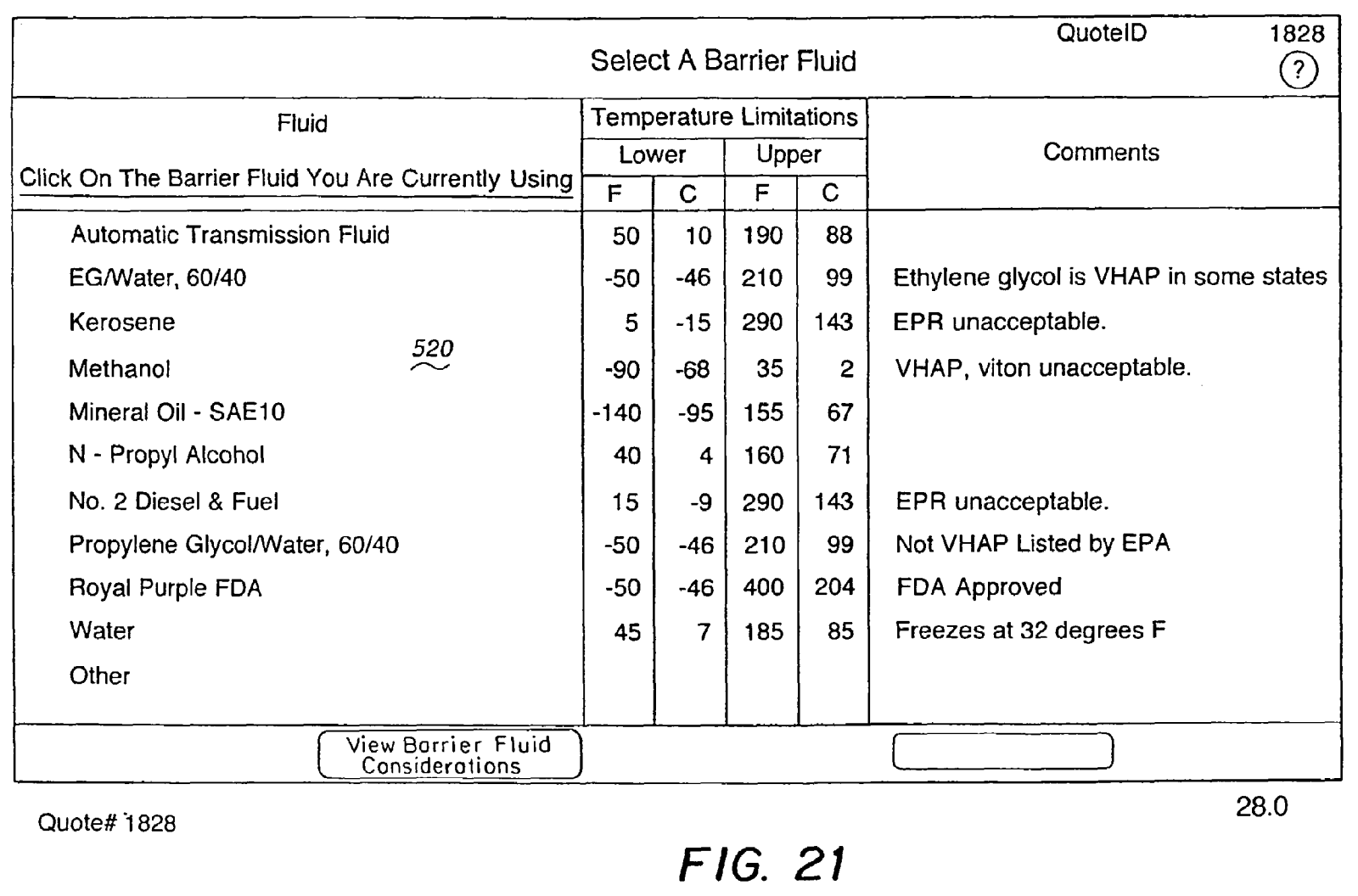

QuoteID 1828

?

Select A Barrier Fluid

| Fluid<br>Click On The Barrier Fluid You Are Currently Using | Temperature Limitations | | | | Comments |
|---|---|---|---|---|---|
| | Lower | | Upper | | |
| | F | C | F | C | |
| Automatic Transmission Fluid | 50 | 10 | 190 | 88 | |
| EG/Water, 60/40 | -50 | -46 | 210 | 99 | Ethylene glycol is VHAP in some states |
| Kerosene | 5 | -15 | 290 | 143 | EPR unacceptable. |
| Methanol | -90 | -68 | 35 | 2 | VHAP, viton unacceptable. |
| Mineral Oil - SAE10 | -140 | -95 | 155 | 67 | |
| N - Propyl Alcohol | 40 | 4 | 160 | 71 | |
| No. 2 Diesel & Fuel | 15 | -9 | 290 | 143 | EPR unacceptable. |
| Propylene Glycol/Water, 60/40 | -50 | -46 | 210 | 99 | Not VHAP Listed by EPA |
| Royal Purple FDA | -50 | -46 | 400 | 204 | FDA Approved |
| Water | 45 | 7 | 185 | 85 | Freezes at 32 degrees F |
| Other | | | | | |

520

View Barrier Fluid Considerations

Quote# 1828

Choose Modification Strategy

Please select the seal modification approach you want to use.

Select Modification Strategy

⦿ Supplier will supply a seal to fit equipment
○ Customer will modify equipment to fit seal (?)

525

29.0

| Part Code XXXXXXXXXX | | Delivery on or About | | | |
|---|---|---|---|---|---|
| Balanced Spring Loaded Stationary Design Double Cartridge Seal | | | | | |

| Available Optional Features | (?) | View Graphic of Optional Features |
|---|---|---|

The Manufacturer recommends the following optional features based on the process fluid chosen and the environmental controls selected.

| Selected | Recommended | Description | | |
|---|---|---|---|---|
| ⊙ Yes  ○ No | | XXXXXXXXXXXXXXXX | | |
| ○ Yes  ⊙ No | | XXXXXXXXXXXX | | |
| ⊙ Yes  ○ No | XXXXXXXXXX | XXXXXXXXXX | | 530 |
| | | | | |
| ⊙ Yes  ○ No | XXXXXXXXXX | | | |
| ○ Yes  ⊙ No | XXXXXXXXXXX | 534 | | |
| ○ Yes  ⊙ No | XXXXXXXXXXX | | | |

| Available Additional Products | (?) | View Graphic of Additional Products |
|---|---|---|

| ⊙ Yes  ○ No | XXXXXXXXXX  XXXXXXXX | | XXXX |
|---|---|---|---|
| ○ Yes  ○ No | XXXXXXXXXX  XXXXXXXXX | 532 | XXXX |

Due to the API Plans selected, the following additional products are recommended.

| Selected | Recommended | Description | Each | Number | Amount |
|---|---|---|---|---|---|
| ○ Yes  ⊙ No | | XXXXXXXXXX | XXXXX | X | XXX |
| ○ Yes  ⊙ No | | XXXXXXXXXXX | XXXXX | X | XXX |
| ○ Yes  ⊙ No | | XXXXXXXXX | XXXXX | X | XXX |
| ○ Yes  ⊙ No | | XXXXXXXXXXX | XXXXX | X | XXX |
| ○ Yes  ⊙ No | 533 | XXXXXXXXX | XXXXX | X | XXX |
| ○ Yes  ⊙ No | | XXXXXXXXXXX | XXXXX | X | XXX |
| ○ Yes  ⊙ No | | XXXXXXXX | XXXX | X | XXX |
| ○ Yes  ⊙ No | | XXXXXXXXX | XXXX | X | XXX |
| ○ Yes  ⊙ No | | XXXXXXXXX | XXXX | X | XXX |
| ○ Yes  ⊙ No | | XXXXXXXXXX | XXXXX | X | XXX |

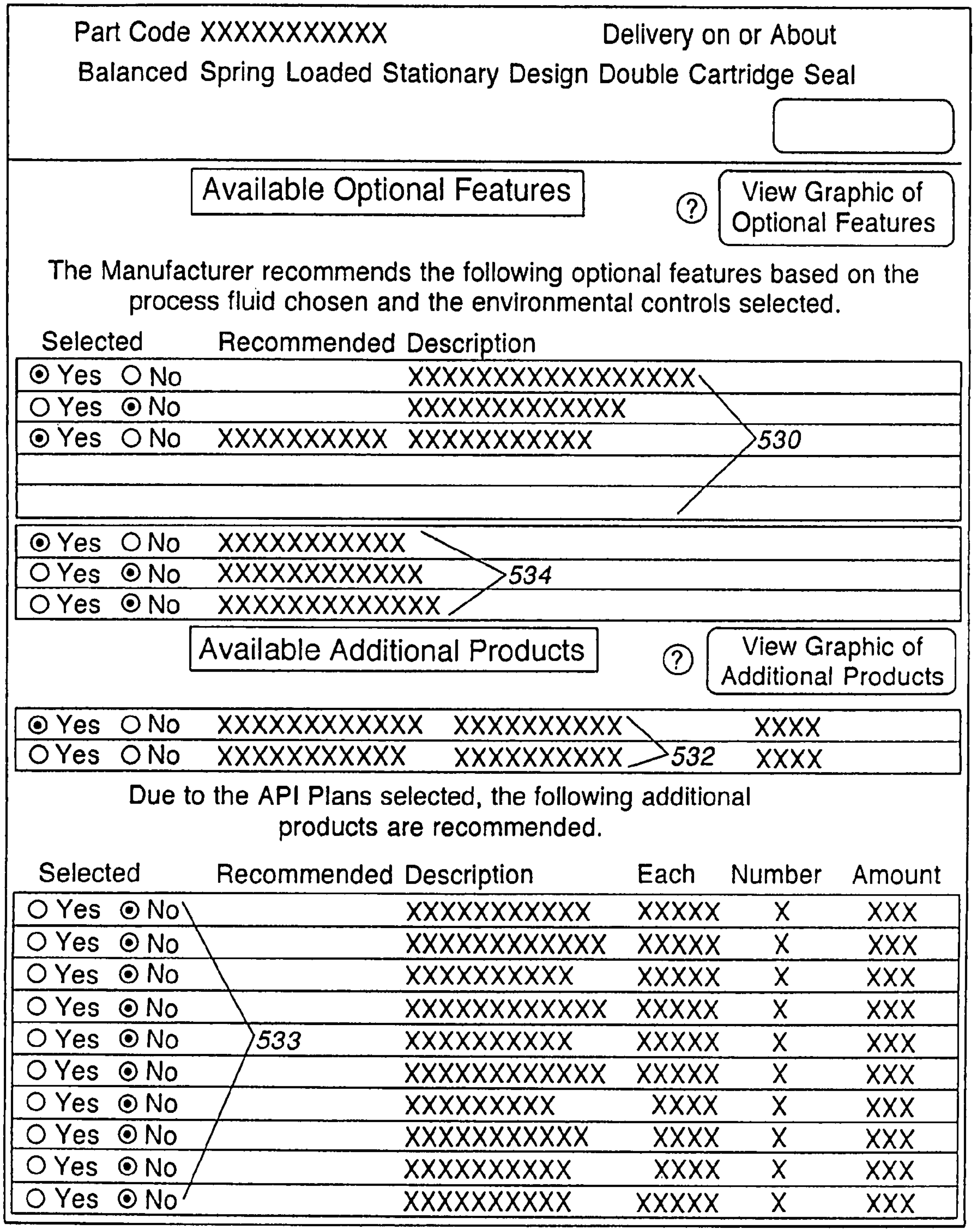

FIG. 23

| Seal Model | DS Seal Size | Glands 1, and 12 Standard Drawings and Casting "A & B" Materials | | | | Glands 1, 9, and 12 Bar Stock Casting " C & W" Materials Use Standard # if No Bar Drawing | | | |
|---|---|---|---|---|---|---|---|---|---|
| | | A | C | D | F | A | C | D | F |
| 3201 | 1.125 | A1 | C1 | D1 | F1 | BarA1 | BarC1 | BarD1 | BarF1 |
| 3201 | 1.375 | A1 | C1 | D1 | F1 | BarA1 | BarC1 | BarD1 | BarF1 |
| 3201 | 1.750 | A2 | C2 | D2 | F2 | BarA2 | BarC2 | BarD2 | BarF2 |
| 3201 | 1.875 | A2 | C2 | D2 | F2 | BarA2 | BarC2 | BarD2 | BarF2 |
| 3201 | 2.125 | A2 | C2 | D2 | F2 | BarA2 | BarC2 | BarD2 | BarF2 |
| 3201 | 2.250 | A2 | C2 | D2 | F2 | BarA2 | BarC2 | BarD2 | BarF2 |
| 3201 | 2.375 | A2 | C2 | D2 | F2 | BarA2 | BarC2 | BarD2 | BarF2 |
| 3201 | 2.500 | A2 | C2 | D2 | F2 | BarA2 | BarC2 | BarD2 | BarF2 |
| 3201 | 2.625 | A2 | C2 | D2 | F2 | BarA2 | BarC2 | BarD2 | BarF2 |
| 3201 | 2.750 | A2 | C2 | D2 | F2 | BarA2 | BarC2 | BarD2 | BarF2 |
| 3201 | 3.000 | A2 | C2 | D2 | F2 | BarA2 | BarC2 | BarD2 | BarF2 |
| 3201 | 3.750 | A2 | C2 | D2 | F2 | BarA2 | BarC2 | BarD2 | BarF2 |
| 3201 | 4.500 | A2 | C2 | D2 | F2 | BarA2 | BarC2 | BarD2 | BarF2 |
| 3201 | 4.75 | A2 | C2 | D2 | F2 | BarA2 | BarC2 | BarD2 | BarF2 |

| Fig. 25A | Fig. 25B |
|---|---|

*Fig. 25*

| Special Glands | | | | | | | | | |
|---|---|---|---|---|---|---|---|---|---|
| "A" Front Gland Drawings | | | | | | | Side View Drawings | | |
| Gland2 | Gland4 | Gland6 | Gland7 | Gland8 | Gland9 | Gland10 | SpecialC | SpecialD | SpecialF |
| 2A | 4A | 6A | 7A | 8A | 9A | 10A | SPC | SPD | SPF |
| 2A | 4A | 6A | 7A | 8A | 9A | 10A | SPC | SPD | SPF |
| 2A | 4A | 6A | 7A | 8A | 9A | 10A | SPC | SPD | SPF |
| 2A | 4A | 6A | 7A | 8A | 9A | 10A | SPC | SPD | SPF |
| 2A | 4A | 6A | 7A | 8A | 9A | 10A | SPC | SPD | SPF |
| 2A | 4A | 6A | 7A | 8A | 9A | 10A | SPC | SPD | SPF |
| 2A | 4A | 6A | 7A | 8A | 9A | 10A | SPC | SPD | SPF |
| 2A | 4A | 6A | 7A | 8A | 9A | 10A | SPC | SPD | SPF |
| 2A | 4A | 6A | 7A | 8A | 9A | 10A | SPC | SPD | SPF |
| 2A | 4A | 6A | 7A | 8A | 9A | 10A | SPC | SPD | SPF |
| 2A | 4A | 6A | 7A | 8A | 9A | 10A | SPC | SPD | SPF |
| 2A | 4A | 6A | 7A | 8A | 9A | 10A | SPC | SPD | SPF |
| 2A | 4A | 6A | 7A | 8A | 9A | 10A | SPC | SPD | SPF |
| 2A | 4A | 6A | 7A | 8A | 9A | 10A | SPC | SPD | SPF |

Pump ID XXXX Manufacturer Model One Group Shaft Seal Size Dimension

| | | Compatibility Analyzer Results | Description | Dimension Name | Standard Dimension | Modified Dimension | |
|---|---|---|---|---|---|---|---|
| 12 | 505C | | XXXXXXXXXX | XX<br>XX<br>XX | | | Problem Check<br>605 |
| | 508C | | XXXXXXXXX | XXXXXX | | | |
| | 509C | | XXXXXXXXXX | XXXXXXX | | | |
| | 511C | | XXXXXXXXXX | XXXXXXX<br>XXXXXXX<br>XXXXXXX | | | |
| | 516C | | XXXXXXXXXX | XX XXXX | | | |
| 9 | 504C | | XXXXXXXXXX | XX<br>XX<br>XX | | | |
| | 514C | | XXXXXXXXXX | XXXXXXX | | | |
| | 517C | | XXXXXXXXXX | XXXXXXX<br>XXXXXXX | | | |
| | 518C | | XXXXXXXXXX | XXXXXXX | | | |
| 4 | 507C | | XXXXXXXX | | | | |
| 10 | 506C | | XXXXXXXXXX | | | | |

| | Sleeve | | | | |
|---|---|---|---|---|---|
| 2 | 501D | | XXXXXXXXX | XXXXXXX<br>XXXXXXX | |
| 3 | 519D | | XXXXXXXXX | XXXXXXX<br>XXXXXXX<br>XXXXXXX | |
| 4 | 520D | | XXXXXXXXX | | |

A
Notes 610

N
Notes 611

Dimension Type
A = No Problems
B = Verify 1 dimension - Not 100% sure.
C = Verify all dimensions - Receives quote.
D = Supply all dimensions - Receive quotes.

| Delta's Model #s | Alter-nate | Enter Model# | Gland Type | Sleeve Type | Seal Fits Equipment Note1 Note2 Note3 Note4 Note5 Note6 Note7 | Equipment Fits Seal Note1 Note2 Note3 Note4 Note5 Note6 Note7 |
|---|---|---|---|---|---|---|
| Single - 3000, 3001 3005, 3400, 3700 | | | | | | |

606 607 608 609

| |
|---|
| Fig. 26A |
| Fig. 26B |

Fig. 26

FIG. 26B 620 621 Bolting Specifications 622 623 624 625

| Bolting Size | Hex Nut Max Width Across Corners | Hex Nut Width Across Flats | Cap Screw Max Head Diameter | Hex Head Shroud Clearance | Special "S" Slot/Hole Width | Slot Clearance |
|---|---|---|---|---|---|---|
| .25 | | | | | | |
| .312 | | | | | | |
| .375 | | | | | | |
| .437 | | | | | | |
| .500 | | | | | | |
| 12MM | | | | | | |
| .562 | | | | | | |
| .625 | | | | | | |
| 16MM | | | | | | |
| .750 | | | | | | |
| .875 | | | | | | |
| 1.000 | | | | | | |
| 1.125 | | | | | | |
| 1.250 | | | | | | |
| 1.375 | | | | | | |
| 1.500 | | | | | | |

Gasket Surface 626

| Size Range | Gasket Surface |
|---|---|
| .890-2.520 | |
| 2.521-3.020 | |
| 3.021-5.020 | |
| 5.021-7.500 | |

FIG. 27

| Seal Model | Seal Size | 630 Sleeve Large OD | 631 Sleeve #1 O-Ring OD | 632 Sleeve ID | 633 Sleeve Smaller OD | 634 Sleeve Rotary Head Step ID | 635 Sleeve #2 O-Ring OD | 636 Sleeve Snap Ring OD | 637 Sleeve Pumping Feature OD | 638 Sleeve Pumping Feature Under Cut | |
|---|---|---|---|---|---|---|---|---|---|---|---|
| 3200 | 0.937 | | | | | | | | | | |
| 3200 | 1.000 | | | | | | | | | | |
| 3200 | 1.125 | | | | | | | | | | |
| 3200 | 1.250 | | | | | | | | | | |
| 3200 | 1.375 | | | | | | | | | | |
| 3200 | 1.437 | | | | | | | | | | |
| 3200 | 1.500 | | | | | | | | | | |
| 3200 | 1.625 | | | | | | | | | | |
| 3200 | 1.750 | | | | | | | | | | |
| 3200 | 1.875 | | | | | | | | | | |
| 3200 | 1.937 | | | | | | | | | | |
| 3200 | 2.000 | | | | | | | | | | |
| 3200 | 2.125 | | | | | | | | | | |
| 3200 | 2.250 | | | | | | | | | | |
| 3200 | 2.375 | | | | | | | | | | |
| 3200 | 2.437 | | | | | | | | | | |

| | | | | | | | | | | | |
|---|---|---|---|---|---|---|---|---|---|---|---|
| 3200 | 2.500 | | | | | | | | | | |
| 3200 | 2.625 | | | | | | | | | | |
| 3200 | 2.750 | | | | | | | | | | |
| 3200 | 3.000 | | | | | | | | | | |
| 3200 | 3.250 | | | | | | | | | | |
| 3200 | 3.500 | | | | | | | | | | |
| 3200 | 3.750 | | | | | | | | | | |
| 3200 | 4.000 | | | | | | | | | | |
| 3200 | 4.250 | | | | | | | | | | |
| 3200 | 4.500 | | | | | | | | | | |

DELTA MECHANICAL SEALS

Quote # XXXX Prepared On: Valid Until:
Prepared for: Prepared by:
Your Salesperson's Name Here
Your Company Name Here
Your Address
Your City, State Your Zip
Your Phone (Phone)
Your Fax (Fax)

EQUIP. SPEC.

Equipment Tag: Equipment Serial Number
Pump Mfg: XXXXXXXXX
Pump Model: XXXXXXXXXXXXXXXXX
Bore Type: XXXXXXXXXX
Sleeve Type: XXXXXXXXXXXXXX
Equipment Type: XXXXXXXXXXXXXXXXXXX

OPERATING SPEC.

Process Fluid: XXXXXXXXXXXXX
Barrier Fluid: XXXXXXXXXXXX
Temperature: XXXXXXXXXXXXX
Concentration: XXXXXXXXXXXXX
Box Pressure: XXXXXXXXXX
Seal Size: XXXXXXXXXX
Shaft Speed: XXXXXXXXXXXXXX
Viscosity: XXXXXXXXXXX
Specific Gravity: XXX
Suction Pressure
Discharge Pressure
% of Solids Dissolved: X
% of Solids Undissolved: XXXXXXX XXXXXXX

SEAL INFO.

Seal Style: XXXXXXXXXXXXX
Gland Features: XXXXXXX
Part Code: XXXXXXXXX
Change

SEAL CONST.

Gland Sleeve: XXXXXXXX
Inboard: XXXXXXXX
Rotary Face: XXXXXXXXXX
Stationary Face: XXXXXXXXX
Elastomers: XXXXX
Outboard:
Rotary Face: XXX
Stationary Face: XXXX
Elastomers: XXX
Change

SEAL DIMENSIONAL INFORMATION

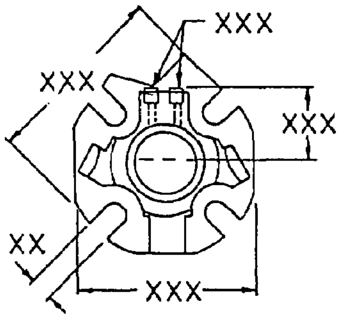

| Seal Bolting Information | | |
|---|---|---|
| Min. Bolt | 3/8 | |
| Circle | 1/2 | |
| By Stud | 5/8 | |
| Size | 3/4 | |

Slot ID Detail

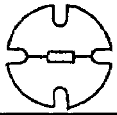

Modified Shroud Detail

Step Sleeve Detail

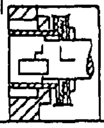

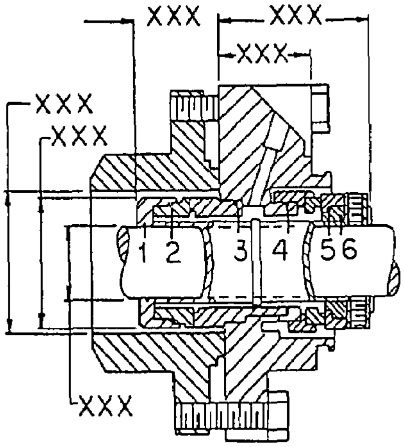

ENGINEERING SPECIFICATIONS

Please confirm that there are no obstructions which will interfere with the gland OD shown.

The Manufacturer suggests verification that your equipment will accomodate the seal shown above.

FIG. 30A(2)

ENVIRONMENTAL CONTROLS

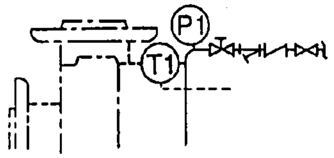

Plan 32
Injection to seal from external source of clean fluid into process fluid.

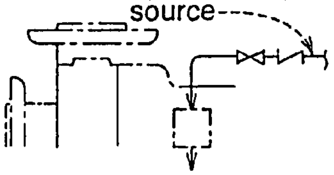

Plan 96
External fluid quench (steam only).

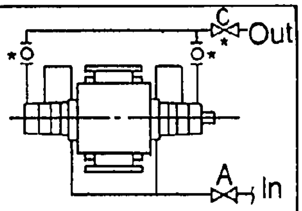

Plan E
Cooling to bearing housing and stuffing box jacket in series.

PROCESS FLUIDS

Seal chamber pressure must be maintained at minimum 15psi (1bar) above process fluid vapor pressure at pumping temperature to prevent flashing.

ADDITIONAL INFORMATION

Verification that the seal chamber will accommodate the throat bushing recommended should be done prior to ordering.

ORDER INFORMATION

| | Qty. | Part Number | Description | List Price | Price |
|---|---|---|---|---|---|
| Mechanical Seal | X | XXXXXXXXX | XXXXXXXXXXX XXXXXXXX | XXXXXXX | XXXXXXX |
| Optional Features Included In Each Seal | | XXXXXXX | XXXXXXXXXX | | XXXXXXXX |
| | | | | | |
| | | | | | |
| | | | | | |
| | | | | | |
| Additional Products | X | XXXXXXXXX | XXXXXXXX | XXXXXXX | XXXXXXX |
| | X | XXXXXXXXX | XXXXXXXX | XXXXXXX | XXXXXXX |
| | | | | | |
| | | | | | |
| | | | | | |
| | | | | | |
| CHANGE | Quote # XXXXXX | XXXXX | QuoteTotal | XXXXXX | XXXXXX |
| | Delivery | | Discount XXX | | |

XXXXXXXXXXXXXXXXXXXXXXXXXXXXXXXXXXXXXXXXXXXXXXXXXX
XXXXXXXXXXXXXXXXXXXXXXXXXXXXXXXXXXXXXXXXXXXXXXXXXX
XXXXXXXXXXXXXXXXXXXXXXXXXXXXXXXXXXXXXXX

*FIG. 30B*

| Materials Construction | | | |
|---|---|---|---|
| Item | Description | Material | Part # |
| 1 | XXXXXXXX | XXXXX | XXXX |
| 2 | XXXXXXXX | XXXXX | XXXX |
| 3 | XXXXXXXX | XXXXXX | XXXX |
| 4 | XXXXXXXX | XXXX | XXXX |
| 5 | XXXXXXXX | XXXXX | XXXX |
| 6 | XXXXXXXX | XXXXXX | XXXX |
| 7 | XXXXXX | XXXXX | XXX |
| 8 | XXXXXX | XXXX | XXXX |
| 9 | XXXXXXX | XXXXX | XXXX |
| 10 | XXXXXXX | XXXXX | XXXX |
| 11 | XXXXXX | XXXXX | XXXX |
| 12 | XXXXXXX | XXX | XXXX |
| 13 | XXXXXXXX | XXXX | XXXX |
| 14 | XXXXXXX | XXX | XXXX |
| 15 | XXXXX | XXXXX | XXXX |
| 16 | XXXXXXX | XXXXX | XXXX |
| 17 | XXXXXX | XXXXXX | XXXX |
| 18 | | | |
| 19 | | | |
| 20 | | | |

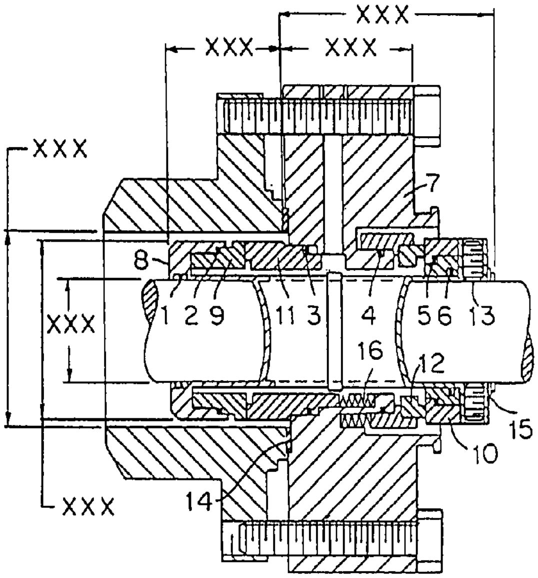

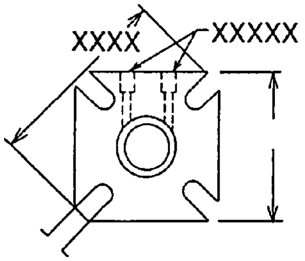

| Bolting Information | |
|---|---|
| Bolts # | X |
| Bolting Size | XXX |
| Bolt Spacing | XX |
| Bolt Circles | |

| Equipment Modification/Notes/ Equipment Verifications | Customer Information | | |
|---|---|---|---|
| XXXXXXXXXXXXXXX | | | |
| | XXXXXX XXX | | |
| | Operating Conditions | | |
| XXXXXXXXXXXXXXXXXXXX | XXXXXXXX | XXXXXXX | XXXXXXXX |
| Additional Notes | XXXXXXX | XXXXXXXXX | XXXXXXXXX |
| XXXXXXXXXXXXXXXXXXXX XXXXXXXXXXXXXX | XXXXXXX | XXXXXXX | XXXXXXXXXXX |
| | Chemical Notes | | |
| | XXXXXXX | | |
| XXXXXXXXXXXXXXXXX | | | |
| | Environmental Controls | | |
| | XXXXXXXXXXXXXXXXXXXXXX | | |

FIG. 33A

Quote # Prepared On Valid Until:

Bill To: Ship To:

When placing an order, always reference Quote #, Ref. #, and specify Quanity, and all Part Numbers on purchase orders.

| | PO Number | | Ship Via | | |
|---|---|---|---|---|---|
| | Qty. | Part Number | Description | | Price |
| Mechanical Seal | X | XXXXXXXX | XXXXXXXXXXXXXXXX XXXXX | | XXXXX |
| Optional Features Included In Each Seal | | XXXXXXX | XXXXXXXXXX | | XXXXX |
| | | XXXXXXX | XXXXXXXXXX | | XXXXX |
| | | | | | |
| | | | | | |
| | | | | | |
| | | | | | |
| Additional Products | | | | | |
| | | | | | |
| | | | | | |
| | | | | | |
| | | | | | |
| | | | | | |
| | | | | | |
| | | | | | |
| | | | | | |
| | | | | | |
| | Ref 161 | Delivery | Quote Total | | XXXXXX |

Details shown for mechanical seal are for customer's use and are not required when ordering seal.

| | | | |
|---|---|---|---|
| Gland Features: | XXXXXXXXXXXXXX XXXXXXXXX | | |
| Gland/Sleeve: | XXXXXXX | | |
| Inboard Rotary Face: | XXXXX | XXX | XX |
| Inboard Stationary Face: | XXXXX | XXX | XX |
| Inboard Elastomers: | XXXXX | XXX | XX |

Distributor

Manufacturer

Your Company Name Here
Your Address
Your City, State Your Zip
Your Phone (Phone)
Your Fax (Fax)

XXXXXXXXXXXXXXXXXXXX

FIG. 34

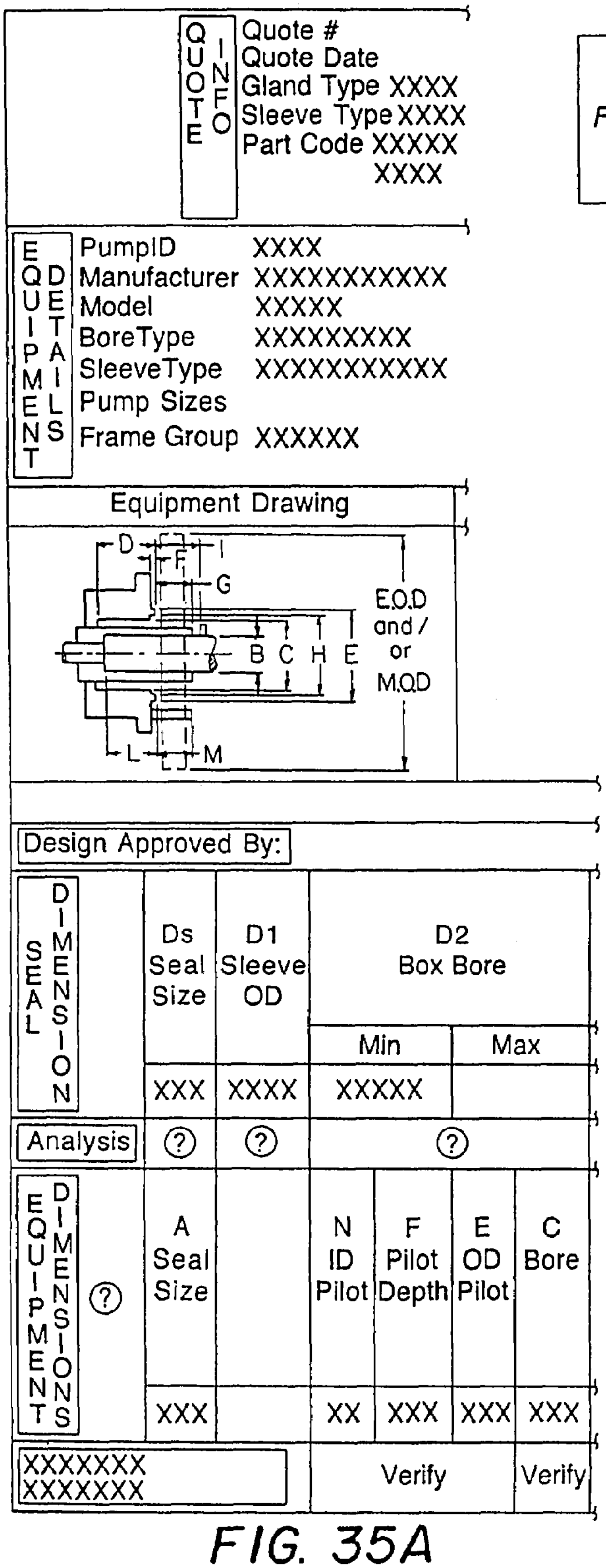

FIG. 35A

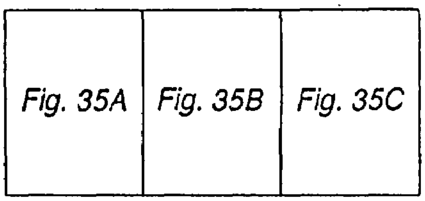

Fig. 35

| | | |
|---|---|---|
| Fig. 35A | Fig. 35B | Fig. 35C |

QUOTE INFO
Quote #
Quote Date
Gland Type XXXX
Sleeve Type XXXX
Part Code XXXXX
         XXXX

EQUIPMENT DETAILS
PumpID         XXXX
Manufacturer   XXXXXXXXXX
Model          XXXXX
BoreType       XXXXXXXXX
SleeveType     XXXXXXXXXX
Pump Sizes
Frame Group    XXXXXX Equipment Drawing D, F, I, G, B, C, H, E, E.O.D and/or M.O.D, L, J, M Design Approved By:

SEAL DIMENSION

| | Ds Seal Size | D1 Sleeve OD | D2 Box Bore | |
|---|---|---|---|---|
| | | | Min | Max |
| | XXX | XXXX | XXXXX | |

| Analysis | ⑦ | ⑦ | ⑦ | |
|---|---|---|---|---|

EQUIPMENT DIMENSIONS

| | A Seal Size | | N ID Pilot | F Pilot Depth | E OD Pilot | C Bore |
|---|---|---|---|---|---|---|
| ⑦ | XXX | | XX | XXX | XXX | XXX |

| XXXXXXX XXXXXXX | | | | Verify | Verify |
|---|---|---|---|---|---|

CUSTOMER INFO (Phone)
(Fax)

OPERATING CONDITIONS

| | | | |
|---|---|---|---|
| Process Fluid | XXXXXXXXXX | | |
| Temperature | X XXXX | Dischorge Pressure | psig |
| SpecificGravity | XXXXXXXX | Shoft Speed | RPM |
| Viscosity | XXXX XXXX | % of Solids | |
| Concentration | XXXXXXXX | Dissolved | |
| BoxPressure | XXXXXXXXX | Undissolved Fibrous | |
| SuctionPressure | XXXXXXXXX | Undissolved Non-Fibrous | |

Seal Drawing

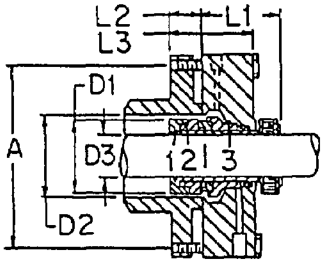

| D3 Gland OD | L1 Outside Length |
|---|---|
| | XXXX |
| ? | ? |

| E.O.D. Gland OD Existing | M.O.D. Gland OD Max. | I First Obstruct |
|---|---|---|
| | | XXXX |
| | Verify | Verify |

FIG. 35B

|  | Your Company Name Here<br>Your Address<br>Your City, State     Your Zip<br>Your Phone     (Phone)<br>Your Fax     (Fax) |
|---|---|
| RESALER INFO | |
| EQUIPMENT INFO | XXXXXXXXXXXXXXXXXXXXXXXXXXXXXXX<br>XXXXXXXXXXXXXXXXXXXXXXXXXXXXXXX<br><br>XXXXXXXXXXXXXXXXXXXXX |

| Special Details | Seal Drawing |
|---|---|
| Slot ID Detail | |
| | Equipment Drawing |
| Counterbore<br>XXXX<br>XXXX<br>XXXX | |

| | L2<br>Inside<br>Length | L3<br>Gland<br>Length | BOLTING | | | |
|---|---|---|---|---|---|---|
| | | | A Min. Bolt Circle By Stud Size | | | | S<br>Slot Width |
| | | | XX | XXX | XX | XX | |
| | XX | XXX | | | | | XXX |
| | ? | ? | ? | ? | | | |
| G<br>Sleeve<br>Extend<br>From<br>Face | B<br>Sleeve<br>Steps<br>To<br>Shaft<br>Size | D<br>Depth | U<br>Bolts# | S<br>Bolt<br>Spacing | Q<br>Bolting<br>Size | R<br>Bolt<br>Circles | W<br>Horz.<br>Dist. | Z<br>Vert.<br>Dist. |
| XX | XX | XXXX | | XX | XX | XX | XX | |
| Verify | Verify | | Verify | | | | | |

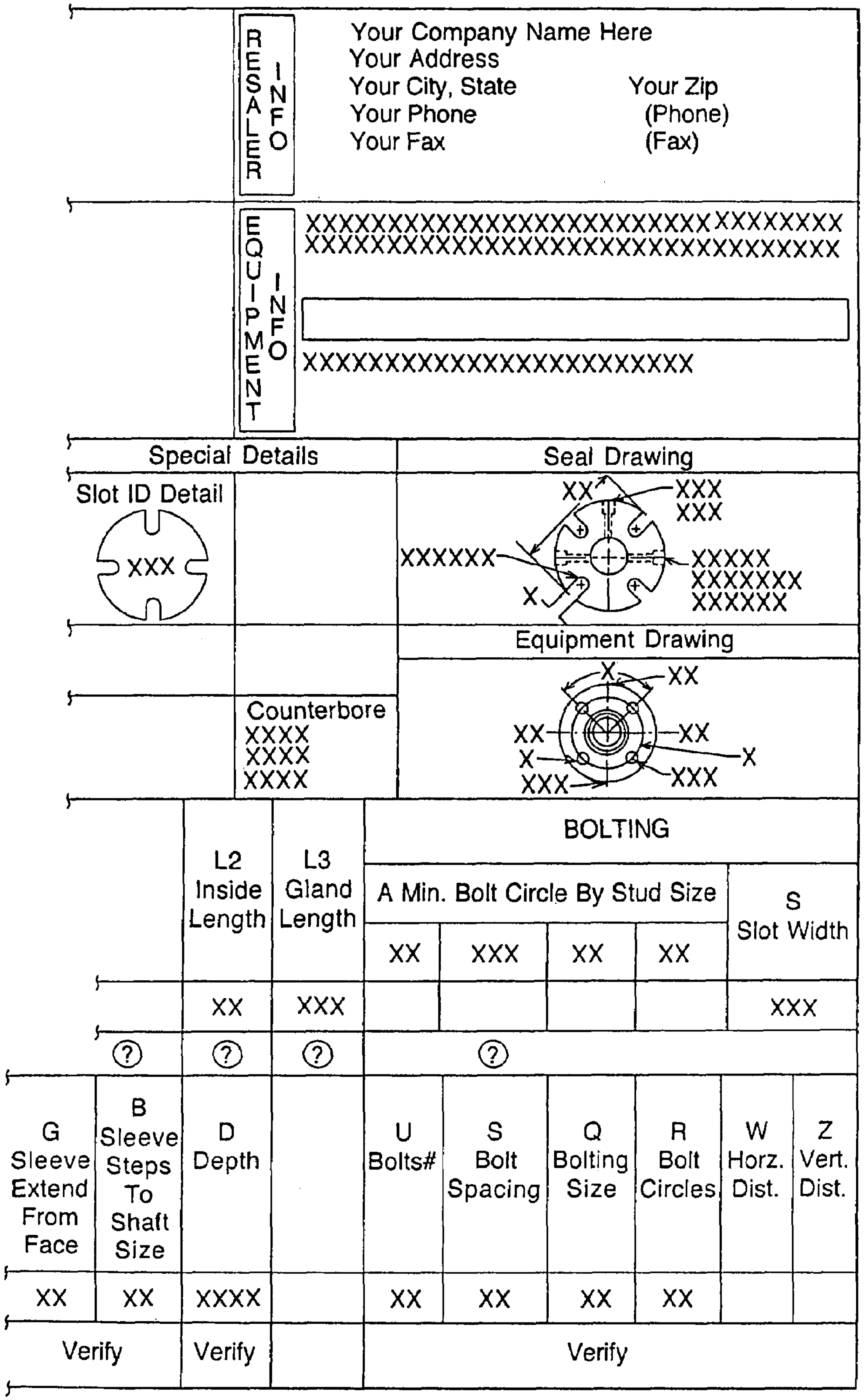

*FIG. 35C*

APPARATUS AND METHOD FOR SELECTING A MECHANICAL SEAL

CROSS REFERENCE TO RELATED APPLICATIONS

This application is a division of prior application No. 11/011,916, filed Dec. 14, 2004, now U.S. Pat. No. 7,191,026 which is a continuation of prior application No. 10/700,781, filed Nov. 4, 2003, now U.S. Pat. No. 6,832,123 which is a division of prior application No. 09/687,393, filed Oct. 13, 2000, now U.S. Pat. No. 6,662,062 which is a continuation of prior application No. 09/179,506, filed Oct. 27, 1998, now U.S. Pat. No. 6,173,210 which is a continuation of prior application No. 09/033,194, filed Mar. 2, 1998, now abandoned each such application entitled APPARATUS AND METHOD FOR SELECTING A MECHANICAL SEAL and each such application hereby incorporated herein by reference.

FIELD OF THE INVENTION

This invention relates to automated systems for supporting selection of a mechanical seals for equipment. More particularly, the invention relates to automated systems for supporting advertising, selecting, designing, manufacturing and providing post sales service and support for mechanical seals.

BACKGROUND OF THE INVENTION

Sales and marketing of mechanical seals presently involves several activities including seal selection, design and engineering of a seal, manufacturing, and post sales service and support. This process involves many different people to gather, manipulate, interpret and process a variety of kinds of information, and is not an exact science.

A mechanical seal is a shaft sealing device provided to contain process fluids within equipment such as a pump, mixer or other rotary equipment. Mechanical seals are used in operations of a typical processing plant. Significant industries that use seals include: pulp and paper, chemical processing, petroleum chemical, oil refining, food, processing, and power and utilities, among others.

There are generally three types of mechanical seals: component (made of several pieces), cartridge (components unitized for one piece) and split seals. Cartridge seals generally are preferred over component seals for several reasons. First, cartridge seals may be installed without significant training. These seals also may be tested before shipping to ensure sealability. However, conversion from a component seal to a cartridge seal for an application involves a complex process of selection of an appropriate seal design.

Because of the variety of applications for seals, selection of a seal involves considering several factors. For example, seals typically are connected to equipment with a rotary shaft (pumps being the most common) for which there are a large variety of commercially available designs with different dimensional profiles. Equipment also may have been modified in the field for several reasons, resulting in a nonstandard dimensional profile. Additional factors are the operating conditions of the equipment, including process fluids and their combinations, and intentional and unintentional changes in the process fluids used in a systems. Aside from selecting a seal that fits the equipment and is suitable for the given operating conditions, costs of the seal and its installation also are factors.

This selection process therefore generally involves highly trained sales engineers with factory support to perform properly the seal selection process. Their training typically includes mechanical and design engineering and chemical engineering. These individuals typically also perform sales, service and support functions. Because of the complexity of the seal selection process, customers tend to be dependent on these sales engineers. This dependency is due to the complexity of part codes for these seals.

The expertise level of a sales engineer is generally dependent on the size of seal manufacturer, years of experience, education and training, resulting in varying competencies. Sales engineers may possess only industry specific expertise, acquired from their experience. Accordingly, without extensive experience, a sales engineer also may be dependent heavily on factory support for assistance in the seal selection process.

Moreover, sales engineers, despite their experience, still may be dependent on factory support because they typically have immediate access to selection information limited to common equipment and process fluids, either in printed or computer-readable text form. Other information, such as application data, engineering data, special pricing and drawings may be available only at the factory, requiring the sales engineer to use factory support to derive seal selections or to interpret the available information and to select a seal. Accurate communication between sales engineers and factory engineers is a critical component of this process.

Depending on the resources available to a manufacturer, which may depend on its size or its number of years in business, factory support may be limited to manually intensive selection methods prone to errors resulting in an informal, unscientific selection process. Even with more sophisticated procedures based on significant amounts of historical information, however, human intervention is generally required for many decisions made between field sales and factory support personnel because of individuals' judgments and perceptions, which may result in inaccurate selections. In particular, a significant amount of human interaction is required to gather, interpret, manipulate and analyze the application data when the sales engineer requires factory support. In particular, the pump and seal dimensions, operating conditions and process fluids affect the selection of materials to obtain maximum seal life. The human interaction involved in current selection methods may result in different recommendations from different individuals, for the same application, of a seal model, optional seal features, materials of construction, seal environmental controls, i.e., piping plans, and various auxiliary devices to be used with the environmental controls. In addition, the likelihood of an error is increased. An error in any stage of the selection process may result in an inaccurate or incomplete sealing solution, which translates into premature seal failure and increased costs.

There are several steps in the seal selection process which typically involve human interaction. One step is identification of the equipment, e.g., a pump or drive motor or other rotary equipment. The methods of identification differ among sales engineers. Example sources of identification information include identification tags on the equipment, maintenance records, engineering records, purchasing records, equipment manufacturer's records or seal manufacturer's records. If these sources provide incomplete information proper equipment identification may be impossible. Even if equipment is properly identified, e.g., by make and model, modifications may have been made to the equipment. A failure to identify such modifications results in an erroneous seal selection. As a result, a trained individual measures the equipment to obtain accurate dimensional data. Dimensional data is commonly collected using forms of varying complexity and completeness. Simple forms tend to be incomplete. Complex forms tend to be subject to interpretation by sales engineers and factory engineers. Both kinds of forms result in errors.

A seal model which is dimensionally compatible for the identified equipment then is selected. In order to make this selection, a sales engineer may refer to information available in a reference guide, or if not identified in a reference guide, performs a dimensional analysis. The dimensional analysis may be performed by the sales engineer or by relying upon factory support. When application data is received at the factory, it is reviewed for completeness and accuracy. If the data is not satisfactory, the process is delayed.

After a dimensionally compatible seal model has been selected, the operating conditions are identified by the sales engineer and are analyzed to confirm that the recommended seal is suitable for the process performed by the equipment. This analysis involves evaluating the operating conditions and the process fluids, with respect to a number of aspects of the seal, including, but not limited to: a metallurgy for general corrosion resistance; a face material combination for lubricity of the chemical and/or corrosion or abrasion resistance; and selection of secondary sealing components, i.e., o-ring elastomers for temperature and chemical resistance.

The operation conditions include but are not limited to: shaft speed as related to seal chamber pressure acting on the seal, i.e., pressure/velocity; stuffing box/seal chamber pressure, which is a function, of different pump internal part designs (impellers); shaft speed; pump discharge pressure at outlet nozzle; pump suction pressure at inlet nozzle; pressure/velocity parameters for different seal designs and face material combinations; box pressure calculations based on pump design type; seal face balance design; concentration; temperature; viscosity; the percentage of undissolved or dissolved or fibrous or nonfibrous solids; vapor pressure; specific gravity; and pollutants and other chemicals. Sometimes these values are estimated or are not obtained.

Either the sales engineer or factory support may analyze the operating conditions, depending on experience and resources. The parameter limits for various operating conditions generally are maintained in printed engineering tables by seal type, or may be calculated. If this analysis is performed by untrained individuals using only printed tables and without an engineering level analysis, or if incomplete information is used, then the analysis may be inaccurate or erroneous. It may also be inappropriate to select the material of a previous seal.

If the analysis indicates that a standard seal model is not acceptable, appropriate modifications to either a seal or the equipment are determined. An engineer may have a limited information guide explaining the modifications to be made to popular pumps to fit popular seals. Modifications to a seal generally are not provided. Otherwise the modifications are determined, either by the sales engineer or factory support, by reference to various guides or by analysis or based on historical information such as previous bills of material and factory engineering drawings. If the information used to make the modifications is inaccurate or incomplete, an inappropriate modification may be made to the seal or the equipment.

The process fluids also are analyzed to review characteristics which may affect seal selection, such as, but not limited to: volatile hazardous air pollutants, which requires selection of a double seal for absolute zero vapor emission leakage; flammability; toxicity; polymerization; solidification; abrasive slurries; percentage concentration of primary and secondary chemicals; and minimum and maximum process temperatures.

If a sales engineer has a reference guide with material ratings for a seal, the final seal selection is made by the sales engineer based on training and experience. A reference guide also may indicate materials for use with only one process chemical, without consideration of secondary chemicals which may be present in the process. If the guide is not complete, factory support may be required for assistance. An engineer providing factory support analyzes the process to identify the process fluid chemical characteristics, for example by utilizing published technical reference sources, chemical dictionaries, or historical information such as previous bills of material, or by basing a selection on properties of a chemical with similar characteristics. As with other steps involving factory support, information may be missing from the sales engineer, thus incurring a delay or resulting in an incorrect selection. Because of the complexity of the process fluid analysis, errors in selection are possible.

The sales engineer also selects optional seal features to obtain optimum seal performance life. Such features include, but are not limited to: a two piece stationary face (for viscous or polymerizing chemicals); a quench and drain gland (to cool or heat seal faces, or wash away crystalline deposits on atmospheric side of the seal faces); and pumping sleeves for double seals to provide maximum flow of barrier fluid to cool and lubricate the seal faces. The limited information on optional features in a reference guide may be limited. Otherwise, sales engineers derive the selection of optional features from the chemical characteristics. Whether a given seal has optional features to handle the application may require factory support for a recommendation.

Another step of the seal selection process is determining the best environmental controls or American Petroleum Institute (API) standard plan. The environmental controls are systems used to cool, lubricate, heat, etc., thereby controlling the environment of the mechanical seal, particularly at the seal faces. For an existing application, the sales engineer identifies the current external piping system and evaluates whether it should be modified for the application. For a new application, the sales engineer identifies piping systems available. A limited reference guide may help derive selection of the piping plan or factory support may be required. This aspect of the selection process may even be neglected or an existing piping plan may be incorrect for the application, thereby resulting in premature seal failure. Significant interaction between customers, sales engineers, and factory engineers may be required for proper selection.

Another step of the seal selection process is the selection of a variety of auxiliary devices, i.e., products external to the seal and typically in the piping plan, including but not limited to: supply tanks for double seal piping systems; throat bushings for use with external clean flush systems to seal faces; and flow control devices for external flush systems for single seals and double seals. As with other aspects of this process, such devices may be selected using limited reference guides, or application engineers may calculate the design, size and selection of an auxiliary device. Depending on the type of auxiliary, e.g., throat bushings, equipment dimensions may be needed by an engineer to design and manufacture the device.

After a seal with appropriate materials and optional features, environmental controls and auxiliaries have been selected, an appropriate price is determined along with a bill of materials and specifications for installation. Current pricing methods for mechanical seals for standard products typically involves price lists or books. The pricing book may be complex and may require factory support to be interpreted in order to arrive at a price for a given seal selection. When special designs are made, a selling price and discount structure is more complex to determine, and typically involves trained engineers and accountants. The entire quotation process involves time frames ranging from days to weeks.

Ultimately, after quotation and receipt of an order, a seal is manufactured according to the quotation if the seal is not a standard part. Manufacturing operations vary based on the size and scope of products offered by a seal manufacturer and the manufacturing process technologies used. The kinds of manufacturing equipment used ranges from manual equipment to computer numerically controlled (CNC) equipment in various combinations depending on the scope of products and raw materials for the products. Despite the size of the manufacturer, highly trained individuals typically are needed for manufacturing.

While some manufacturers may use a computer program to assist in seal selection, such computer programs are generally an automated look-up table with which a user selects a model number of a pump, a corresponding product line of seals and receives a selection of possible seals. In some cases, the user may even select the materials for the seals. Such tools generally require either mechanical or chemical engineering knowledge or a significant amount of experience in order to select a seal correctly.

In sum, because of the complexity of the seal selection process, manufacturing and marketing of mechanical seals requires seal manufacturers to be dependent upon highly trained individuals. Customers depend on sales engineers and the manufacturer for technical support in order to obtain accurate solutions to field service problems. Because of complexity, delay and cost of the seal selection process, a customer may replace a failed seal with a seal of the same type rather than make a corrective selection. Premature seal failure may continue to occur, resulting in excessive operating costs.

The combination of the complexities and requirements of seal selection, quotation, design and engineering, manufacturing and post sales support processes thus produces inconsistent, unscientific and erroneous results, and increased costs.

SUMMARY OF THE INVENTION

The various difficulties with existing seal selection methods are overcome by providing a standardized process for gathering, analyzing, interpreting and deriving data relating to the seal selection process. In particular, equipment dimensional profiles for standard equipment are stored in a database. This database may be searched using several kinds of identification information of the equipment. Help information is provided to indicate to the user how to make proper measurements on the equipment. In addition, dimension verification information is provided to assist the user in verifying that the equipment has not been modified.

Given proper equipment identification, a compatibility analysis is performed between the equipment and seals in a seal database to determine which seals are dimensionally compatible with the identified equipment. This compatibility information may be stored with the equipment information in the equipment database.

A process fluids database specifies recommended materials for various process fluids. A user is prompted to specify process fluids. This system automatically determines which materials are recommended for the specified process fluids and selects a seal that is available in the selected materials.

A seal specifier uses the information input by the user, the process fluids database, the seal styles database, and the equipment profile database to determine an appropriate seal for the specified equipment. The seal specifier allows a user to select seal based on a known product number for the seal, or by specifying information about either equipment or the seal, and accommodates the addition of a new equipment to the equipment database. The equipment may be identified by specifying the frame or group of the equipment, a part number, or by its dimensions. These varieties of methods allow a non-specialist to select a seal by providing information simply about the equipment and the process in which the equipment is used.

In the process of specifying a seal, the compatibility analysis performed between the seal and the equipment may indicate that a modification should be made either to a standard seal or to the equipment to fit the standard seal. The specified seal and any modifications may be provided to a manufacturing center. By including a database with a variety of drawings and template programs for a computer numerically controlled machinery, the dimensions of a modified seal may be inserted into a template program to automatically generate a custom seal design to manufacture a custom seal.

The various elements of this system, both individually and in the various combinations, automate the many steps of the seal selection process.

By having a seal styles database with established limits for materials and operating conditions, the system automatically compares the input process fluids and operating conditions to the database to select a best seal model from among those seals which are dimensionally compatible with the equipment. A compatibility rating for process fluids assists in the prioritization of the seal models available in the recommended materials for the specified process. By allowing a user to specify secondary chemicals in the process stream, the quality of the seal selection is improved. The material and compatibility ratings and operating condition limits for a seal model may be compiled from material suppliers and other engineering guides into the process fluids database and the seals styles database. Similarly, environmental control typing plans and auxiliary devices may be associated with each seal model in the seal style database, automating the selection of such products.

Accordingly, in one aspect an apparatus for determining a seal for a piece of equipment includes a database of equipment profiles and a database of seal profiles. A seal selection module is coupled to the database of equipment profiles and the database of seal profiles, the seal selection module having an input that receives data indicative of a characteristic of the piece of equipment from a user, and an output that accesses the database of equipment profiles to determine a seal from the database of seal profiles that meets the desired characteristic and fits the piece of equipment. Another aspect is the process performed by such an apparatus.

In another aspect, an apparatus for determining a seal for a piece of equipment includes a database of equipment profiles and a database of seal profiles. A compatibility analyzer is coupled to the database of equipment profiles and the database of seal profiles, having an input that receives data indicative of a characteristic of the piece of equipment, the compatibility analyzer comparing one seal profile within the database of seal profiles with the characteristic of the piece of equipment to determine a modification which, allows the piece of equipment to accommodate the seal defined by the one seal profile. Another aspect is the process performed by such an apparatus.

In another aspect, an apparatus for defining a plurality of equipment profiles includes a database of equipment profiles, each of the equipment profiles defining a characteristic of a respective piece of equipment, the characteristic being suitable for determining whether a seal is compatible with the respective piece of equipment. The database of equipment profiles includes results of a compatibility analysis added to the database of equipment profiles, the results of the compatibility analysis defining a seal that is compatible with the piece of equipment and that was not previously defined within the database of equipment profiles as compatible with the piece of equipment, so that data defining the piece of equipment and a reference to a seal that is compatible with the piece of equipment are accessible from the database of equipment profiles. Another aspect is the process performed by such an apparatus.

In another aspect, an apparatus for generating a computer numerically controlled program includes a specifier module having a first input that receives data defining a characteristic of a piece of equipment, a second input that receives data defining a desired characteristic of a seal for use in the piece of equipment, and an output that provides a profile of a seal that is compatible with the piece of equipment. A computer numerically controlled program generator has an input that receives the profile of the seal and an output that provides a computer numerically controlled program for machining an element of the seal based upon the profile of the seal, so that the seal is compatible with the piece of equipment. Another aspect is the process performed by such an apparatus.

In another aspect, an apparatus for defining a replacement seal for use in a piece of equipment includes a specifier module having a first input that receives data defining a characteristic of a piece of equipment, a second input that receives data defining a desired characteristic of a seal for use in the piece of equipment, and an output that provides a profile of a seal that is compatible with the piece of equipment. A seal design module receives the profile of a seal and produces an output that provides dimensions based upon the profile of a seal, the dimensions defining a seal that is compatible with the piece of equipment. Another aspect is a process performed by such an apparatus.

In another aspect, a computer-implemented method analyzes compatibly between a seal and a piece of equipment. Information defining parameters of the equipment and of the seal is received. The parameters of the seal and of the equipment are compared to determine if there is an exact match. When an exact mach is not made for a parameter, an indication of the difference between the parameter for the seal and the parameter of the equipment is stored. When a parameter is absent, an indication of the absence of the parameter is stored.

In another aspect, an apparatus for generating a computer numerically controlled program includes a database of templates of computer numerically controlled programs, specifying operations for a program for machining an element, without dimensional information. A computer numerically controlled program generator, has an input that receives the profile of the seal and templates from the database of templates for the seal, and an output that provides a computer numerically controlled program for machining an element of the seal based upon the profile of the seal, so that the seal is compatible with the piece of equipment.

In another aspect, a method for making a mechanical seal involves preparing templates of computer numerically controlled programs, specifying operations for a program for machining an element, without dimensional information. A profile of a seal and the templates for the seal are received. A computer numerically controlled program for machining an element of the seal is generated based upon the profile of the seal, so that the seal is compatible with the piece of equipment.

In another aspect, a computer system for facilitating identification of equipment for matching with a seal, includes a graphical user interface that displays a template having fields and for receiving inputs in the fields defining dimensions of the equipment. The graphical user interface associates graphical information illustrating how to obtain the information with the fields in the templates and verifies the completeness and type of data in each field in the template. Dimensional verification information indicating expected dimensions for each of the fields in the template also is provided.

Another aspect is an apparatus or process in which the foregoing aspects are combined so as to provide a system includes a seal specifier for specifying a seal, a compatibility analyzer for determining dimensional compatibility between a seal and equipment, a design center for generating dimensions of modified seals and a manufacturing center for producing CNC programs to create modified seal components.

These and other aspects and advantages of the present invention are set forth in the following detailed description.

BRIEF DESCRIPTION OF THE DRAWINGS

Illustrative embodiments will be described by way of example with reference to the accompanying drawings, in which:

FIG. 6 is a representation of a screen display which prompts a user to enter a part number of a requested seal and any optional features or additional products requested;

FIG. 8 is a representation of a screen display of the seal selection system which provides a list of pumps which meet selected pump search criteria and which allows the user to select one of the listed pumps;

FIG. 11 is a representation of a screen display which shows contents of a pump data file in which the compatibility analyzer stores results;

FIG. 12 is a representation of a screen display which shows a dimensional profile of a seal model stored in the seal styles file;

FIG. 14 is a representation of a screen display which prompts a user to select one of four approaches to selecting a seal;

FIG. 21 is a representation of a screen display which prompts a user to select a barrier fluid if a double cartridge seal has been selected;

FIG. 23 is a representation of a screen display in which the system presents optional features and additional products which are available for the seal;

FIG. 25 is a representation of an example graphic profile of a seal model stored in the seal styles file.

FIG. 26 is a representation of an example worksheet created by the design center to calculate dimensions needed;

FIG. 27 is an example chart of bolting and gasket surface specifications used by the compatibility analyzer and design center;

FIG. 30A is a first portion of an example proposal automatically generated by the system, including a cutaway drawing and a gland drawing with applicable dimension indicated;

FIG. 30B is a second portion of an example proposal automatically generated by the system, including pricing information which accounts for any applicable customer discounts;

FIG. 34 is an example order form which is automatically generated by the seal selection system, allowing a user to order the seal directly from the manufacturer;

FIG. 35 is an example dimension verification form used to confirm the seal selected fits on the user's pump, and to confirm the equipment has not been previously modified;

DETAILED DESCRIPTION

The present invention will be more completely understood through the following detailed description which should be read in conjunction with the attached drawing. All dimensions herein are expressed in inches. However, the present invention may be implemented using any units of measure.

The inherent cost burden of a human intensive approach to mechanical seal selection, quotation, design/engineering, manufacturing, service and support processes is overcome by providing an automated system which, in different aspects, supports these operations without requiring many highly trained people or significant interaction among sales engineers, factory support and the customer to gather, interpret, manipulate and analyze data.

This automated system supports the selection of seals for complex applications by analyzing a large number of process fluids and their combinations, equipment, e.g., pump, dimensional profiles with design variations and modifications, and operating conditions. Consistent, scientific seal selections thus may be obtained rapidly. The system also supports ready conversion of applications to cartridge seals.

Figure 1A:
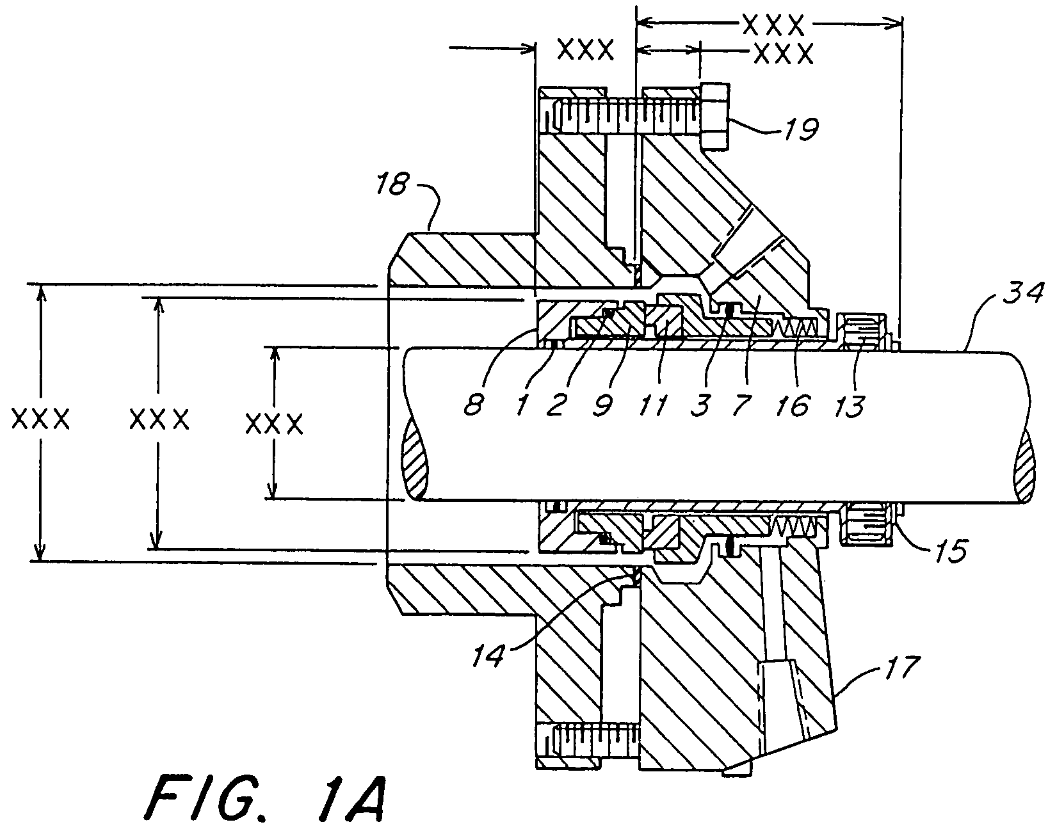
FIG. 1A is a perspective view of an example single cartridge seal.

FIG. 1A illustrates an example of a single cartridge seal. The seal 17 is attached to equipment 18 via bolts 19 and surrounds a shaft 26. The seal includes a static o-ring gasket between the seal sleeve and pump shaft or sleeve, as indicated at 1. A static o-ring gasket 2 is provided between the sleeve end bore and a rotary face. A static o-ring gasket 3 is provided between the gland bore and the stationary face. The gland 7 has springs and an o-ring gasket and has a stationary face which is bolted to pump housing to hold the seal in place. The sleeve 8 contains two o-ring gaskets and a rotary face and transmits drive to the rotary face with a drive pin. The inboard rotary face 9 is driven by the seal sleeve which is rotating with the pump shaft which provides primary sealing action by running against the stationary face with a thin layer of lubrication between the faces. The inboard stationary face 11 is held stationary within the seal gland using antirotation lugs and provides a primary sealing action by the rotary face running against it. The set screws 13 are contained within the drive collar and transmit drive to the seal sleeve by engaging the pump shaft or sleeve through holes in the sleeve. A flat gasket 14 provides a gasket seal between the gland and pump housing face. A snap-ring 15 engages a groove in the sleeve to hold the drive collar with the set screws in place. Springs 16 are contained within the seal gland and provide mechanical force to keep the inboard stationary face loaded against the rotary face.

Figure 1B:
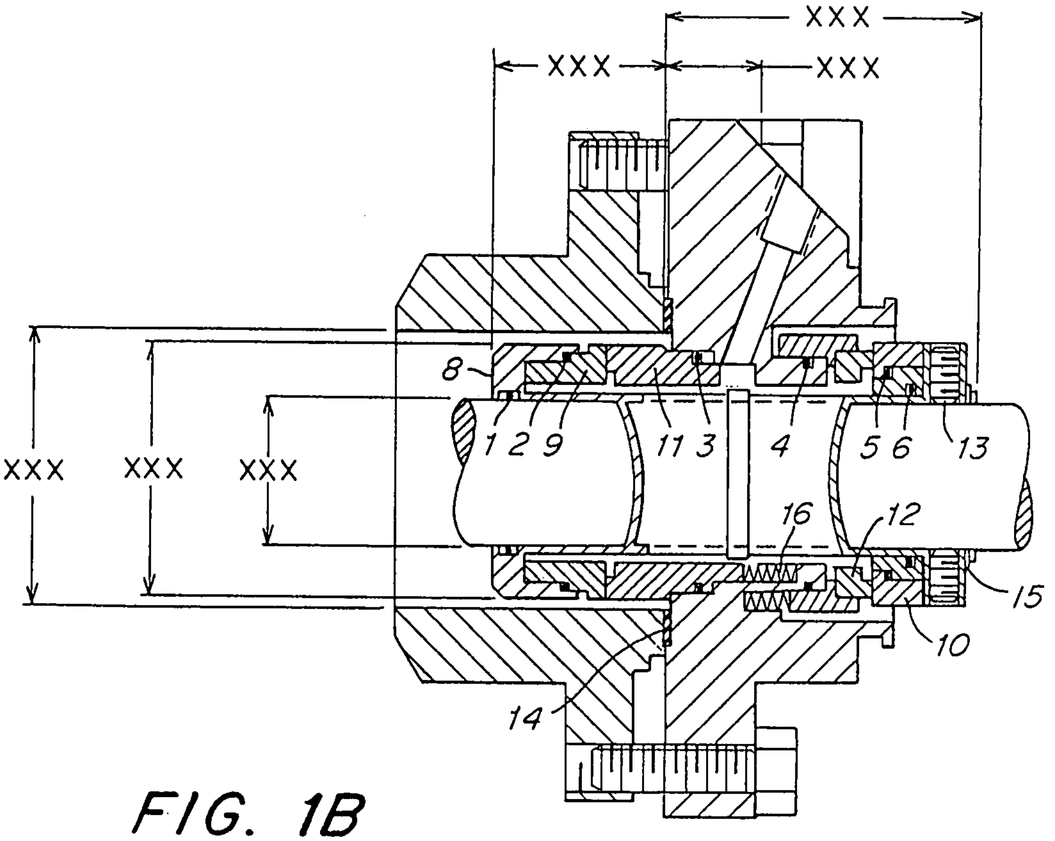
FIG. 1B is a perspective view of an example double cartridge seal.

FIG. 1B illustrates a double cartridge seal. The double cartridge includes the same parts as the single cartridge and an o-ring 5 which provides a static o-ring gasket between a drive collar and the inside diameter of the outboard rotary face. A static o-ring gasket 6 is located between the drive collar and the outside diameter of the sleeve. The outboard rotary faces 10 are driven by a pin in the drive collar which rotates with the pump shaft providing primary sealing action by running against the outboard stationary face with a thin layer of lubrication between the faces. An outboard stationary face 12 is held stationary within the outboard side of the gland using antirotation pins providing primary sealing action by having the outboard rotary face running against it.

Such cartridge seals are constructed from various components into a unitized design. Some components typically are manufactured from either "bar stock" or "tubing," or from castings. Casted parts generally cost less than parts manufactured from bar stock. Castings may be designed such that a small number of castings may be compatible for a given set of equipment through an analysis of equipment profiles.

Figure 2A:
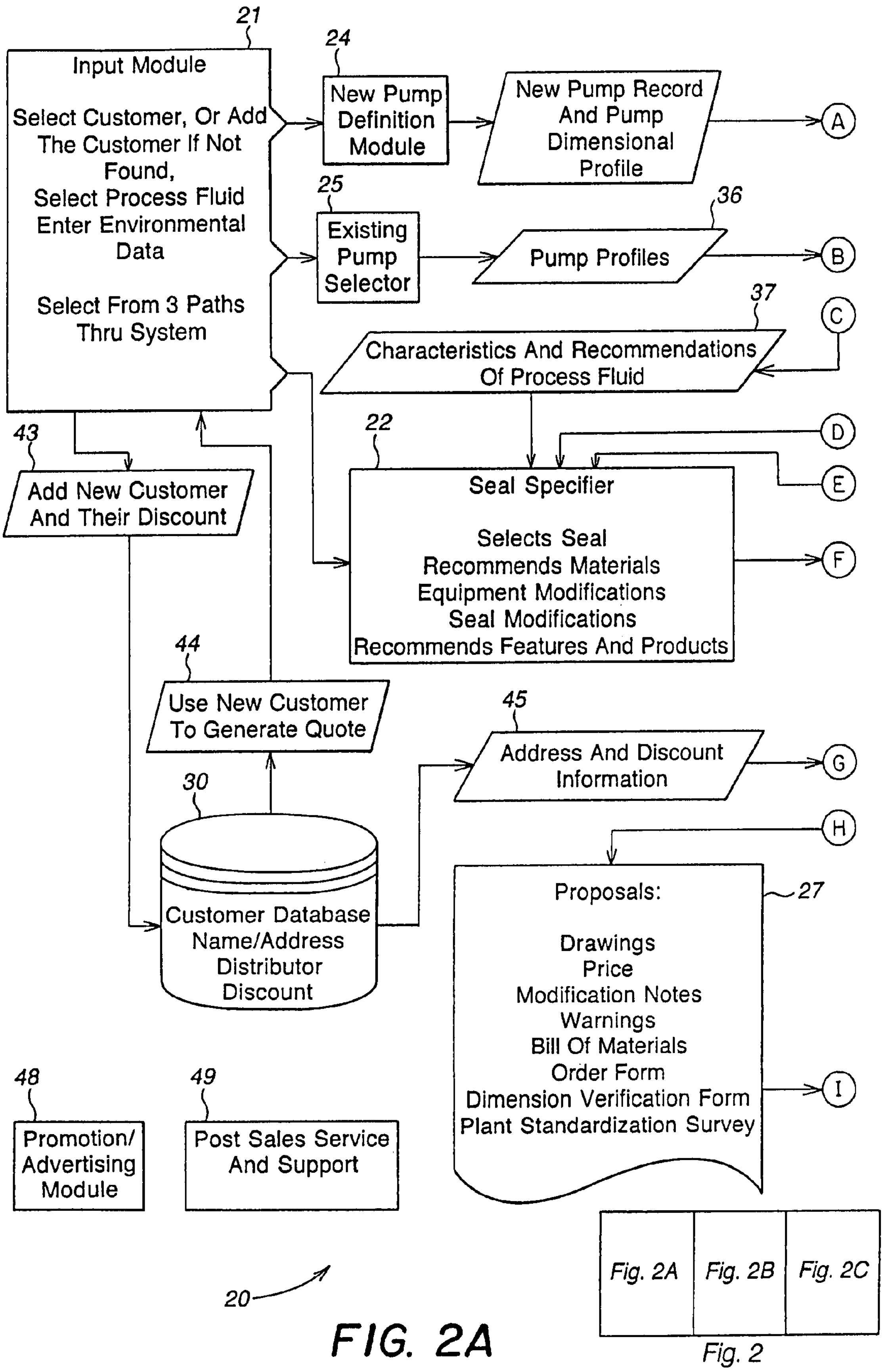
FIG. 2 is a block diagram of a seal selection system according to one embodiment.
Figure 2B:
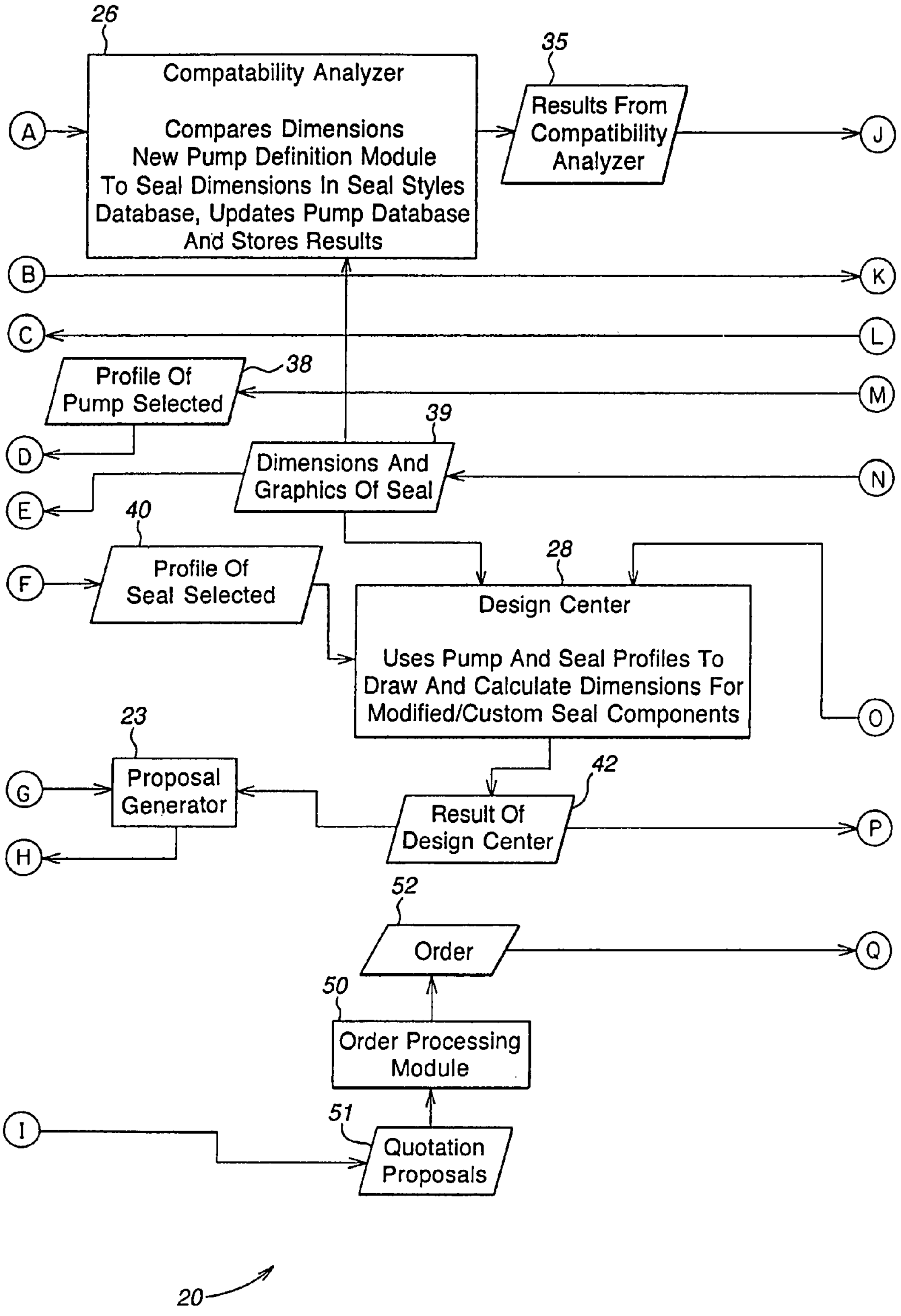
Figure 2C:
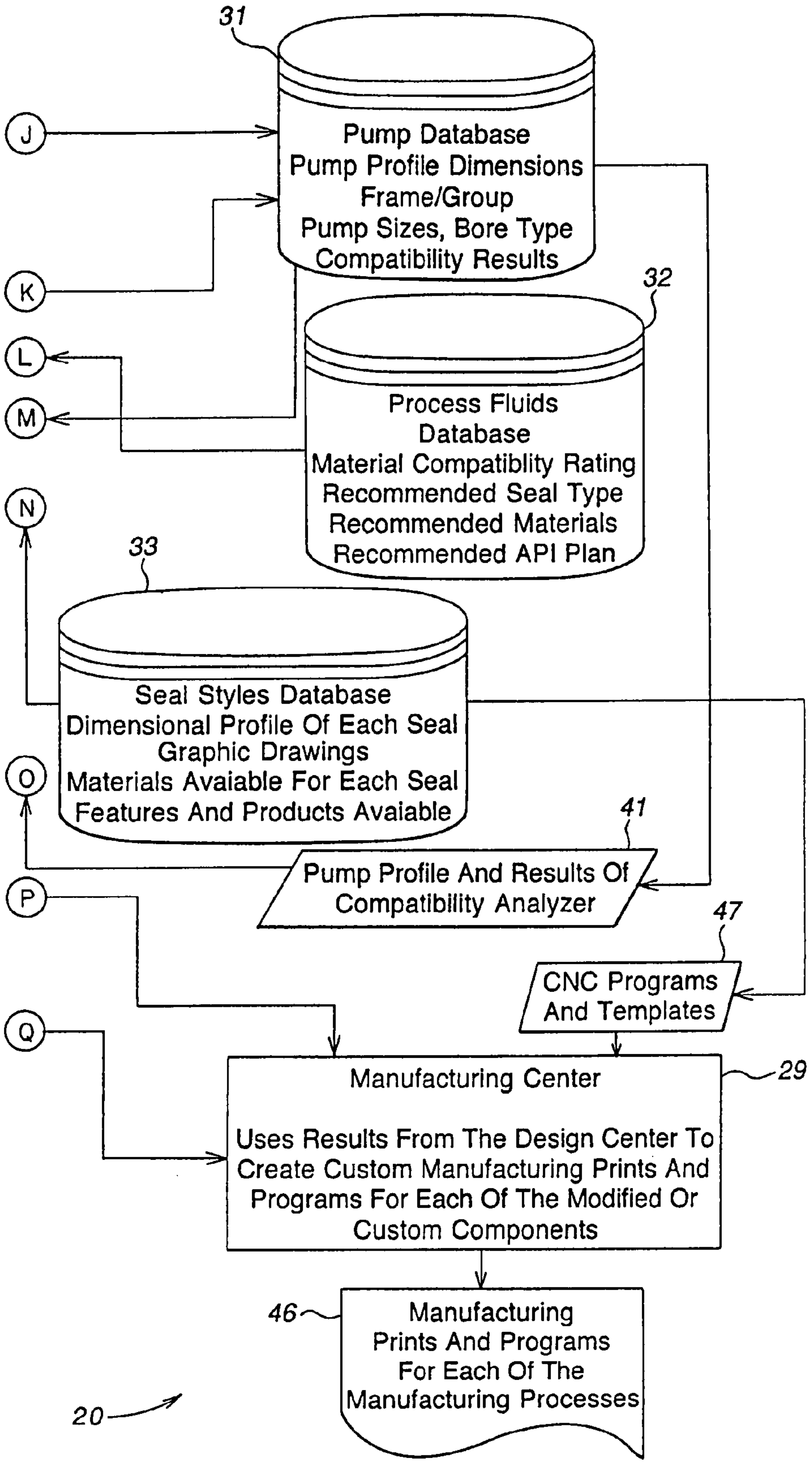

FIG. 2 illustrates a block diagram of a system 20 in one embodiment. The system includes an input module 21 which enables the user to select a customer or add a customer to a database, select a process fluid, enter environmental data and select from three paths through the system. A new customer 43 may be added to the customer database 30. The customer identifier is used to return information about the customer as indicated at 44. From the input module, a user may invoke a seal specifier 22 which selects a seal, recommends materials, allows the user to select either equipment modifications or seal modifications and recommends various features and products. The profile of a selected seal is output as indicated at 40. A new pump definition module 24 also may be activated through the input module 21. This module allows a user to enter information from which a new pump record and pump dimensional profile is created. A compatibility analyzer 26 compares dimensions of the new pump record to seal dimensions in a seal styles database 33. The results from the compatibility analyzer 35 are added to the pump database 31, along with the pump dimensional profile, frame/group, pump sizes, bore type and other compatibility results for other pumps. The input module 21 also allows the user to activate an existing pump selector 25. Information about a pump profile, as indicated at 36, may be used to search a pump database 31 to return profiles 38 of selected pumps.

The customer database 30 includes a customer identification number, customer name, customer contact information, and may include an identification of the distributor, a logo for the distributor, and an identification of any discount amount for that particular customer. Various other kinds of data also may be kept for each customer. This information is used by the proposal generator 23 to tailor a proposal 27 to a particular customer. In one embodiment, customer discounts are hidden from an end user if the user is not the manufacturer.

The pump database 31 includes data which describes a large number of pumps. The database also may specify other kinds of equipment, depending on the kind of mechanical part the system is being used to select. The pump database 31 may include, for each pump, data describing the seal sizes for the pump, the frame or group by which the group is categorized, the pump size, the bore type, a complete dimensional profile, and compatibility results for seal models.

The seal styles database 33 includes a dimensional profile of each seal, graphical drawings, materials available for each seal, and other features and additional products available, along with CNC programs and templates 47. In particular, the seal styles database 33 defines metal materials, face materials, and elastomers for each seal style. It also may contain a complete listing of compatible optional features and additional products for each seal. A dimensional profile for each seal as well as a complete set of drawings or graphics for each seal model, template CNC programs for the manufacturing process also may be stored in this database 33. Generally, the seal styles database 33 is defined and maintained by a seals manufacturer.

A process fluid database 32 provides characteristics and recommendations of the selected process fluid provided by the input module 21, as shown in 37. In particular, the process fluids database 32 includes, for each fluid which may be pumped by the equipment, a material compatibility rating for the pump materials, a recommended seal type, recommended materials, and a recommended American Petroleum Institute (API) plan for the seal. Generally, the process fluids database 32 is defined and maintained by the seal manufacturer.

The profile of the selected pump 38, the characteristics and recommendations of process fluid 37 and the dimensions and graphics of a selected seal 39 from a seal styles database are provided to a seal specifier 22, discussed above. The seal specifier 22 uses the chemical characteristics and recommendations 37 from the process fluid database 32, the pump profile selected 28 and the seal dimensional profile 39 to create a profile of a selected seal 40. The profile of a selected seal 40, dimensions and graphics of a seal 39 and a pump profile and results of compatibility analyzer 41 are input to the design center 28. The design center uses pump and seal profiles to draw and calculate dimensions for modified and custom seal components, and outputs results as indicated at 42.

The CNC programs and templates 47 from the seal styles database 22 for the selected seal and the result of the design center 42 are input to a manufacturing center 29 and proposal generator 23. This manufacturing center uses results from the design center to create custom manufacturing prints and programs for each of the modified or custom components, as output at 46, for manufacturing the components. In particular, the manufacturing center uses the dimensions defined by the design center 42 and inserts them into template CNC programs 47 from the seal styles database 33 for the selected seal. These programs are downloaded directly into CNC machinery for manufacturing of a component.

The results of the design center 42 also are provided to a proposal generator 23. The proposal generator 23 also receives address and discount information 45 about the selected customer. The proposal generator produces drawings, price, modification notes, warnings, bills of materials, order forms, dimension verification forms and plants standardization surveys, as described below, from which quotation proposals 51 may be produced. An order processing module 50 receives a quotation proposal 51 to produce an order 52 which is provided to the manufacturing center 29.

The system also may include an independently accessible promotion and advertising module 48 and post sales service and support module 49 which provide additional information for use by a sale person or factory, distributor, etc.

In order to create the pump profile and seal styles databases, information from standard pumps and seals may be input into the database. The compatibility analyzer then may be executed to determine the compatibility of each pump with each seal. The results of these compatibility analyses may be stored in the pump profile database. In this manner, known modifications for common seals and common pumps may be stored in the database and need not be recomputed. As a general process, any modifications created by this system may be stored in the database for future use.

In operation, a user activates the input module 21 to enter new customer data or to select an existing customer, to enter environmental data and to select the relevant process fluid. The user then may proceed to the seal specifier 22 to select a seal if the desired seal is known. If the part number for the desired seal is not known, and if the pump is defined within the database 31, then the user may activate the existing pump selector 25. Pump selector 25 may search for a pump in the database based on dimensions, frame or group, part number, or other information. If the pump is not in the pump database, the new pump definition module 24 may be activated. When the new pump definition module 24 is used to add a new pump to the database, the compatibility analyzer 26 performs a compatibility analysis based on the definition of the new pump with respect to the various seals in the seal database and updates the pump database 31 to include this data relating to the new pump. After a pump has been defined or selected, the seal specifier 22 may be activated by the user. The seal specifier 22 then accesses the pump database 31, which includes the definition and compatibility analysis for any existing and new pumps defined by the user. The seal specifier 22 also allows the user to the select seal style, or to review a list of all seals. The seal database also may include a cross-reference to indicate that the seal is a replacement for another manufacturer's seal.

When no standard seal model fits the selected pump, the user has two options. First, the seal specifier 22 provides a special seal design which fits the equipment without modifications to the equipment. Second, the seal specifier 22 may provide a standard seal and specifications of modifications to be made to the equipment to fit the seal.

The seal specifier 22, using the process fluids database recommends materials and may provide a list of all available materials with compatibility ratings for the seal model in use with the specified process fluid.

After the seal specifier 22 has completed a profile of the selected seal, the design center 28 designs, draws and calculates dimensions for each component of the seal, which are then provided to proposal generator 23.

The proposal generator 23 generates output forms, including information such as drawings, dimensions, price quotations, modification notes for the seal or the equipment, warnings, bills of materials, a dimension verification form, and an order form. The dimensional verification form is provided to the user to ensure that the user has properly measured dimensions of the equipment.

The results from the design center also are used in the manufacturing center. The manufacturing center retrieves template CNC programs which are part of the seal styles database. The template programs include machining operations without dimensions. The dimensions are inserted from the information from the design center. After modification, the templates CNC programs with the dimensions of the seal are downloaded into CNC machinery to produce the new seal.

The various modules in this system may be implemented as computer programs on a computer system, such as described in more detail below. It should be understood that each of the modules and databases may be separate computer programs, which may be executed on separate computers and by separate entities. Various modules may be interconnected via programming procedures, or may be programs which share data files on a computer or may be separate computers interconnected by a computer network. The actual sharing of information among the modules may be performed in any manner.

In particular, the system may be implemented as a combination of software and data that may be installed and operated by a user on one or more machines to provide all functions relating to mechanical seal selection. In this arrangement, data for the various databases may change over time and a manufacturer would periodically provide updates to the users of the software and data. Such updates may be provided using any means of electronic transmission or through delivery of a storage medium containing the information. Also in this embodiment, a manufacturer may wish to collect changes to databases made by their users in order to continually update their databases of pumps, process, fluids and seals.

In another embodiment, the seal specifier 22 is provided to a user. The compatibility analyzer 26, design center 28 and manufacturing center 29 may be maintained by a manufacturer. In another embodiment, the seal specifier and compatibility analyzer may be accessible to a user. In this embodiment, the design center 28 and manufacturing center 29 are maintained by the manufacturer. In another embodiment, a user may have access to the user interface of the seal specifier, for example, through a public computer network such as the Internet, or through another remote access medium. In another embodiment, the seal specifier 22, the compatibility analyzer 26 and the design center 28 may be provided to a user. The manufacturing center 29 in such an instance may be maintained by the manufacturer. Various other embodiments also are possible.

Figure 3A:
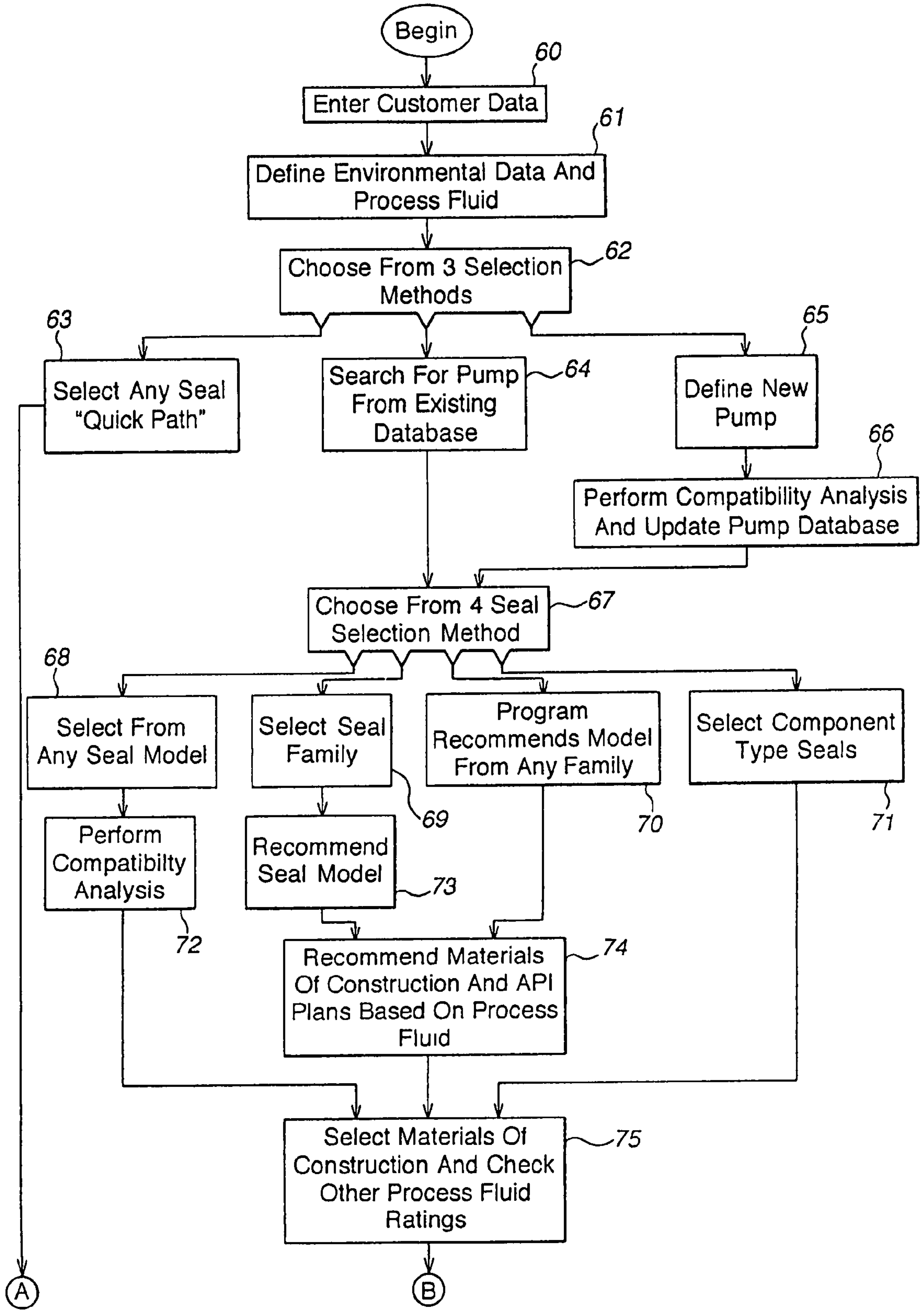
FIGS. 3A and 3B together comprise a flowchart illustrating, according to one embodiment, a process performed by the seal selection system shown in FIG. 2.
Figure 3B:
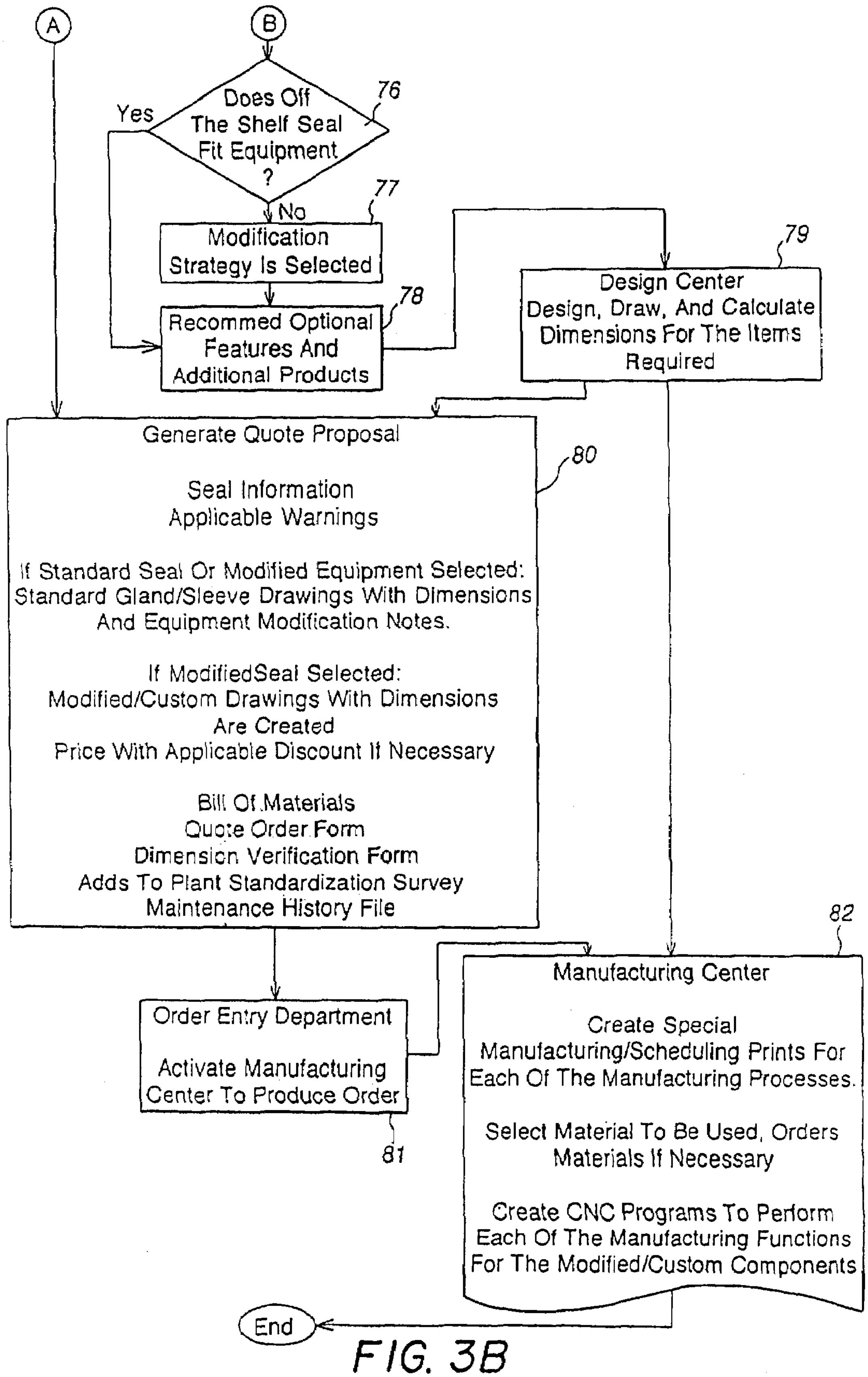
Figure 4:
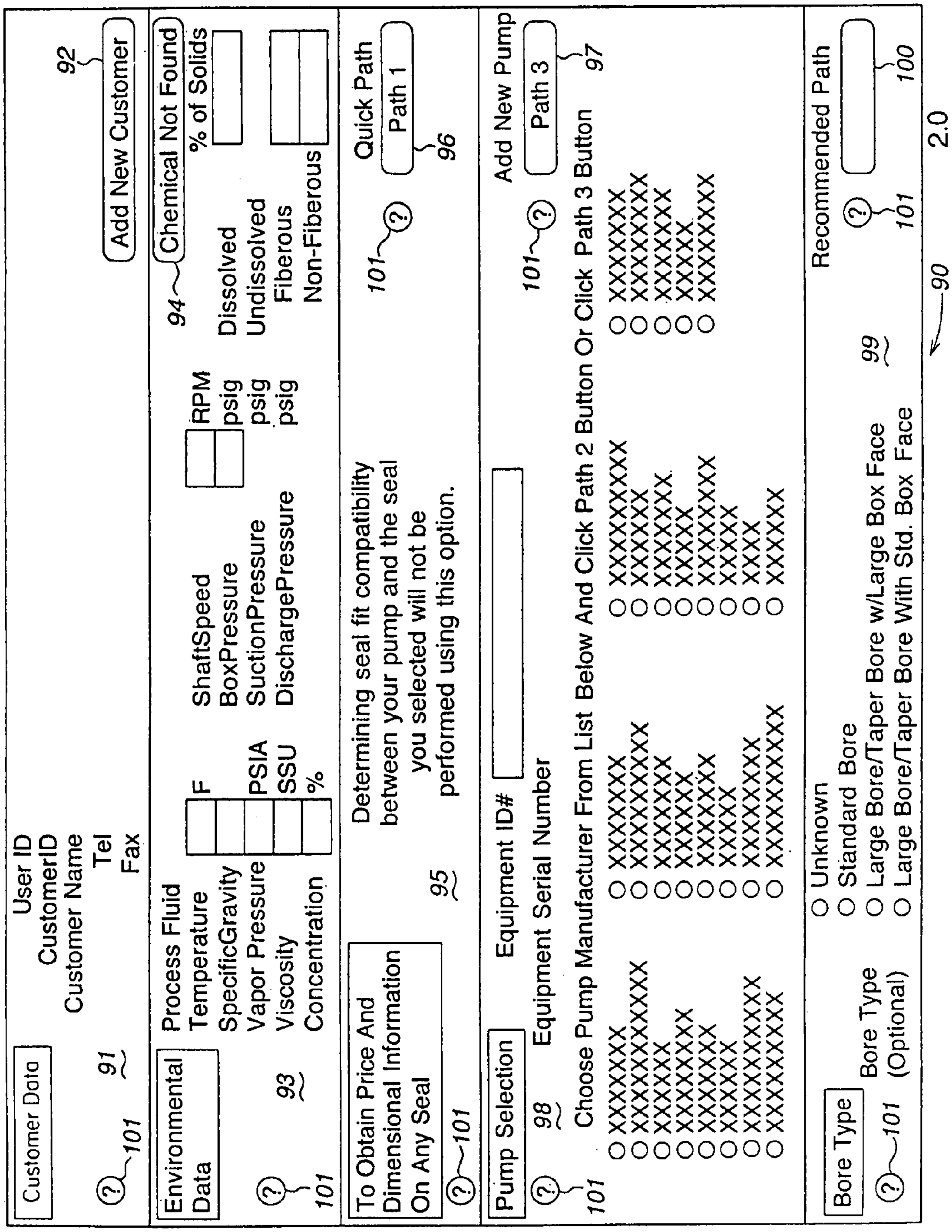
FIG. 4 is a representation of a screen display which prompts a user to enter customer information and seal selection information.
Figure 5:
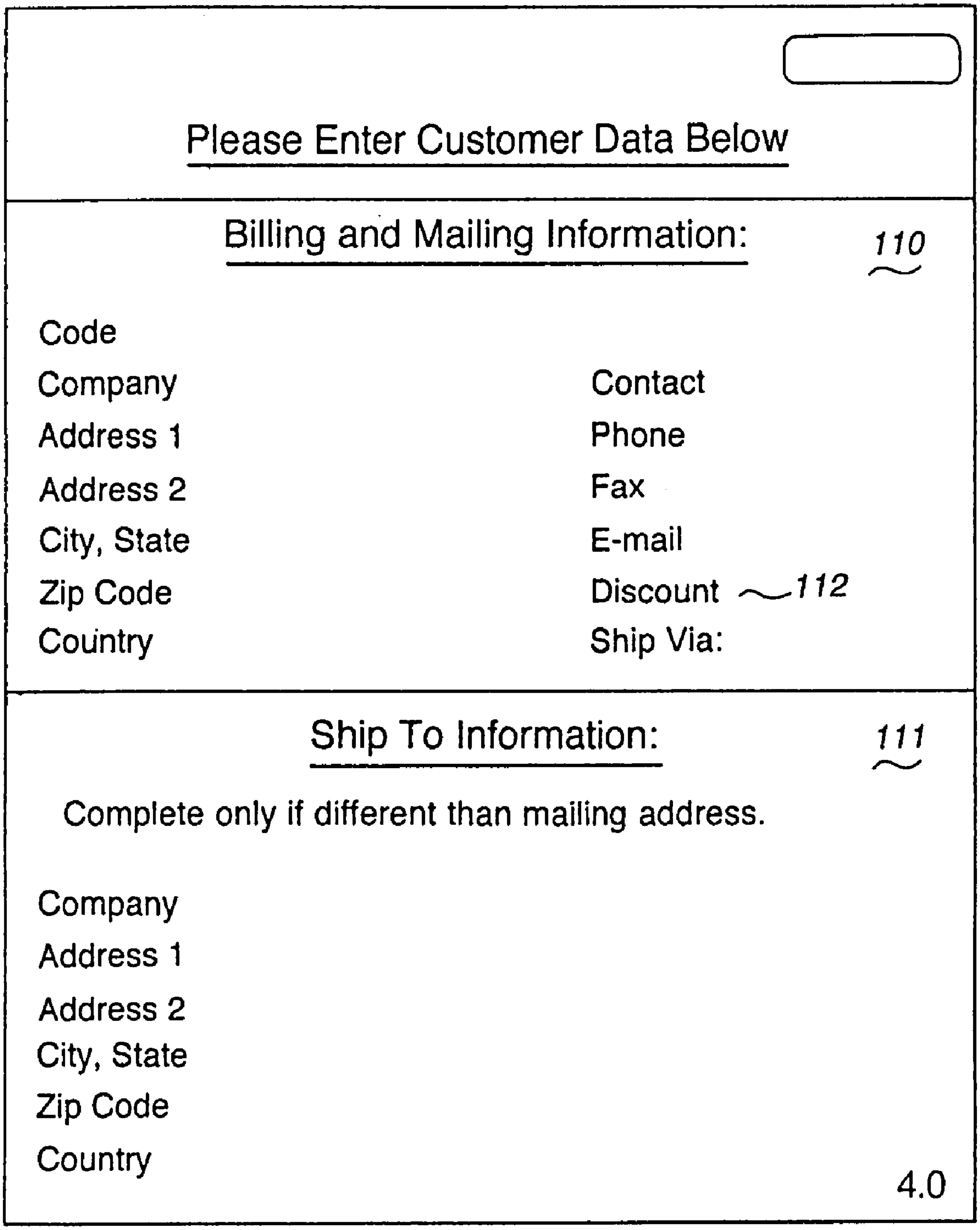
FIG. 5 is a representation of a screen display which prompts a user to enter information about a new customer.
Figure 7:
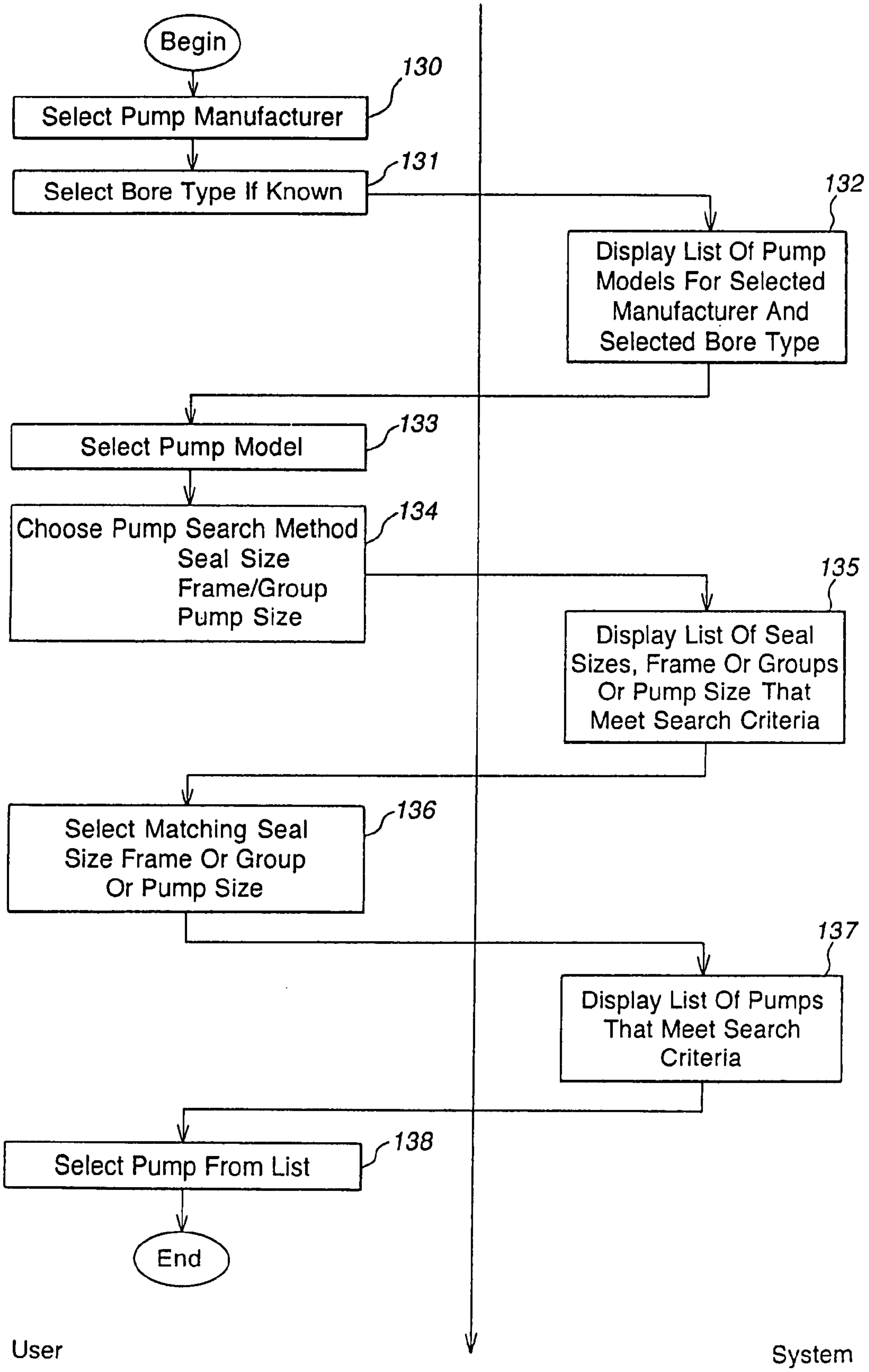
FIG. 7 is a flowchart showing more detail of a step, in FIG. 3A, of searching for a pump in an existing pump database.
Figure 9:
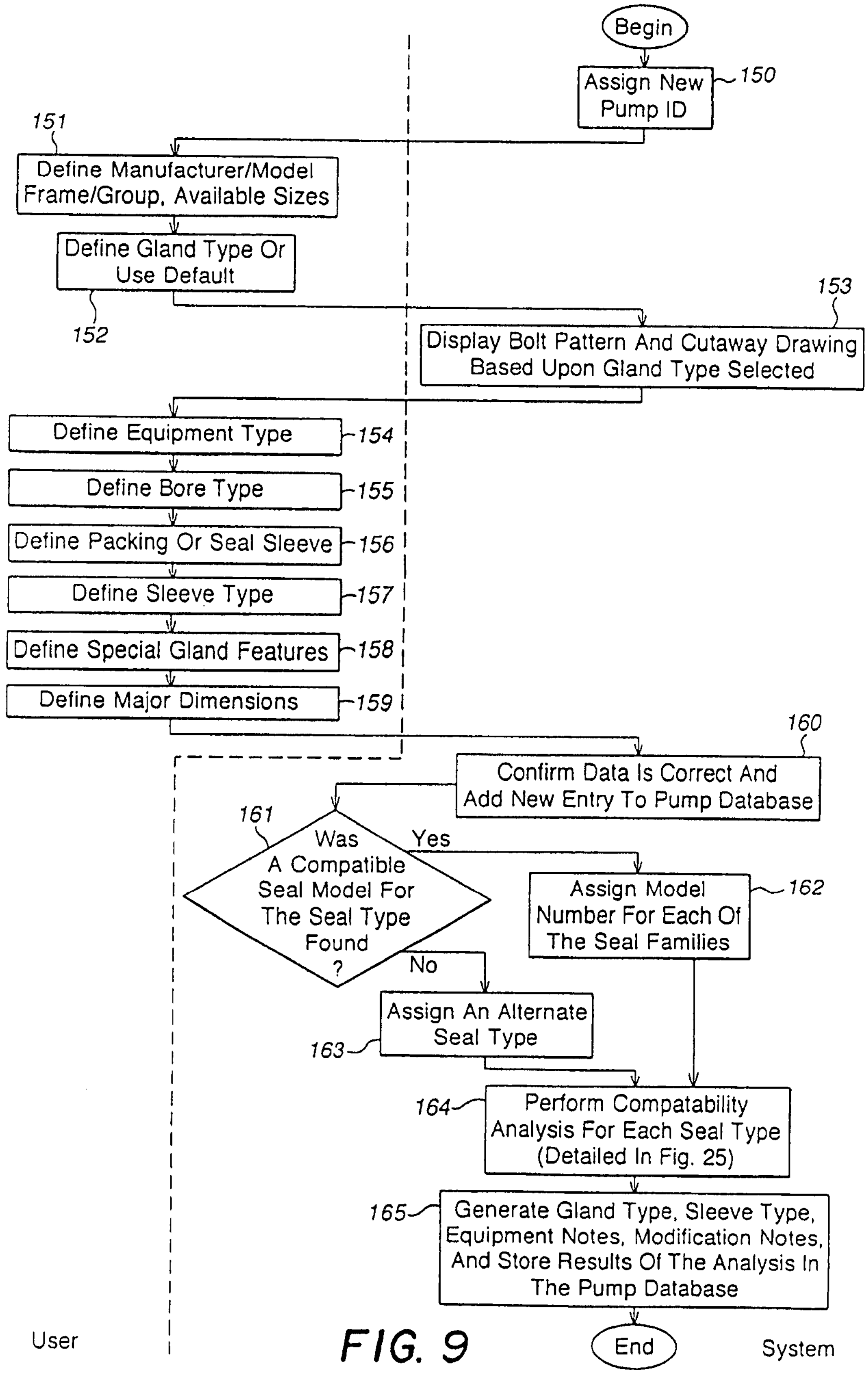
FIG. 9 is a flowchart showing more detail of a step, in FIG. 3A, of defining a new pump which is not in the existing pump database.

FIGS. 3A and 3B illustrate in more detail a process through which a seal may be selected using the system of Figs. The process begins by the user entering customer data in step 60. FIGS. 4 and 5 illustrate graphical user interfaces for this function. Also using a display such as shown in FIG. 4, environmental data and process fluids may be defined in step 61. After input of this information, the user may choose among a number of selection methods in step 62. In this embodiment, there are three selection methods. The first selection method involves simply selecting a known seal, in step 63, which is described in more detail below in connection with FIG. 6. A pump may be searched from an existing database in step 64, which is described in more detail below in connection with at least FIGS. 7 and 8. A new pump may also be defined in step 65, as is described below in connection with at least FIGS. 9 and 10.

When a seal is selected in step 63, a quote proposal is generated in step 80, which is described in more detail below in connection with FIGS. 30 through 36. An order entry department activates a manufacturing center to produce an order in step 81. A manufacturing center then may create special manufacturing and scheduling prints for the manufacturing processes, may select material to be used, may order materials if necessary, and may create programs for computer numerically controlled equipment for manufacturing modified or custom components. These manufacturing center operations are described in more detail below in connection with FIG. 37.

Figure 15:
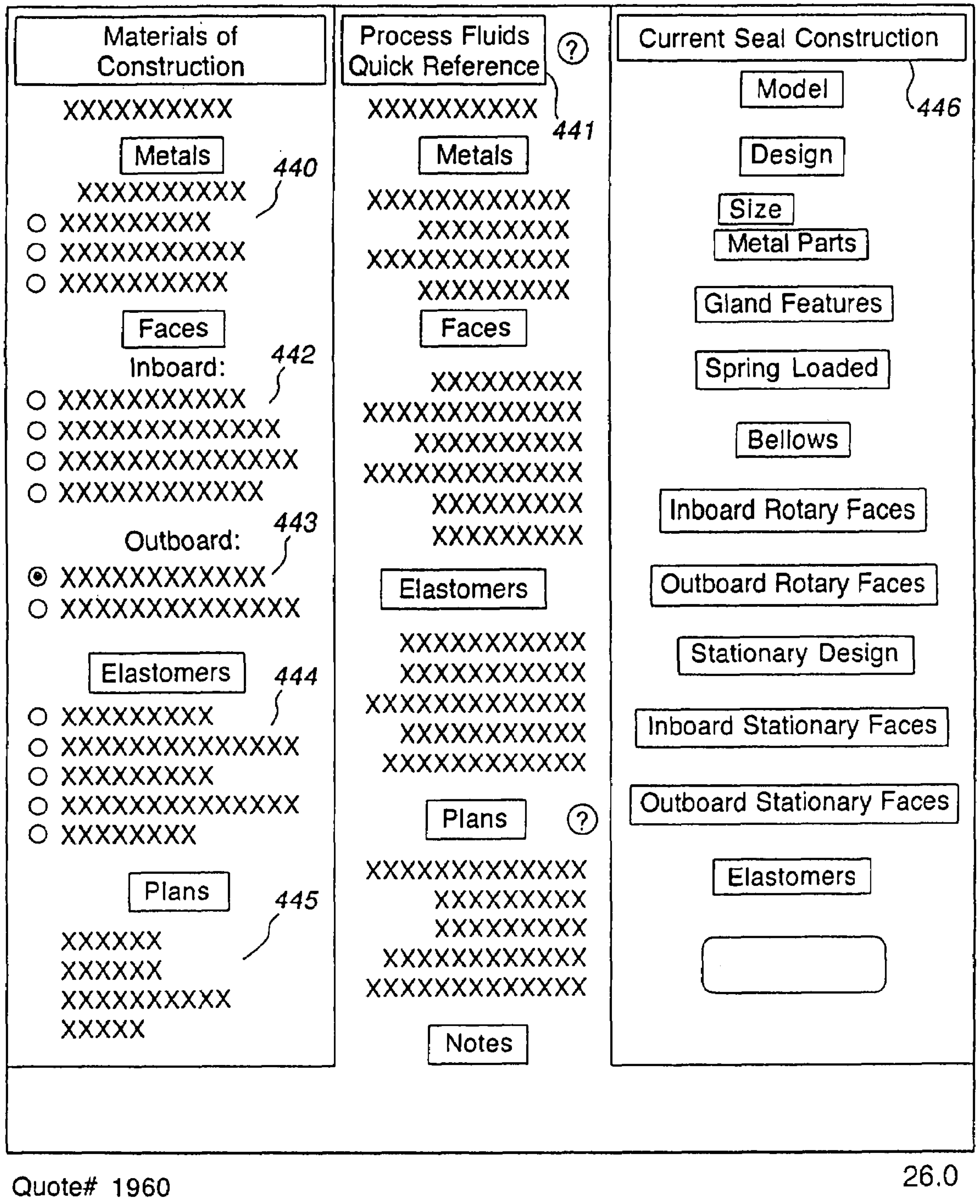
FIG. 15 is a representation of a screen display which displays recommendations made by the system about materials of construction and which prompts a user to select materials of construction.
Figure 16:
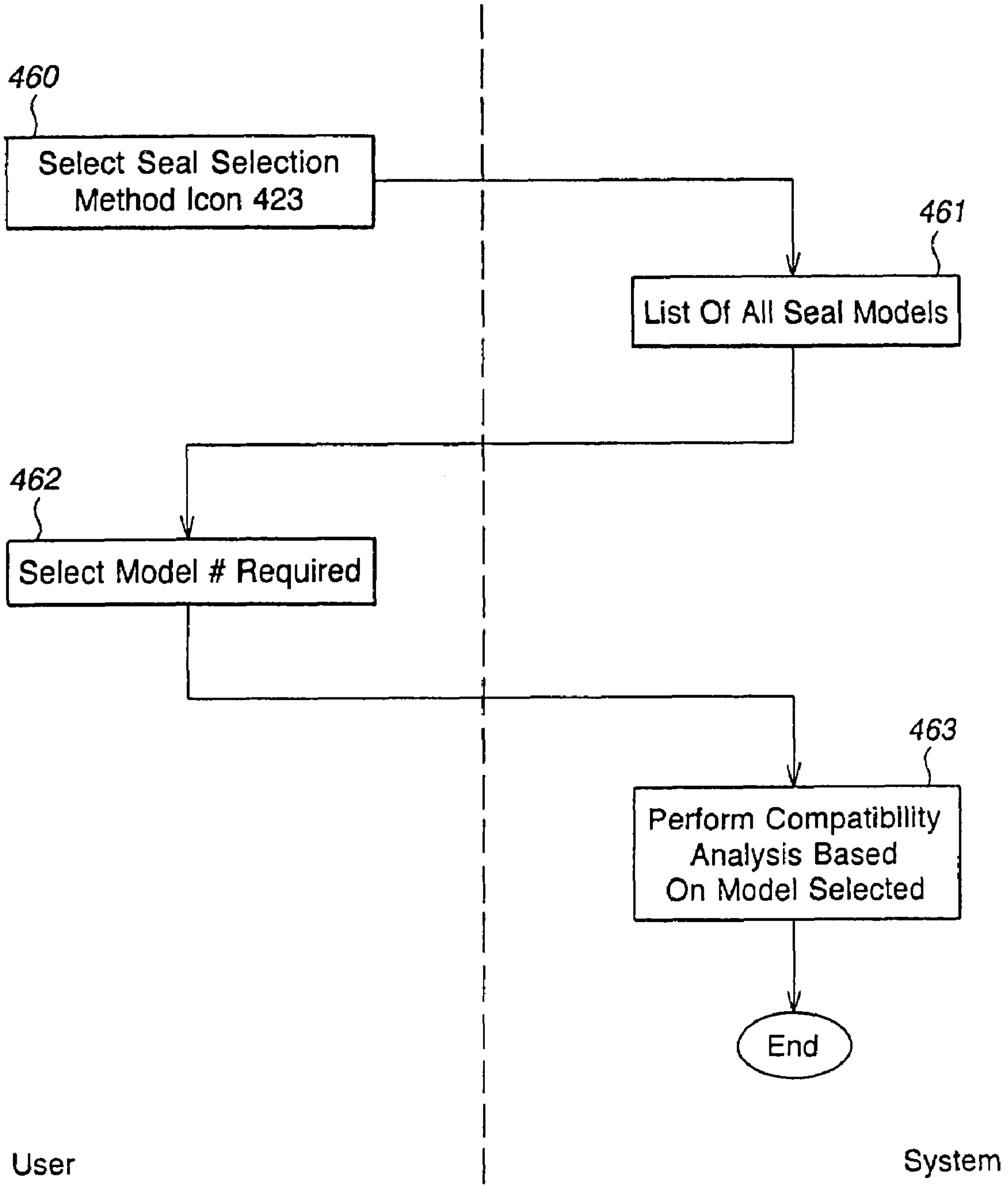
FIG. 16 is a flowchart describing the selection process performed for FIG. 14 icon 123.
Figure 20:
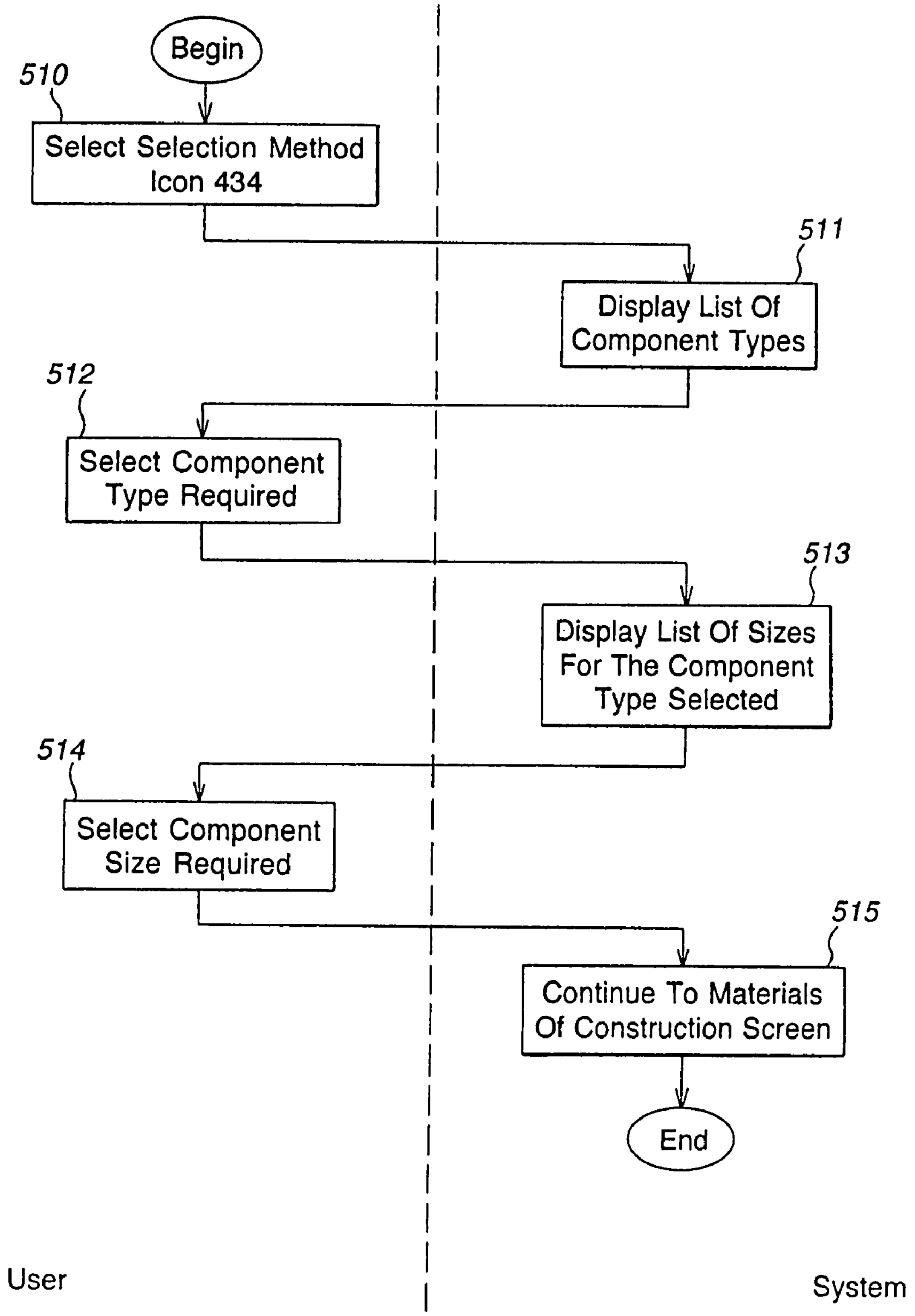
FIG. 20 is a flowchart describing the selection process performed for FIG. 14 icons 134.

If the user elects to search for a pump from an existing database, in step 64, the user then may choose from a variety of seal selection methods, as indicated in step 67. A graphical user interface for making this selection in one embodiment is shown in FIGS. 14 and 15. One method is to select from available seal models in step 68. This method is described in more detail below in connection with FIG. 16. A compatibility analysis is then performed in step 72. The materials of construction and process fluid rating are selected and checked in step 75, which is described in more detail below in connection with FIG. 15. A component type seal also may be selected in step 71, as another selection method, which is described in more detail below in connection with FIG. 20.

Another seal selection method is to select the seal family in step 69. This step is described in more detail below in connection with FIG. 19. A seal model is then recommended in step 73. Another method involves recommending a model from any family of seals in step 70. This step is described in more detail below in connection with FIG. 17. Either of the last two methods concludes with a recommendation of materials and construction and API plans based on the process plan.

All of these methods of selecting a seal conclude with step 75 of selecting materials of construction and checking other process and fluid ratings, which is described in more detail below in connection with FIG. 15.

After step 75, it is then determined if a standard seal fits the indicated equipment in step 76. If not, a modification strategy is selected in step 77, which is described in more detail below in connection with FIG. 22. Optional features and additional products are recommended in step 78, which is described below in more detail in connection with FIG. 23. In step 79, a design center designs, draws and calculates dimensions for the selected items. This step is described in more detail below in connection with FIG. 24.

After processing by the design center, quote proposals may be generated in step 80 and a manufacturing center may generate manufacturing information in step 82, as described above.

Each of the steps in FIGS. 3A and 3B will now be described in more detail in connection with FIGS. 4 through 37. FIG. 4 is a representation of a screen display 90 which prompts the user to enter customer data and other information. The screen display 90 is segmented into different areas for different data and options selectable by the user. For example, in customer data area 91, the user may select a user ID and customer ID, if the customer database 30 (FIG. 2) includes a description of the customer. If the customer has been granted a discount, the system displays the amount of the discount within the customer data area 91. At any time, the user may select any help icon 101, for which the system may provide textural information to guide the user through the seal selection process. The system also may have a training program to educate the system user on how to use the screens of the program or to provide technical assistance.

Referring now to FIG. 5, if the customer database 30 does not include a description of the customer, the user may select new customer icon 92 (in FIG. 4), after which the system displays a new customer data entry screen as shown in FIG. 5. The user then fills in the billing and mailing information of the customer in area 110 and the "ship to" information in area 111. The user also sets the customer discount in area 112. This information may be stored in the customer database 30 (FIG. 2).

Referring again to FIG. 4, as in step 61 of FIG. 3, the user defines environmental data and at least one process fluid for which the replacement or new seal will be used, by filling out sections of environmental data entry area 93. The data includes a name of the process fluid. If the defined process fluid is not found within the process fluids database 32, the user may select the "chemical not found" icon 94. The system then displays guidelines for proceeding, or prompts the user to contact the manufacturer to define the applicable process fluid. In addition, the manufacturer may populate the process fluid database 32 if desired.

Environmental data, entered by the user into area 93, includes factors such as, but not limited to, operating temperature, specific gravity, vapor pressure, viscosity, concentration, shaft speed, box pressure, suction pressure, discharge pressure, and percent of solids. Within the percent of solids, a percentage of dissolved solids may be defined as well as a percent of fibrous undissolved solids and percentage of non-fibrous undissolved solids. After the environmental data and process fluid data have been entered, the user may choose from among three selection methods, as indicated in step 62 of FIG. 3.

In the first method, the user activates the Path 1 icon 96 within the seal information area 95, and is shown the quick path screen (FIG. 6) allowing the user to select the seal directly. (step 63 of FIG. 3). A second selection method selectable by the user by selecting icon 100 is to search from the existing pump database (step 64 of FIG. 3). Details of this option are described in more detail in connection with the flow chart of FIG. 7. A third selection option is to define a new pump (step 65 in FIG. 3), the details of which are described below in connection with the flow chart of FIG. 9 and screen display of FIG. 10. This path is accessed by selecting icon 97 on FIG. 4.

The first method, activated using icon 96 in FIG. 4, will now be described in more detail in connection with FIG. 6. Through a series of drop down menus, the user is prompted to enter a part number, for seals, kits, faces or other part in area 120. In this embodiment, the first digit represents the metallurgy; the second digit represents the elastomer (o-ring); the next four digits represent the seal model number; the next four digits represent the seal size; the next digit represents the inboard face; and the final digit (only on double seals) represents the outboard face material. The user is then prompted in area 121 to select optional features. In area 122, spare parts kits and factory repairs are quoted. Area 123 displays additional products available, from which the user may select. The quote proposal on the item selected is provided to the user, as described below in connection with FIG. 30. This path prepares a quote proposal for any seals. With this option, the compatibility analysis between the pump and the selected seal is not performed. However, this option allows experts to use the system quickly and efficiently to obtain a price quote, or untrained individuals to select a seal using a part number The second selection method, activated via icon 100 in FIG. 4, will now be described in connection with FIGS. 7 and 8. In step 130, the user selects a pump manufacturer from the list displayed in pump selection area 98 of FIG. 4. Then, if the bore type of the pump is known, it may be selected in step 131 within bore type area 99. For example, the bore type may be unknown, standard bore, large bore/taper bore with large box face, or large bore/taper bore with standard box face. A help button may be located in the section to provide a graphic describing the categories to aid the user in selecting the correct bore type.

In response to the input bore type and pump manufacturer, the system displays a list of pump models for the selected manufacturer and selected bore type in step 132, from the pump database 31. The user selects a pump model from this list, in step 133.

After a pump model has been selected, the user has several for searching for the pump profile. In particular, the user may search the database by seal size, frame or group, or by pump size, in step 134. The option of searching by serial number also may be provided. If an identification tag is not readable and/or original paperwork about the pump is lost, at least one of the three search engines should enable a positive identification of the pump. In step 135, the system displays a list of matching seal sizes, frame or group, or pump sizes, depending upon the search option selected. The user then selects the choice which matches the equipment or selects unknown for a complete listing in step 136.

In step 137, the system displays a list of pumps within the selected pump model which meet the search criteria, and in step 138 the user selects a pump from the list of pumps displayed. A sample screen for pump selection is shown in FIG. 8, in which the manufacturer 140 and the number of matching pumps found 141 are listed, and a description for each of the matching pumps is provided in area 142. For each matching pump profile, a selection icon 143 allows the user to select the pump profile which matches the pump under consideration. The user may search again for a pump profile by activating the search again icon 144. A physical dimensional verification form may be provided to the user to allow the user to determine if the pump or equipment has been modified from its original standard dimensions. If the equipment has been modified, the user may enter the modifications as if the pump were a new pump, as described below in connection with FIGS. 9 and 10.

Another method for seal selection, activated through icon 97 in FIG. 4, will now be described in connection with FIGS.

Figure 10B:
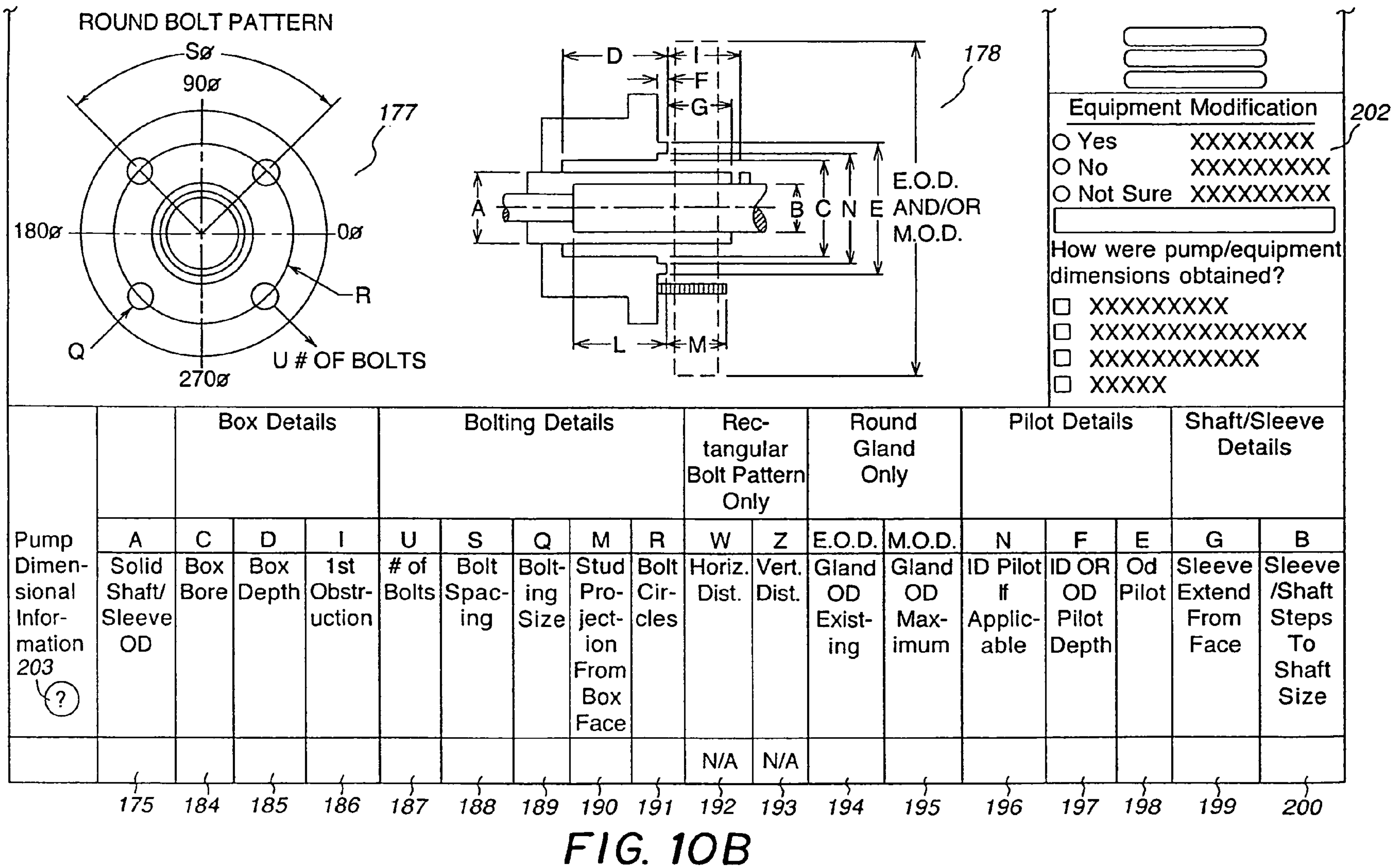
FIG. 10 is a representation of a screen display of the seal selection system which prompts a user to define a new pump which was not previously represented in the pump database.

9 and 10. In one embodiment, a screen such as shown in FIG. 10 is used to receive data defined by the user. In step 150 (FIG. 9), the system assigns a new pump identifier (area 170 of FIG. 10) which allows the system to provide a unique definition of the pump under consideration. In step 151, the user enters, if known, information such as the name of the pump manufacturer into area 171, the model in area 172, the frame or group into area 173, the pump sizes available into area 174, and the solid shaft/sleeve outer diameter into area 175. The system recommends the standard default gland type or allows the user to select a special gland type in area 176, (step 152) only if the user is sure the standard default gland does not fit. The customer may visually select a gland type by viewing the visual geometry of the existing seal or the equipment the seal fits on. The user then may select any gland type. Example glands are, but are not limited, to standard, round with drill holes, round with rectangular bolt patterns, glands with flats and drill holes, special elliptical designs, round glands with slots on horizontal, special bar stock designs, round glands with multiple bolt holes, and standard glands modified.

In step 153, the system displays a bolt pattern graphic in area 177 for the defined gland type and an equipment cutaway drawing in area 178, as shown in FIG. 10. The user defines the equipment type (step 154) in area 179, defines the pump bore type (step 155) in area 180, defines the sleeve style, e.g., packing or seal sleeve, (step 156) in area 181. The system recommends the standard default sleeve type or allows the user to select a special sleeve type in area 182, (step 157) only if the user is sure the standard default sleeve does not fit. The customer may decide visually on the sleeve type, for example by viewing the visual geometry of the existing seal or the equipment. The user then may select any sleeve type. Example sleeve types include, but are not limited to: standard sleeve, straight sleeve with non-standard ID, hook sleeve, step sleeve, sleeve extensions, and special sleeve designs. The user then may define special gland features if requested (step 158) in area 183. Example gland features include, but are not limited to, ID Pilot Gland, OD Pilot Gland, and O-Ring Groove Gland.

The user then defines major dimensions of the pump (step 159) in areas 184-200. The major dimensions include box bore in area 184, box depth in area 185, first obstruction in area 186, number of bolts in area 187, bolt spacing in area 188, bolting size in area 189, stud projection from box face in area 190, bolt circles in area 191, horizontal distance in area 192, vertical distance in area 193, existing gland outer diameter in area 194, maximum gland outer diameter in area 195, ID pilot in area 196, ID or OD pilot depth in area 197, OD pilot in area 198, sleeve extends from the face in area 199, sleeve steps to shaft size in area 200. Horizontal and vertical distances are input only for glands with rectangle bolt patterns. The system may automatically enter "N/A" if a round bolt pattern has been selected. The locations of these measurements are displayed on the bolt pattern 177 and cutaway drawing 178, so that a user may take the measurements without undue training. A help icon 203 also may be used to present instructions about how to obtain valid information for the dimensions. The manufacturer, model and Solid Shaft/Sleeve OD also are input. The remainder of the information is optional. In area 201, the user is prompted to answer questions relating to the sources used to obtain the equipment dimensions. Example: physical measurements, from equipment prints, or from seal prints. The user also is prompted to confirm the equipment is still in its original state and if not, to explain the modifications made in area 202.

After the data described above has been entered by the user, the system confirms the data has been entered correctly and adds a new entry to the database (step 160). In order to reduce errors, input values (e.g., blanks, N/A, numeric values) are based on prompts to the user or pre-specified choices. The system also may provide an alarm if erroneous inputs have been entered or if required information is missing. The system confirms that each dimension is entered according to certain criteria. In particular, the system confirms that: the Solid Shaft/Sleeve OD is a numeric value; the Box Bore, Depth and First Obstruction dimensions are numeric values or a blank if unknown; the number of bolts is a numeric value or blank; the bolt spacing is a numeric value, a blank if unknown or a "U" if the spacing is unequal. The bolting size may be selected from a drop down menu of common bolting sizes, or a numeric value other than those listed may be entered, or the field may be left blank if unknown. The Bolt Circle and Stud Projection dimensions are numeric values or blank if unknown. The Gland OD Existing and Gland OD Maximum are numeric values or blank if unknown. The ID Pilot, Pilot Depth, OD Pilot, Sleeve Extends from Face and Sleeve Steps to Shaft Size are numeric values, or a blank if unknown or N/A if not applicable. An example of a file where this information may be may be stored is shown in FIG. 11, which is described in more detail below.

After adding the pump data in the database, in step 161, the system analyzes the pump dimensions provided in step 159 to determine the most compatible seal model for each seal type. FIG. 12, which is described in more detail below, represents a seal dimensional profile which may be used for this analysis.

All seals may be categorized by seal type, for example single cartridge seal, double cartridge seal, double cartridge seal with pumping ring, single cartridge model 3500 seal, metal bellows for chemical service, metal bellows for high temperature service, high pressure cartridge designs, double cartridge (gas barrier design), dry running single design for mixers, double cartridge for mixer with liquid lubrication or gas barrier design, split mechanical seals, component type seals, API (American Petroleum Institute) design seals, etc. The system accommodates any commercially available seal types and can be expanded to accommodate new seal types. The examples below are for common seal types: Single, Double, Double with Pumping Ring, 3500. Other type seals are not shown but may be calculated in a similar manner.

For single, double and double with a pumping ring, the following formula is used. If the seal size is less than 0.896 or greater than 5.020 no recommendation is made. If the seal size is between 1.021 and 1.145 or between 1.271 and 1.395, a narrow cross section seal is recommended. If the actual gasket outer diameter (FIG. 12, area 274) minus the box bore (FIG. 10, area 184) is greater than zero, the standard model is recommended. If the result was less than zero the larger bore model is recommended.

If a model is determined to be compatible in step 161, the system assigns a model number in area 210 of FIG. 11, (step 162). If no model is recommended, in step 163 the system assigns an alternate seal type in area 211 of FIG. 11. For example, if Style 3500 is not available in a 4.00 inch size, the system recommends an alternate of the standard single type seal.

In step 164, the compatibility analyzer performs a compatibility analysis, which is described below in connection with FIG. 13, for each potential seal model. In step 165, they system sets the "Seal Fits Equipment" notes (area 214), and the "Equipment Fits Seal" notes (area 215), and stores the results of the compatibility analysis in the pump database (areas 216-229). These steps complete step 66 of FIG. 3A.

An example of a seal dimensional profile is shown in FIG. 12. The profile includes, but is not limited to having, the seal size 250, minimum bore 251, maximum bore 252, inside length 253, outside length 254, minimum bolt circle for several bolt sizes, such as ⅜ (255), ½ (256), ⅝ (257), ¾ (258), the slot width 259, gland outer diameter 260, gland flat 261, sleeve outer diameter 262, gland length 263, bar gland length 264, o-ring position 1 (265), position 2 (266), position 3 (267), position 4 (268), position 5 (269), position 6 (270), actual casting outer diameter 271, actual slot inner diameter 272, outer diameter of shroud on casting 273, actual gasket outer diameter 274, counter bore in gland 275, bar shroud outer diameter 276, inboard balance diameter 277, outboard balance diameter 278, outboard internal obstruction 279, inboard internal obstruction 280, and internal depth obstruction 281. Additional fields may be displayed or added for other seal types where appropriate.

The compatibility analyzer performs a series of calculations, which is described in more detail below in connection with FIG. 13, which compare the pump dimensions, supplied by the user using the interface FIG. 10, to the seal profile dimensions, shown in FIG. 12.

These calculations are performed to determine if a standard or special design should be used to fit the pump. The results of the calculations are stored in the pump database and used later in the design center to engineer and design special seals and components. If modifications are suggested, the system recommends two options:

1. modifications to the seal so that the seal fits; and
2. modifications to the equipment so that the standard seal fits the equipment.

FIG. 11 illustrates a display for the results of the compatibility analyzer. Section 231 and 232 reflects the information entered by the user using the interface of FIG. 10. Sections 210-229 display information generated by the compatibility analyzer. In particular, this information may include the gland type in box 212, sleeve type in box 213, "Seal fits equipment" notes in box 214, "Equipment fits seal" notes in box 215, and the values of various calculations in boxes 216-229, which will now be described in connection with FIG. 13.

Figure 13A:
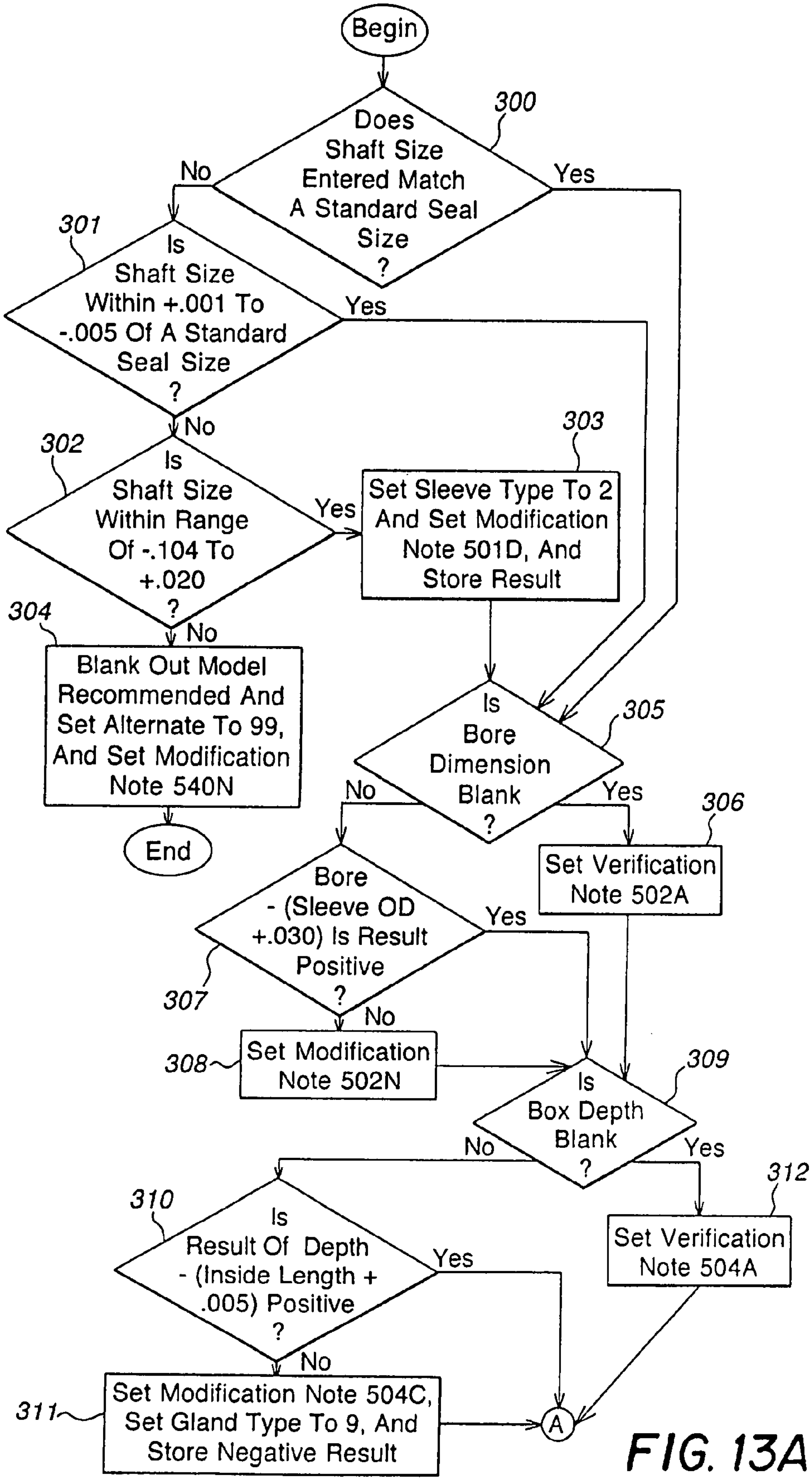
FIG. 13 is a flowchart illustrating in more detail the operations performed by the compatibility analyzer.
Figure 13B:
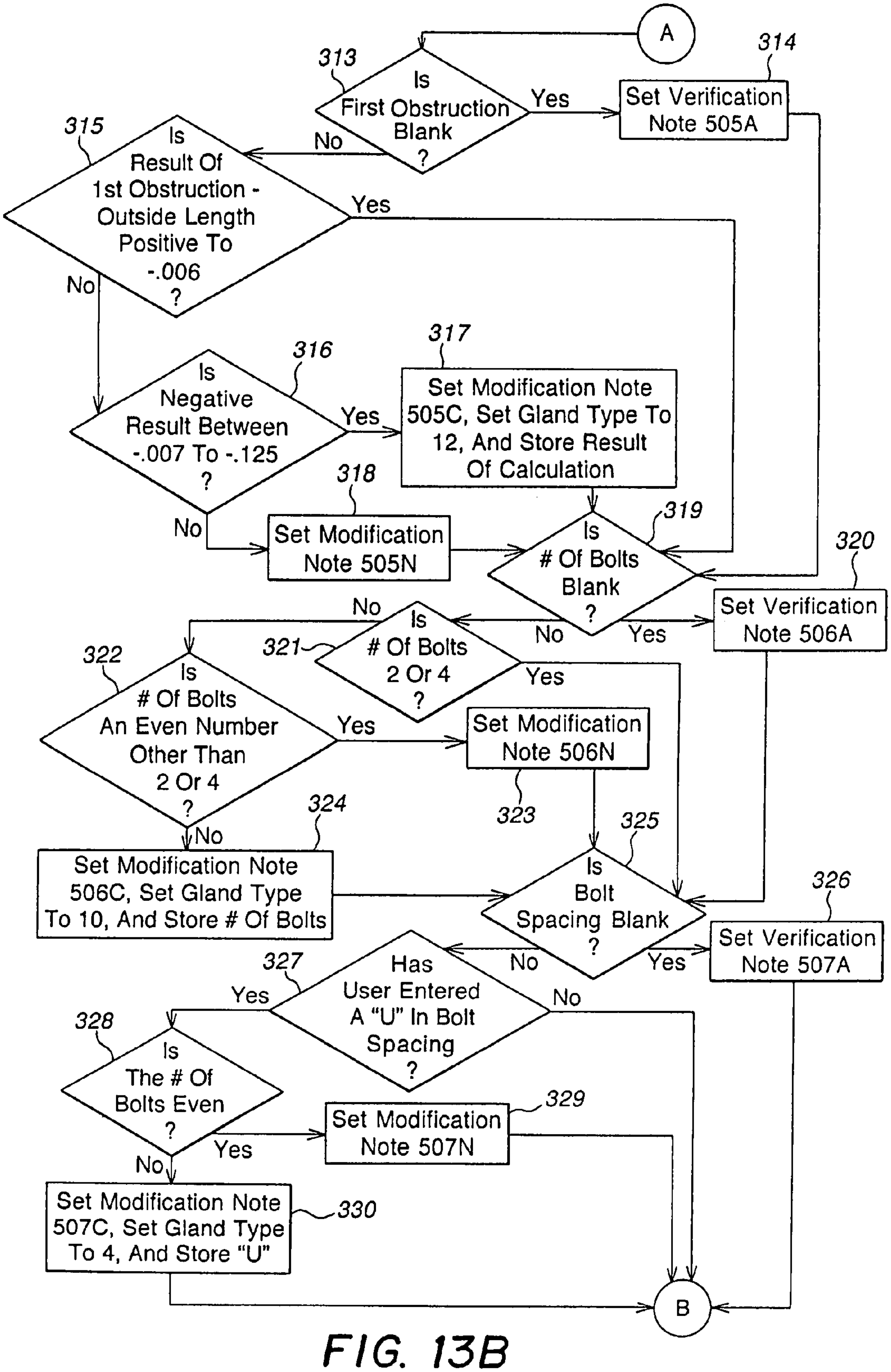
Figure 13E:
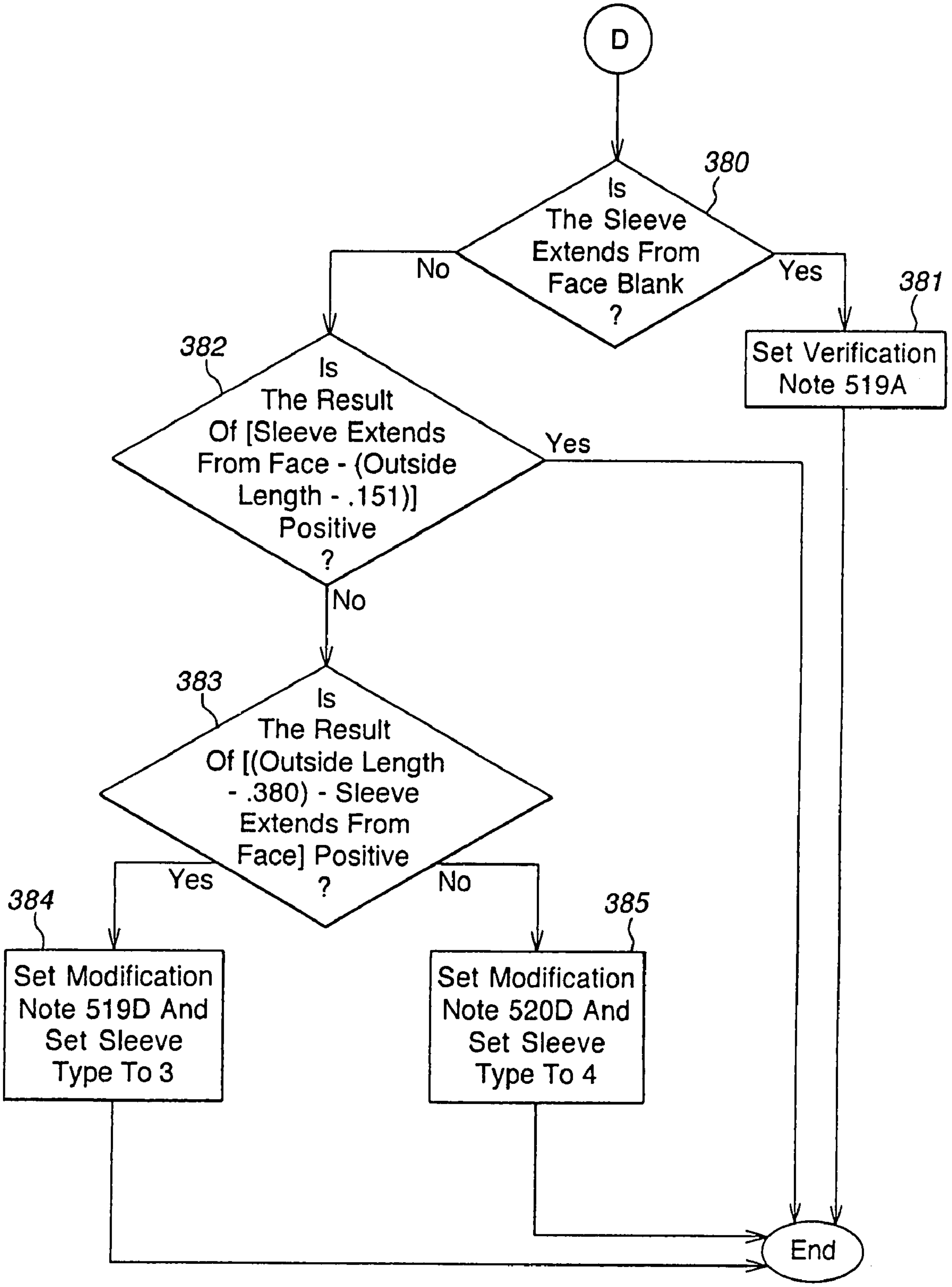

In FIG. 13, in step 300, the system matches the actual shaft/seal size from FIG. 10 area 175 to standard seal sizes from FIG. 12, area 250. If a match is found, the system continues to the "Seal fits in box" calculation, step 305. If an exact match is not found, in step 301 it is determined if the shaft/seal size is within the range of tolerance, e.g., +0.001 to −0.005, of a standard seal size. If the size is within this range, processing continues with step 305.

If the size is not within the desired range of the standard seal size, it is then determined, in step 302, if the shaft size is within the range of −0.104 to +0.020. If the size is within this range, the sleeve type is set to 2 in box 213 of FIG. 11, a modification note 501D is set in box 215 of FIG. 11 and the results are stored in box 229 in step 303.

"A" notes are verification notes which ask the user to verify a dimension not stored in the pump database. "C" notes are gland modification notes which explain what modifications the user must make to the equipment for a standard gland to fit and only seen on the "user will modify equipment" path. "D" notes are sleeve notes which explain what modifications the user must make to the equipment for a standard sleeve to fit and is only seen on the "user will modify equipment" path. "N" note are modifications the user must make to the equipment regardless of the modification strategy selected.

Processing then continues with step 305. If the size is not in the range, then in step 304 the model recommended is set to blank and the alternate (Box 211 of FIG. 11) is set to 99.

If the shaft size matches the entered seal size, or is within a desired range, as determined in steps 300, 301 and 302, processing continues with step 305. In step 305, it is determined if the box bore dimension (FIG. 10, area 184) is blank. If it is blank, the verification note 502A, in sections 214 and 215 of FIG. 11, is set in step 306 and processing continues to step 309.

If the box bore dimension is not blank, it is then determined if the difference between the box bore and the outer diameter of the sleeve, plus 0.030, is positive. The box bore is from FIG. 10, area 184 and the sleeve outer diameter is from FIG. 12 area 262. If this result is positive, processing continues with step 309. If the result is negative, a modification note 502N is set in area 214 and 215 of FIG. 11, and processing continues with step 309.

In step 309, it is determined if the box depth dimension (FIG. 10 area 185) is blank. If it is blank, in step 312 the verification note 504A is set in sections 214 and 215 of FIG. 11, and processing continues with step 313. If the dimension is not blank, in step 310 it is determined if the difference between the box depth and the inside length plus 0.005 is positive. The box depth is from FIG. 10 area 185 and the inside length is from FIG. 12 area 253. If the result is positive, processing continues with step 313. If the result is negative, in step 311 the modification note 504C is set in area 215, the gland type 9 is set in area 212, and the negative result is stored in area 216. Processing continues with step 313.

In step 313, it is determined if the first obstruction dimension (FIG. 10 area 186) is blank. If it is blank, in step 314 the verification note 505A is set in sections 214 and 215 of FIG. 11, and processing continues with step 319. If the dimension is not blank, in step 315 it is determined if the difference between first the first obstruction and outside length is positive to −0.006. The outside length is from FIG. 12 area 254. This difference if it is positive to −0.006, processing continues with step 319. If this difference is negative, processing continues with step 316. In step 316, it is determined if this difference is within the negative range of −0.007 to −0.125. If it is, in step 317 the modification note 505C is set in section 215, gland type is set to 12 in area 212, and the result of the calculation is stored in area 219. Processing continues with step 319. If this difference is not between the range, in step 318 the modification note 505N is set in both areas 214 and 215, and processing continues with step 319.

In step 319, it is determined if the number of bolts (FIG. 10, area 187) is blank. If it is, in step 320 the verification note 506A is set in areas 214 and 215 of FIG. 11, and processing continues with step 325. If it is not blank, in step 321 it is determined if the number of bolts is two or four. If the number of bolts is two or four, processing continues with step 325. If it is not two or four, in step 322 it is determined if the number of bolts is an even number. If it is even, in step 323 modification note 506N is set in areas 214 and 215, and processing continues with step 325. If the number of bolts is odd, in step 324 modification note 506C is set in area 215, gland type is set to 10 in area 212, the number of bolts is stored in area 218, and processing continues with step 325.

In step 325, it is determined if bolt spacing (FIG.10 area 188) is blank. If this field is blank, in step 326 a verification note is set in areas 214 and 215 of FIG. 11 and processing continues with step 331. If this field is not blank, in step 327 it is determined if the user entered "U" for uneven. If any value other than "U" was entered then processing continues with step 331. If the value is "U," then instep 328, it is determined if the number of bolts was even. If the number of bolts was even, in step 329 a modification note 507N is set in area 214 and 215, and processing continues with step 331. If the number of bolts is odd, in step 330 a modification note 507C is set in area 215, gland type is set to 4 in area 212, and the value "U" is stored in area 220. Processing then continues with step 331.

In step 331, it is determined if the bolt size (FIG. 10, area 189) is blank. If this field blank, in step 332 a verification note 508A is set in areas 214 and 215 and processing continues with step 335. If this field is not blank, in step 333 it is determined if the difference between the slot width and the bolting size is positive. The slot width is from FIG. 12, area 259. If this difference is positive, processing continues with step 335. If negative, in step 334 a modification note 508C is set in area 215, gland type is set to 12 in area 212, and a negative result is stored in area 220. Processing continues with step 335.

In step 335, it is determined if the bolt circle (FIG. 10, area 191) or bolt size area 189 is blank. If either is blank, in step 336 a verification note 509A is set in areas 214 and 215 and processing continues with step 339. If not blank, in step 337 it is determined if the difference between the bolt circles and the bolting size, less the actual slot inner diameter, is positive. The actual slot inner diameter from FIG. 12, area 272. If this result is positive, processing continues with step 339. If negative, in step 338 a modification note 509C is set in area 215, gland type is set to 12 in area 212, and the result is stored in area 221. Processing then continues with step 339.

In step 339, it is determined if the bolt circle (FIG. 10, area 191) is blank. If blank, in step 340 a verification note 510A is set in areas 214 and 215 and processing continues with step 350. If not blank, in step 341 it is determined if the difference between the bolt circle and the hex nut head maximum width across corners, less the outer diameter of the shroud on the casting, is positive. The hex nut head maximum width across corners is from FIG. 27 area 620 and the outer diameter of the shroud on the casting is from FIG. 12, area 273. If the result is positive, processing continues with step 342. If negative, processing continues with step 350.

In step 350, it is determined if the bolt circle (FIG. 10, area 191) is blank. If blank, in step 351 a verification note 511A is set in areas 214 and 215 and processing continues with step 355. If not blank, in step 352 it is determined if the difference between the bolt circle and the cap screw maximum head diameter less the outer diameter of the casting is positive. The cap screw maximum head diameter is from FIG. 27 area 622, and the outer diameter of the shroud on the casting is from FIG. 12, area 273. If this result is positive, in step 353 a modification note 530N is set in areas 214 and 215 and processing continues with step 355. If the result is negative, in step 354 a modification note 511C is set in area 215, gland type is set to 12 in area 212, and the result is stored in area 222. Processing then continues with step 355.

In step 342, it is determined if the bolt circle (FIG. 10, area 191) is blank. If blank, in step 343 a verification note 513A is set in areas 214 and 215 and processing continues with step 345. If not blank, in step 344 it is determined if the difference between the actual casting outer diameter and the sum of the bolt circle and the hex nut head maximum width across corners is positive. The actual casting outer diameter is from FIG. 12, area 271 and the hex nut head maximum with across corner is from FIG. 27, area 620. If the result is positive, processing continues with step 355. If the result is negative, processing continues with step 345.

In step 345, it is determined if either the bolt circle or bolting size is blank. If blank, in step 346 a verification note 514A is set in areas 214 and 215 and processing continues with step 355. If not blank, in step 347 it is determined if the difference between the actual casting outer diameter and the sum of bolt circles and bolting size is positive. The actual casting outer diameter is from FIG. 12, area 271. If the result is positive, a modification note 514N is set in areas 214 and 215 and processing continues with step 355. If negative, in step 349 a modification note 514C is set in area 215, gland type to 9 is set in area 212, and the result is stored in area 223. Processing then continues with step 355.

In step 355, it is determined if the existing gland outer diameter (FIG. 10, area 192) is blank. If blank, processing continues with step 357. If not blank, in step 356 it is determined if the difference between the outer diameter of the existing gland and the actual casting outer diameter is positive. The actual casting outer diameter is from FIG. 12, area 271. If the result is positive, processing continues with step 361. If negative, processing continues with step 357.

In step 357, it is determined if the maximum gland outer diameter is blank. If blank, in step 358 a verification note 516A is set in areas 214 and 215 and processing continues with step 361. If not blank, in step 359 it is determined if the difference between the maximum gland outer diameter and the actual casting outer diameter is positive. The maximum gland outer diameter is from FIG. 10, area 195, and the actual casting outer diameter is from FIG. 12, area 271. If the result is positive, processing continues with step 361. If negative, in step 360 a modification note 516C is set in area 215, gland type to 12 is set in area 212, and the result is stored in area 224. Processing then continues with step 361.

In step 361, it is determined if the ID Pilot value (FIG. 10, area 196) is blank. If blank, in step 362, a verification note 518A is set in areas 214 and 215 and processing continues with step 371. If not blank, in step 363, it is determined if the ID Pilot value is "N/A." If yes, processing continues with step 371. If the value is not "N/A," processing continues with step 364. In step 364, it is determined if the difference between the actual gasket outer diameter and ID Pilot value is negative. The actual gasket outer diameter is from FIG. 12, area 274. If negative, in step 365 a modification note 518C is set in area 215, gland type is set to 9 in area 212, and the results are stored in area 226. Processing then continues with step 380. If positive, in step 366 it is determined if the shaft/seal size is less than 2.625. If yes, in step 367 the difference between the actual gasket outer diameter and the ID Pilot is divided by two. If this value is less than 0.105, then in step 368, a modification note 517C is set in area 215, gland type is set to 9 in area 212, and results are stored in area 225. Processing then continues with step 380. If the value is less than or equal to 0.105, processing continues with step 380. If the shaft seal size was less than or equal to 2.625, in step 369 it is determined if the value is less than 0.170. If not, processing continues with step 380. If yes, in step 370 a modification note 517C is set in area 215, gland type is set to 9 in area 212, and results are stored in area 225. Processing continues with step 380.

In step 371, it is determined if the box bore value from FIG. 10, area 184 is blank. If blank, in step 372 a verification note 517A is set in areas 214 and 215 and processing continues with step 380. If not blank, in step 373 it is determined if the difference between the actual gasket outer diameter and the box bore value is negative. The actual gasket outer diameter is from FIG. 12, area 274. If negative, in step 374 a modification note to 517C is set in area 215, gland type is set to 9 in area 212, and results are stored in area 225. Processing continues with step 380. If the result was positive, in step 375 it is determined if the shaft/seal size is less than 2.625. If no, in step 376 it is determined if the difference between actual gasket outer diameter and the box bore value, divided by two, is less than 0.170. If yes, in step 377, a modification note 517C is set in area 215, gland type is set to 9 in area 212, and the result is stored in area 225. Processing then continues with step 380. If the result is greater than 0.170, processing continues with step 380. If the shaft/seal size is less than 2.625, in step 378 it is determined if the result is less than 0.105. If yes, in step 379 a modification note 517C is set in area 215, gland type is set to 9 in area 212, the result is stored in area 225. Processing then continues with step 380. If result is greater than 0.105, processing continues with step 380.

In step 380, it is determined if the "sleeve extends from face" value is blank. If blank, in step 381 a verification note 519A is set in areas 214 and 215 and the compatibility analysis is complete. If not blank, in step 382 it is determined if the difference between the sleeve extends from face value and the outside length, less 0.151, is positive. The sleeve extends from face value is from FIG. 10, area 199, and the outside length is from FIG. 12, area 264. If this result is positive, the compatibility analysis is complete. If the result is negative, in step 383 it is determined if the difference between outside length, less 0.380, and the sleeve extends from face value is positive. If this difference is positive, in step 384 a modification note 519D is set in area 215, sleeve type is set to 3 in area 213, the result is stored in area 227. If the result is negative, in step 385 a modification note 520D is set in area 215, sleeve type is set to 4 in area 213, the result is stored in area 227. At this point, the compatibility analysis is complete.

After the compatibility analysis is complete, the system analyzes the data produced. If more than one gland type was recommended, the system selects the gland type in the following order of priority highest first: 10, 4, 9, 12. Each gland type of a higher priority builds upon characteristics of the other types of lower priority. A gland 12 is the result of minor modifications to a standard gland. A gland 9 is the result of major modifications and is made out of a blank casting or bar stock. This gland encompasses modifications included in the gland 12. A gland 4 is a custom gland with a rectangular bolt pattern but can include the modifications of the glands 12 and 9. Gland 10 is a custom round gland with multiple bolt holes. This gland may include combinations of gland types 10, 4, 9, and 12. The combination of glands is designed for accommodating as many pumps and seals as are available.

If more than one sleeve was recommended, the system chooses the higher number sleeve. As with the glands, a sleeve of higher priority encompasses the modifications of a sleeve of a lower priority. For example a sleeve 3 includes modifications from sleeve 2 and sleeve 4 includes modifications from 2 and 3. The system then sets the dimension type in area 230 of FIG. 11. If all dimensions are provided, the A option is selected. If only one dimension is blank, the B option is selected. If the add a pump path has been selected, or if two or more dimensions are blank, the C option is selected. If all dimensions are blank, the D option is selected. The dimension type is used to determine the dimensions to be verified before the user can place an order. Variations to the compatibility analysis in FIG. 13 may be made to accommodate various mechanical seals.

Having now described the compatibility analyzer, the seal specifier will now be described. FIG. 14 represents a screen display provided by the system at step 67 (FIG. 3A). The user selects one of the four different seal selection methods (icons 423-428 and 431-434) then selects icon 430 to select the materials of construction.

If desired by the user, the seal model may be selected from a drop down menu for the seal currently being used in the actual equipment, in area 420. The system recommends a replacement seal which replaces the seal model currently being used to ensure the user receives a quote which is comparable to the seal currently being used.

A competitive analysis may be initiated by selecting competitive analysis icon 421. The competitive analysis may be stored as a data file or text which provides a description of the advantages and disadvantages of the current seal model. This information may show a detailed comparison between the seal model being used and the comparable seal model from another manufacturer.

Additionally, the user may initiate an internal analysis by selecting internal analysis icon 422. In one embodiment, the internal analysis is private information which may be used, for example, by distributors or manufacturers, and would normally not be distributed to third parties. This information may show a detailed description of the current seal model and may explain the differences between the manufacturer's product and the current seal model. It may contain marketing strategies or other information regarding selling of a manufacturer's seal for replacing the current seal model.

By selecting icon 429, the user may view and print any product brochures for any seal model stored in the seal styles file. The brochures may contain graphics and a description of features of the seal, as well as dimensional information. If a distributor is using the system or has given the system to their customer, the distributor's logo may be displayed on the brochure. This addition of a logo allows the distributor to create high quality product brochures for low cost for any seal models upon demand from the customer.

The user also may decode the part number of a current seal by selecting icon 437 shown on FIG. 14. The user may be presented a list of seal manufacturers. After selecting the manufacturer, the system may present a series of drop down menus through which the part number of the current seal may be created by the user. The system decodes the part number and shows the user the seal type, size, materials, and other information on the current seal. Such a decoding system may display its results on the material selection screen (FIG. 15, section 446, which is described below) enabling conversion from a current seal to a cartridge seal or an in-kind replacement seal from another manufacturer.

Referring again to the seal selection portion of FIG. 14, there are generally four ways to select a seal. In the first method, which is described in connection with FIG. 16 and indicated as steps 68 and 72 on FIG. 3A, the user selects icon 423 on FIG. 14, in step 460, and in response is provided with a list of seals (step 461) from which the user may select one seal model in step 462. After the user has selected a model, the system then performs the compatibility analysis in step 463, as described above detailed in connection with FIG. 13, for the model selected. The system is then displays the Materials of Construction screen, shown in FIG. 15, which is described below, where material recommendations are displayed or where the user may select materials.

Figure 17:
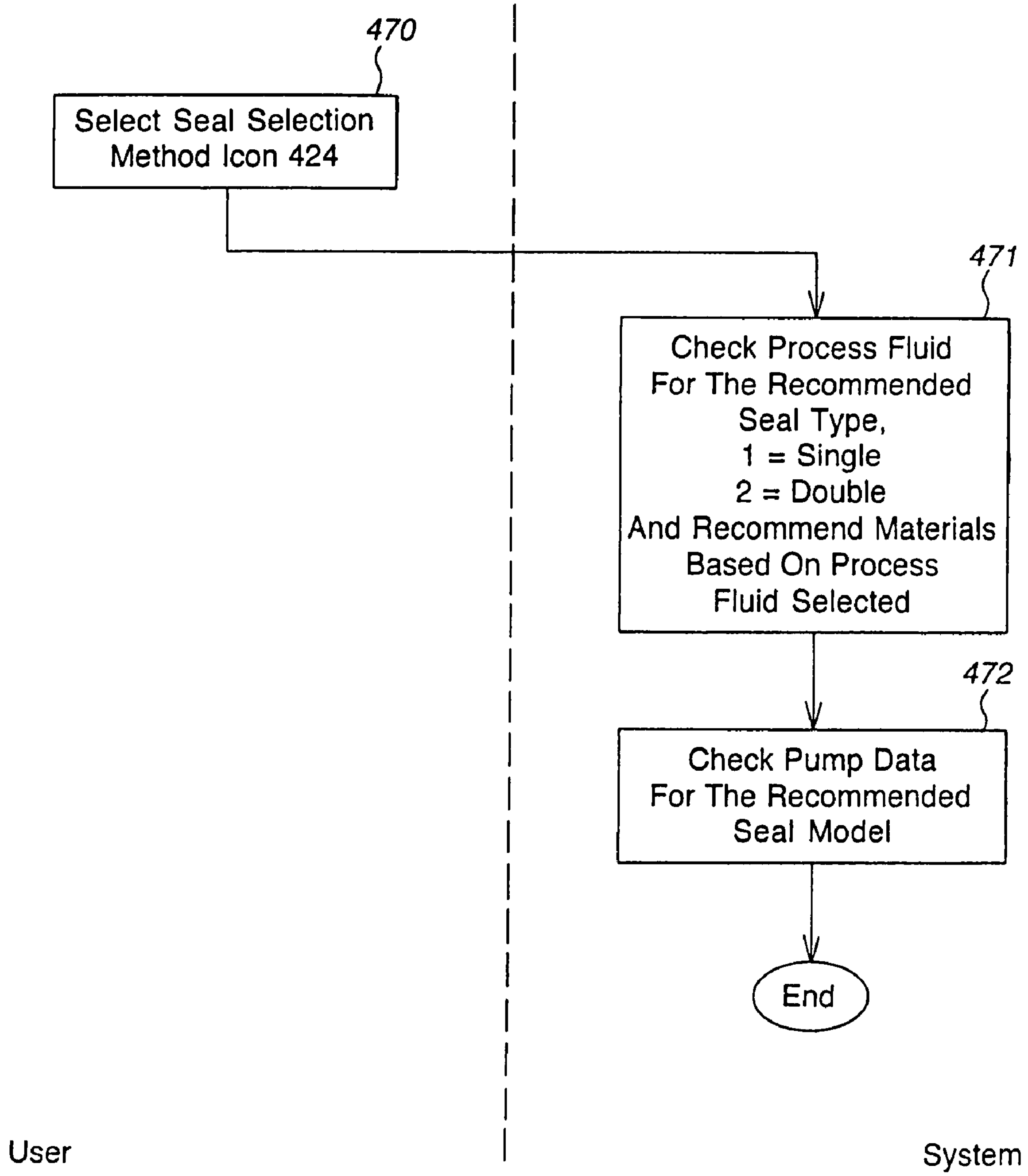
FIG. 17 is a flowchart describing the selection process performed for FIG. 14 icon 124.

In the second method, which is described now in connection with FIG. 17 and as indicated on FIG. 3A as step 70, the user selects icon 424 on FIG. 14 in step 470. The system recommends, in step 471, either a single or double mechanical seal for an application. A process fluid file is maintained and contains a field called the o-ring seal (see FIG. 18, 487). This field stores what the manufacturer has predetermined to be the best type of seal, based on the characteristics of the process fluid. The coding system includes a number and a material code. The number indicates the recommended seal type. For example, "1" indicates a single cartridge seal; "2" indicates a double cartridge seal with a pumping ring; and "3" indicates a bellows type seal. The material codes then follow the seal type in the following format: the first letter indicates the recommendation for the metal, the second letter indicates the recommendation for the o-ring, the third letter indicates the recommendation for the inboard face, and the fourth letter, used only for double seals, indicates the recommendation for the outboard face. The single seal does not require an outboard face and therefore does not have a fourth letter designation. Other letter combinations may be used for other types of seals.

After the seal type is determined, the system checks the pump data file for the recommended model in step 472. The system checks the results of the compatibility analyzer for the seal type and retrieves the model recommended by that process. See FIG. 11, 210. Any models may be programmed to be the recommended seal model for an application. This example shows the 1: designation in the process fluid file, corresponding to the "Single—3000, 3001, 3005, 3400, 3700" field in the pump data file which corresponds to field 210, the 2: designation in the process fluid file, corresponding to the "Double—3220, 3225, 3221" in the pump data file, etc. The system recommends the materials of construction, and API plans as shown in step 74 of FIG. 3A, based on the information from FIG. 18, area 487.

In the third method, the system recommends a model based on the family selected by the user, as indicated on FIG. 3A as steps 69 and 73. Referring now to FIG. 19, the user selects one of the seal types in step 500 by selecting one of the icons 425-428 or 431-433 in FIG. 14, to which the system responds by recommending a seal/material combination (step 501). The system first checks the pump data file (FIG. 11, 210) for the model recommended for this seal type by the compatibility analyzer. After the model has been determined, the system in step 502 refers to the predetermined field in the process fluid file that contains the material recommendation for the specific seal type. See FIG. 18, area 488. The system then creates the recommendations for the materials of construction and API plans, based on the information from the process fluid file (step 74 of FIG. 3A). If the model field (FIG. 11 area 210) in the pump data file does not have a value but has an alternate seal type recommended in area 211 of FIG. 11, the user may be prompted to select the alternate seal style because the seal style selected is not compatible with the characteristics of the process fluid they are pumping. The same scenario can occur if the manufacturer has not made a recommendation for the seal type selected in the process fluid file. The system uses the alternate seal type recommended in area 489 of FIG. 18.

In the fourth seal selection method, as indicated in FIG. 3A as step 71, the user selects icon 434 in FIG. 14. See FIG. 20, step 510. In response, the user is provided with a listing of component type seals to select from in step 511. The user then may select a component type in step 512. The system then provides the user with a listing of the sizes available for the component type selected in step 513. The user then selects the size in step 514. The system then performs a compatibility analysis, as described in FIG. 13 for the selected component type. The system then presents to the user the materials of construction screen (FIG. 15) to select the materials in step 515.

Figure 18A:
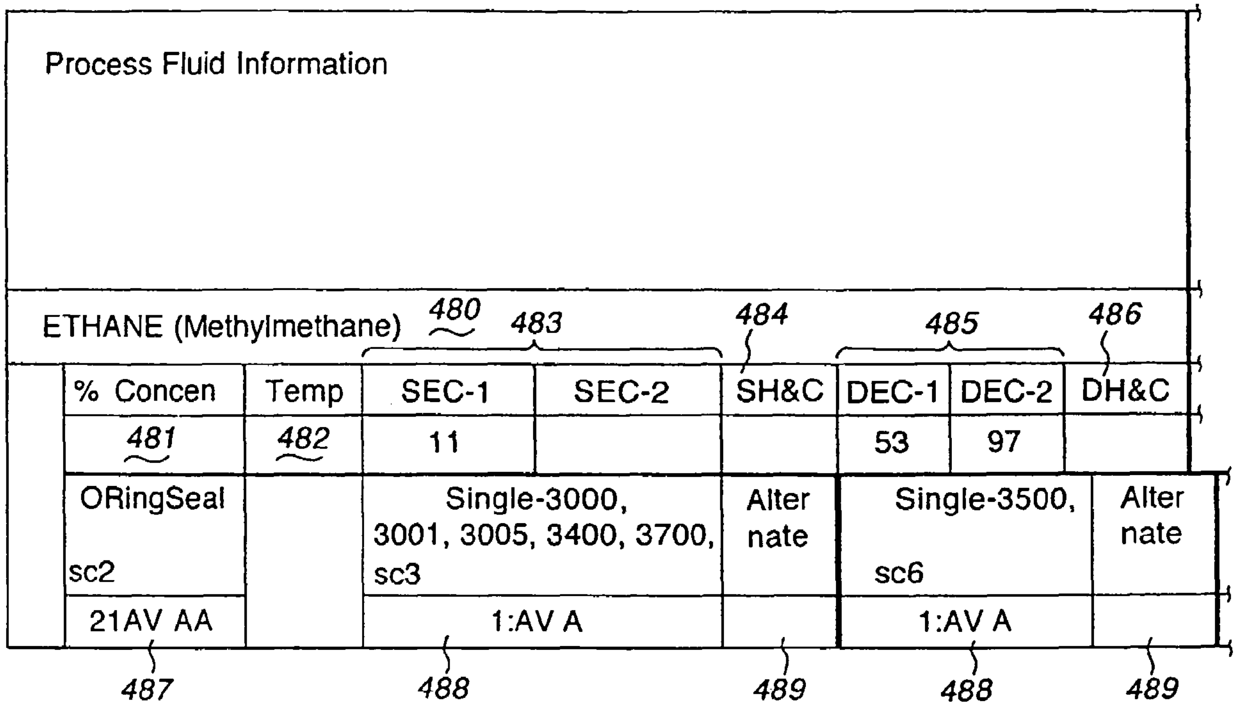
FIG. 18 is a representation of the process fluids database portion of the seal selection system.
Figure 18:
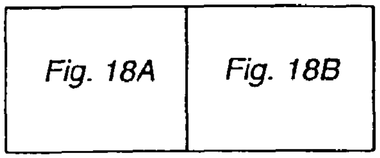
Figure 18B:
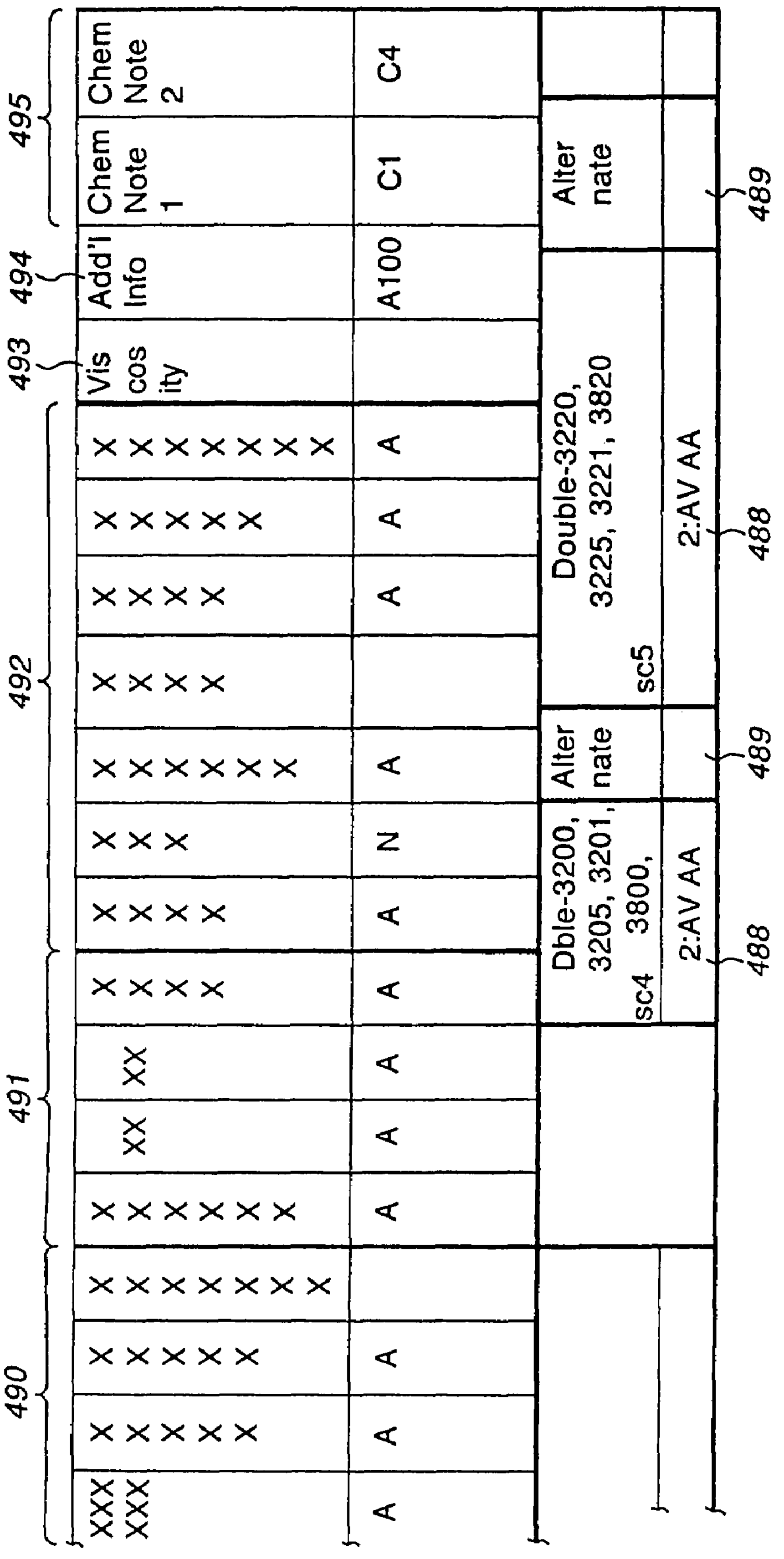
Figure 19:
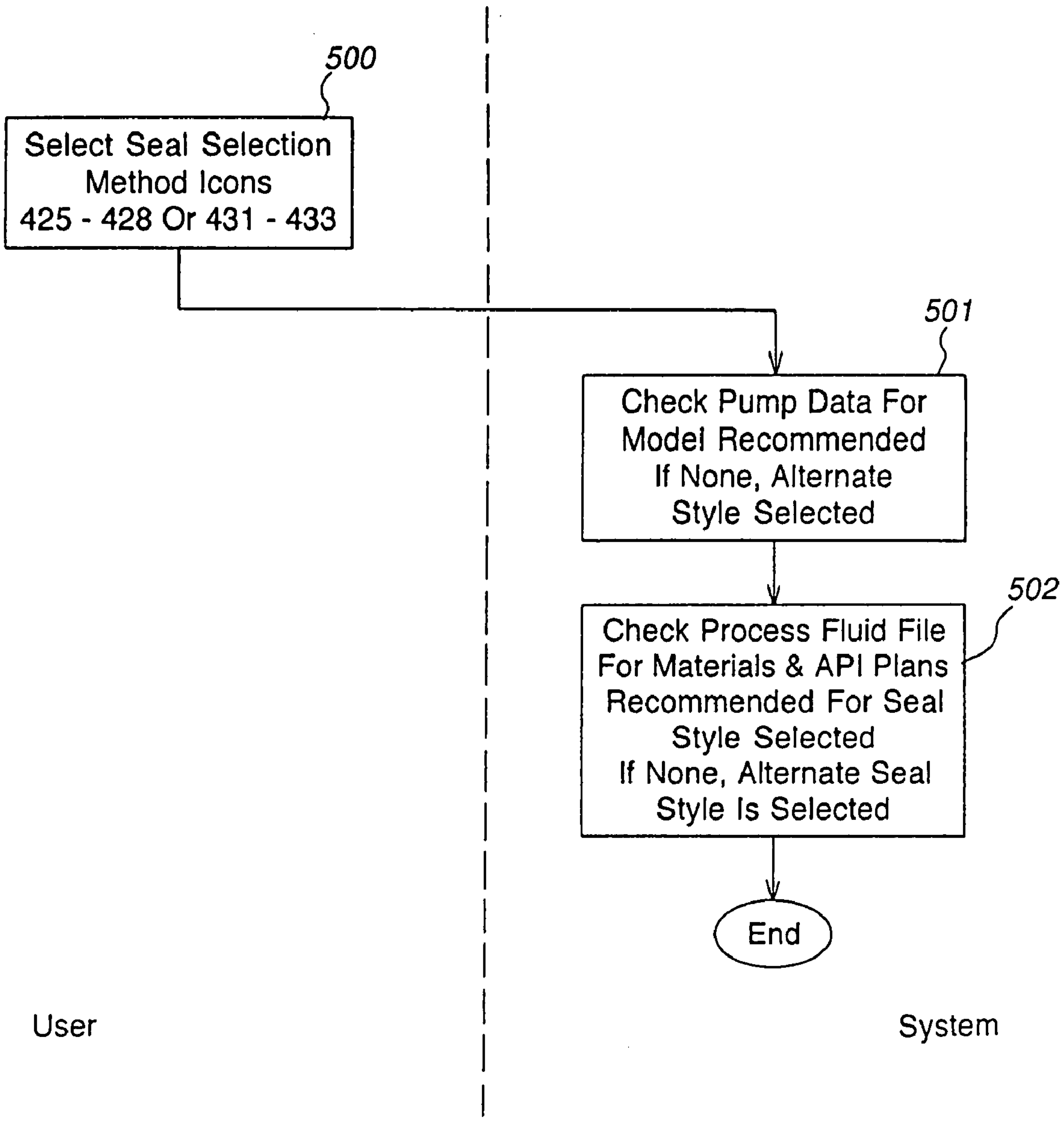
FIG. 19 is a flowchart describing the selection process performed for FIG. 14 icons 125-133.

Referring now to FIG. 18, a representation of a portion of the process fluids database is shown. The following information is a portion of the process fluid profile stored in the process fluid file. Area 480 contains the process fluid name. Area 481 contains the concentration range for the process fluid. Some process fluids are listed many times showing the different concentration levels, because the concentration level effects material compatibility and characteristics of the fluid. Area 482 contains the maximum temperature for the process fluid. Area 483 contains API plans recommended by the manufacturer for single seals. Area 484 contains a specific heating and cooling plan recommended by the manufacturer for single seals. Area 485 contains API plans recommended by the manufacturer for double seals.

Area 486 contains a specific heating and cooling plan recommended by the manufacturer for double seals. Area 487 contains the manufacturer's recommended seal style and construction for this fluid. For example, if the recommendation begins with a "1:," a single seal is recommended. If the recommendation begins with a "2:" a double seal is recommended.

Area 488 contains recommended materials of construction for the seal type shown above it. Area 489 contains an alternate seal type to recommend if the recommended seal type is not available in the recommended materials of construction. Area 490 contains the material compatibility rating for each of the metals used in mechanical seals. Area 491 contains the material compatibility rating for each of the face materials used in mechanical seals. Area 492 contains the material compatibility rating for each of the o-ring materials used in mechanical seals. Area 493 contains the viscosity rating. Area 494 contains the additional information package number. Area 495 contains any notes describing the pertinent properties of this fluid. Other information fields also may be provided.

After the seal has been selected, and the system has a recommended materials of construction, the user is presented a materials of construction screen such as the one shown in FIG. 15. The system displays the material choices which are available for the recommended seal model or the seal model selected in the outer left hand column. If the user has selected a path in which the system recommends the materials, the system shows recommendations by highlighting the choice for each of the components. The metals available are displayed in area 440 and the recommendation is set by using the first letter in the process fluid code (from FIG. 18, area 487 or 488) for the chosen selection method. If a double seal was selected or recommended, the user is presented with both the inboard and outboard faces available, at areas 442 and 443. If a recommendation for faces is provided, the system uses the third letter of the recommendation from the process fluid file (FIG. 18 area 487 or 488) to recommend the inboard face and the fourth letter of the code from the process fluid file to recommend the outboard face. If a single seal was selected or recommended only area 442, the inboard faces, is displayed. The elastomers available for the seal model selected or recommended are displayed in area 444, and the recommendation is set by the second letter of the process fluid code (FIG. 18, area 487 or 488) recommendation for the recommended seal type. The system also recommends an API plan in area 445. The system also at this time may analyze the percentage of solids in the process fluid to determine if special hard face materials are used for this application. If the user has entered a percentage of solids value, the system recommends the use of face material E or F. Based on a dissolved percentage of solids greater than 11% or a solid non-fibrous value provided, the system also may recommend the use of API plan 32 and 54. Area 441 in FIG. 15 provides the complete compatibility rating for each of the materials available with the API Plans recommended for the process fluid, so that the user may determine if any other choice of materials would be acceptable. The user, in step 75 of FIG. 3A, then may select or change the recommendations for the desired materials of construction, API plans, and a heating and cooling plan.

In area 441, the user may select a different process fluid and may view its material ratings, with the manufacturer's recommended materials highlighted in this area to enable the system user to select the best materials for the application handling the situations encountered. The secondary process fluid(s)' characteristics may differ from the primary process fluid and may require different materials overriding the recommended materials of construction for the primary process fluid and API plan choices, etc. This selection is especially useful if more than one process fluid is used with the same seal/pump combination. The user may change any of the recommendations. This selection also allows the user to standardize the seals being purchased. If the same seal model and size is being used throughout the plant, the user may view the various process fluids and determine if a standard seal construction is acceptable for all applications. This standardization allows the user to stock fewer spare seals, as the spare seal may now be used for a variety of processes.

Area 446 displays the results from the cross reference section activated earlier in FIG. 14, icon 437. These results allow the user to view the current seal's materials of construction and select an exact match to the current seal. Also, by comparing the results of the cross reference to the compatibility ratings in the center column "Quick Reference," in area 441, the user can determine if the original seal was suitable for the process. This feature can help explain why some seals may have failed prematurely, and facilitates both the replacement of exact in-kind seals with the same materials of construction and the conversion from another seal model by displaying the materials of construction.

If a double cartridge seal has been selected, the system automatically prompts the user to select a barrier fluid. An example of a screen by which such selection may be prompted is shown in FIG. 21. The listing in this screen includes common barrier fluids, and provides the user with the temperature limitations and other information for each fluid. This interface allows the user to select a barrier fluid in area 520 which best suits the process which uses the seal. By displaying the temperature limitations and the comments, the user may determine if the use of the wrong barrier fluid may have been an issue in past seal failures. This interface also accommodates gas barrier buffer systems used with gas technology seals and may be expanded to accommodate various kinds of barrier fluids.

Referring again to FIG. 3B, in step 76, the system determines whether a standard design fits the pump. This decision is based on the information in the pump data file obtained through the compatibility analyzer. If the compatibility analyzer has recommended modified or custom components (where FIG. 11 area 212 or 213 has a value other than 1), the system provides the user with two modification strategies.

Figure 22:
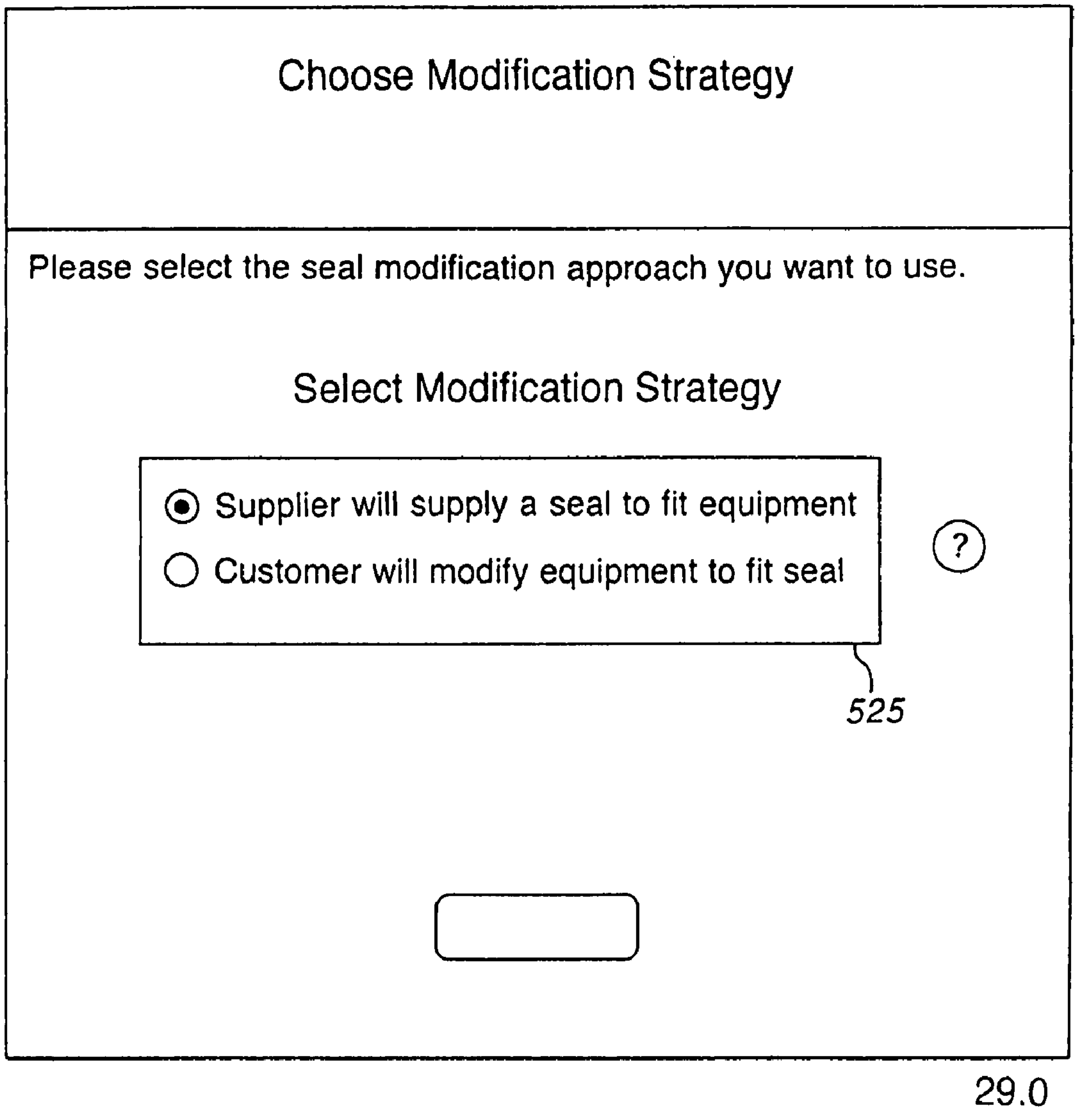
FIG. 22 is a representation of a screen display which, in the event that no existing standard seal is compatible with the selected pump, prompts a user to select either a modified seal or a modification to a pump.

FIG. 22 is a representation of the screen displayed by the system for the selection of a modification strategy. The user selects a strategy in area 525. In the first strategy, the user is given a quote proposal based on a modified seal. The system prices the seal, adding a special part number and price. The system also displays drawings showing details of the modified seal along with the newly calculated dimensions. From this display the user may confirm that the new design fits the equipment. This part of the system replaces the timely engineering process that currently is being used to design and quote modified seals. If upon receipt of the quote, the user does not wish to proceed with the modified seal, or would like to see the difference in the two strategies, this screen may be displayed again and the user may select the alternate path. A user may discover that a modified seal is less costly than actually modifying equipment.

In the second strategy, the user is given a quote proposal based upon a standard seal with standard drawings. The modification notes necessary to modify the equipment are displayed below the seal drawings. If upon receipt of the quote, the user does not wish to proceed with the option selected, this screen may be redisplayed and the user may select the alternate path. The user may discover that the cost of modifying equipment is less costly than purchasing a modified seal every time the process is changed or the seal fails or to prevent costly plant downtime. Both of these strategies will be described in more detail below in connection with FIG. 30.

Referring again to FIG. 3B, in step 78, the system displays optional features and additional products which are available for the seal model recommended or selected, and calculates recommendations based upon the process fluid characteristics and the API plans selected. FIG. 23 is a representation of an example screen displayed by the system.

Optional features are features that are internal to the seal. They are components which are built into the construction of the seal to increase the seal life. The price for these optional features is added to the price of the seal. Depending upon the path through the program, the system either recommends these features or allows the user to select features in area 530 and 534 of FIG. 23. The user may override any selections recommended by the system. An example of some of the optional features which may be provided are the following.

Quench and drains may be recommended based upon the selection of the API Plan 62 or 96, etc. Pumping features are recommended based upon the selection of API Plans 52 or 53, etc. Two piece stationary heads are recommended based upon the manufacturer's classification entered into the process fluid viscosity field (FIG. 18) or by the user entering a viscosity value greater than 2501 SSU for the fluid being used, etc. Gland features such as ID Pilot glands, OD Pilot glands and O-Ring Groove glands also may selected directly in this area.

Additional products are used in connection with the seal to provide the best sealing performance of the process fluid. These products are external to the seal and are listed as separate line items on the quote form. These items may be purchased separate from the seal. Depending upon the path through the program, the system either may recommend these products or may allow the user to select products in area 533 of FIG. 23. The user has the ability to override any selections recommended by the system. Examples of some of the additional products that may be provided are the following.

Throat bushings may be recommended by the system based upon the selection of API plans 32 or 99. For example, the system may recommend the use of either a carbon or bronze throat bushing. The system first checks the material compatibility for carbon. If the rating for carbon is unacceptable, the system checks to determine if a bronze bushing is acceptable, or allows the user to select any material. Special recommendations are made for double seals. Based upon the combination of the double seal and the API plan selected, the system recommends a cooling system for the application. If the convection tank cooling system can be used, the system recommends the size of the tank and cooling coils for the most efficient use. If the system determines the process cannot be cooled by the use of a convection tank, or if the user does not want to use a convection tank, then an alternate API plan is recommended along with a flow meter which handles the fluid used for cooling the process in the seal chamber. The system also may recommend the flow rate for providing the maximum cooling effect in the seal chamber with the minimum amount of water/barrier fluid used for an application.

Seal spare parts kits and factory repairs also may be quoted, enabling the user to predetermine the cost of the repairs and rebuilding the seal being purchased. The user may select the kits at this time. A repair kit may be selected without the purchase of the actual seal. The user may select these items in area 532 of FIG. 23.

Figure 24:
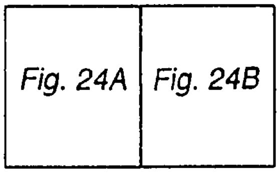
FIG. 24 is a flowchart describing how a design center operates.
Figure 24A:
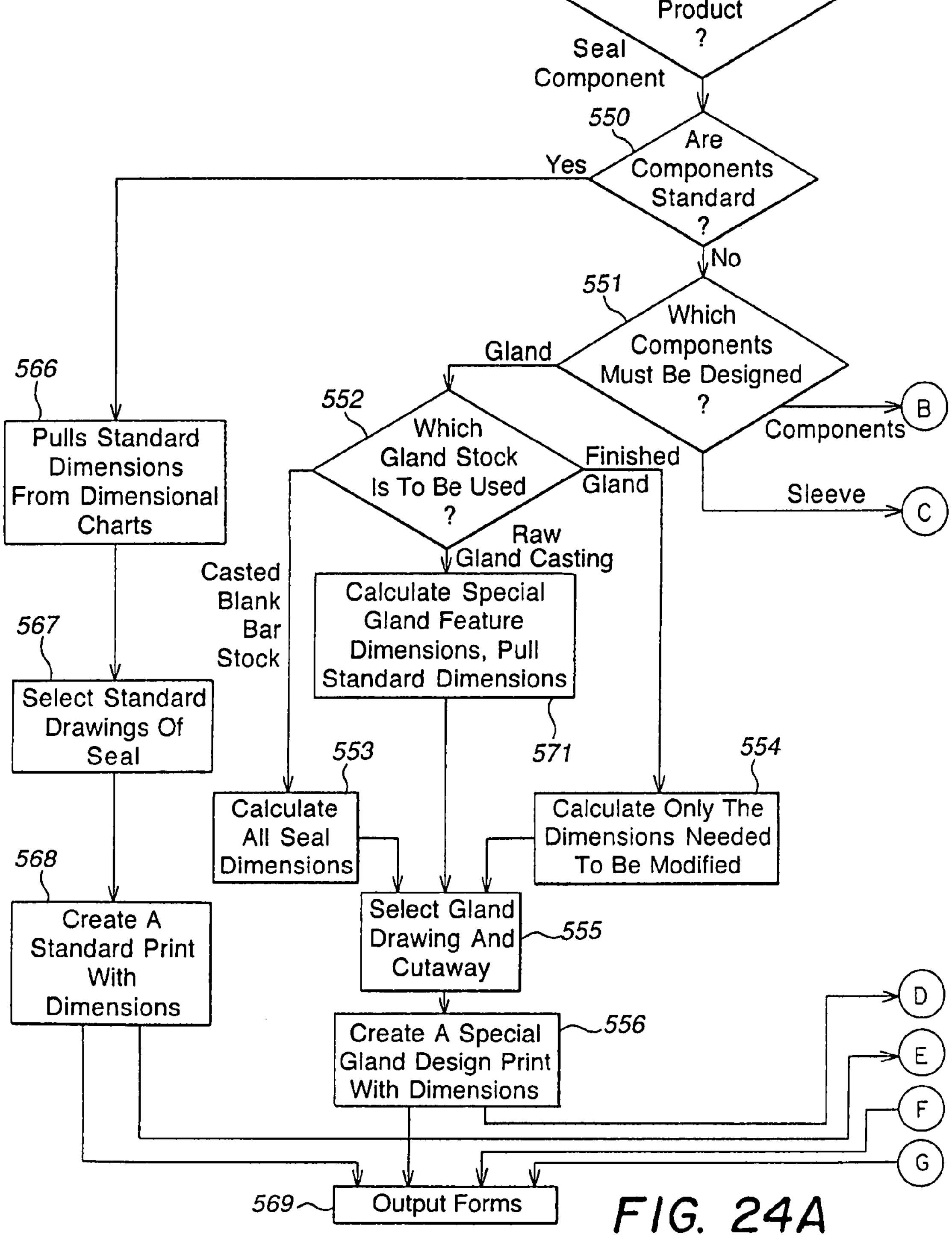
Figure 24B:
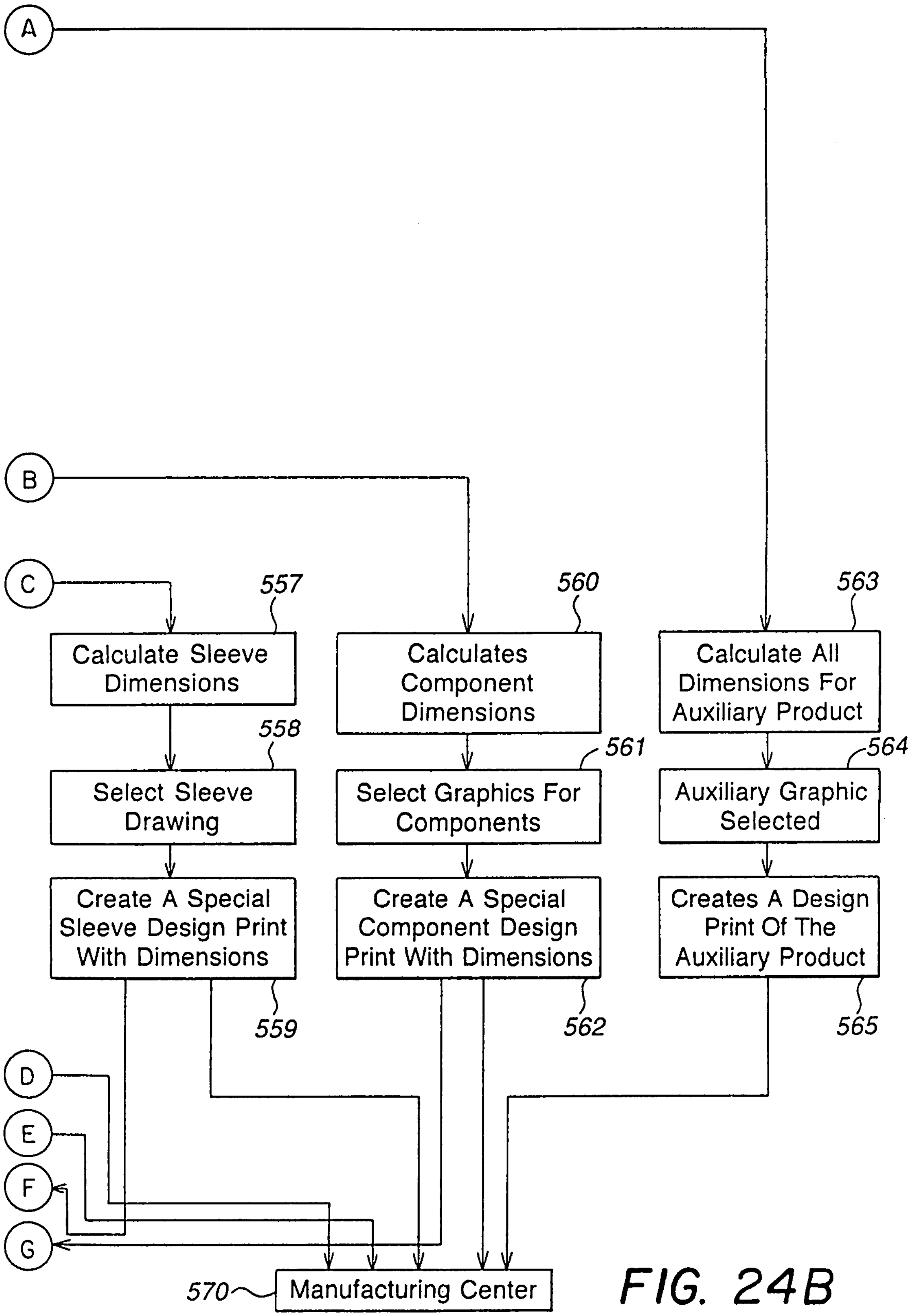

Having now described in detail how the user obtains dimensions and graphics of a seal, a profile of a selected seal, a pump profile and compatibility results, the design center (28 in FIG. 2) will now be described. As shown in step 79 of FIG. 3B, the design center designs seal components and auxiliary products. FIG. 24 is a flow diagram explaining the functions of the design center. The design center creates, draws and calculates dimensions for components (standard and/or special) and auxiliary products for an application. In step 549, it is determined if the item to be designed is a seal component or an auxiliary product. If the item is a seal component, processing continues with step 550. If the item is an auxiliary product, processing continues with step 563.

In step 550, the results of the compatibility analyzer are used to determine if the component to be designed is standard or is custom designed. For example, standard components have gland type 1 with no special gland features (see FIG. 11, area 212), sleeve type 1 (FIG. 11, area 213), and standard components (lock collars, holders, etc.). If components are standard, processing continues with step 566. If a custom component is needed, processing continues with step 551.

Figures 29, 29A:
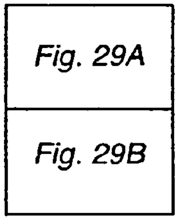
FIG. 29 is a representation of a seal sleeve dimensional profile stored in the seal styles file.
Figure 29B:
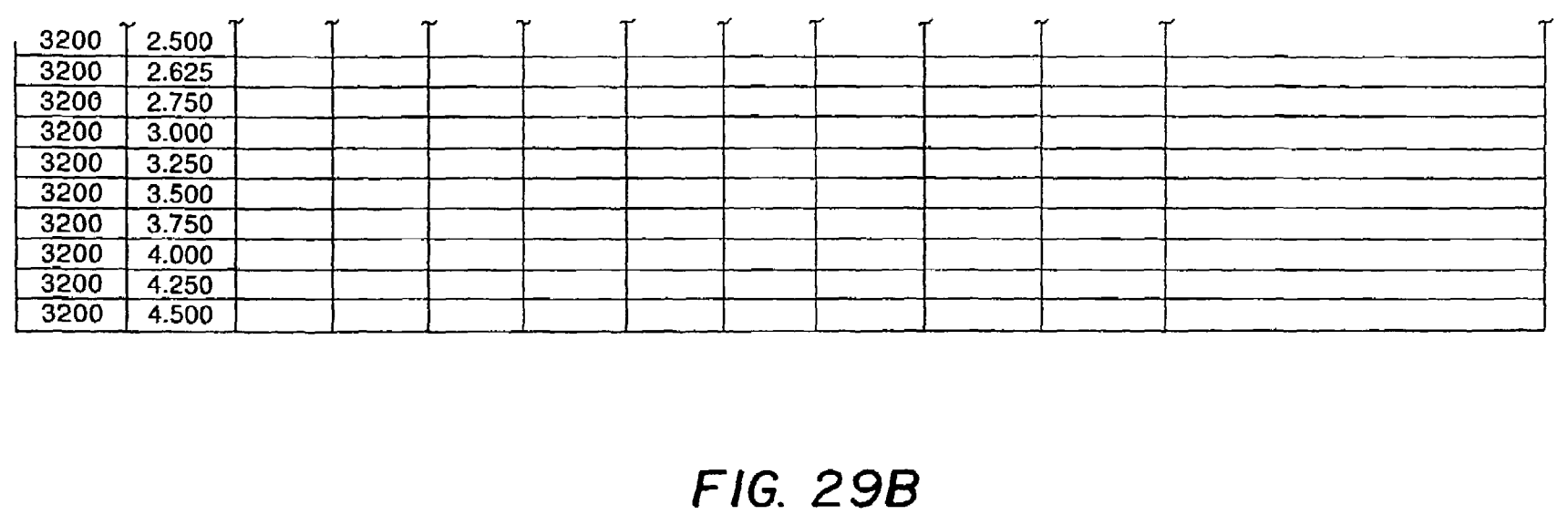

In step 566, standard dimensions for each component are taken from the dimensional profile of the seal, and are stored in the seal styles file. An example is shown in FIG. 29 which depicts a limited representation of a sleeve profile for one common seal type. Other seal component profiles are stored in a similar manner and contain additional fields for the dimensions pertinent to that component. Example components are glands, sleeves, lock collars, faces and holders. In step 567, the graphic drawings for the component are selected from the seal styles file. FIG. 25 is an example of a chart where graphics are stored for retrieval. This form is representative in nature and only shows a small portion of the graphics stored. The fields may be different for different seal models. The system stores one or more graphics for each seal component set up in a template form which enables each graphic to handle a large number of different size seals with the dimensions being retrieved or calculated and dropped into the predetermined field on the drawings.

Each drawing type is called out by using a letter designation. For example: "A" drawings are gland drawings stored and used in both the proposal generator (e.g., for quote form, bill of materials and dimensional verification form) and the manufacturing center (e.g., for manufacturing prints and scheduling prints). "C" drawings are complete seal cutaway drawings with dimensional lines and o-ring numbers of a seal used in both the proposal generator (e.g., quote form, brochure and installation instructions) and the manufacturing center. "D" drawings are complete seal cutaway drawings with no dimensional lines used only in the proposal generator (e.g., brochures). "F" drawings are complete cutaway drawings with dimensional lines and component part numbers used in the proposal generator, (e.g., for bills of materials).

Each letter designation is then divided into different categories, such as standard, standard bar stock and special designs, to accommodate different design variations when the component is produced from different material types.

In one embodiment, in order for the system to determine which drawing should be displayed, a chart may be input into the seal dimensional file which indicates which graphic pertains to the correct seal model/size combination for each category. FIG. 25 is an example of one such chart.

For standard components, the system first determines which material for the seal was selected or recommended by the seal specifier and determines if the standard or standard bar stock graphics should be used. In this example, standard castings are in stainless steel and alloy 20 and thus the standard graphics are taken from area 590 of FIG. 25. If the seal selected uses a different metal, the component is made from bar stock and the standard bar stock drawings are used, as indicated in section 591 of FIG. 25.

In step 568, the results of steps 566 and 567 are combined to create a standard engineering print for each component with dimensions. These prints are used for engineering review before parts are manufactured in the manufacturing center. The manufacturing prints then are electronically stored.

In step 569, the component drawings created for the seal are combined. The complete seal drawings (from FIG. 25 area 590 or 591 depending upon the materials) are taken with and without dimensions to be used by each of the output forms.

In step 570, the component drawings created are combined to produce manufacturing prints for each stage of the manufacturing process showing different views of each component which are viewed by a machinist to produce the part. These graphics are stored and retrieved in a similar fashion to those graphics discussed previously in FIG. 25.

If the components to be designed are not standard, as determined in step 550, processing continues with step 551. For this example, components are classified as glands, sleeves and other components, etc. In step 551, it is determined which components are to be designed. If in step 551, it is determined that a gland is to be designed, processing continues with step 552.

In step 552, it is determined what type of stock is needed to manufacture the special gland. Special glands may be manufactured from at least three types of stock. The first type is a gland made by modifying a finished casted gland. This type uses a finished gland from inventory and modifies it slightly. This gland is created when the compatibility analyzer has recommended a gland type 12 with no special gland features. (See FIG. 11, 212).

The second type of gland is made from a standard raw casting. This type uses the same raw casting as a standard gland, but inserts the special gland features if selected by the user in FIG. 10 area 183, or FIG. 23 area 534. This gland type is used when the compatibility analyzer has recommended a gland type 1 or 12 (See FIG. 11, 212) and the user has selected one or more of the special gland features.

The third type of stock is a casted blank or bar stock. This type of gland is created from scratch. Each step and dimension is custom to the application. This gland is created when the compatibility analyzer recommended a gland type other than 1 or 12, or when a special design gland is to be used. An example gland is a gland with scallop. Scallops reduce the thickness of the seal gland in the area of the gland bolt slots or holes to accommodate short bolt/stud extension lengths and short distance to first obstruction from the face of the pump stuffing box.

The design center creates a worksheet to compile the data used to calculate the dimensions for a modified/special custom seal. An example of one such worksheet is shown in FIG. 26. FIG. 26 contains the results of the compatibility analyzer in area 600, the reason for the modification in area 601, the dimensions affected in area 602, the standard dimensions in area 603 and the modified dimensions in area 604. Area 606 displays the gland type and area 607 displays the sleeve type. Area 605 shows design problems. Areas 610 displays verification notes determined from the compatibility analyzer.

Area 611 shows "N" modification notes determined by the compatibility analyzer. Areas 608 and 609 display notes generated by the compatibility analyzer.

If in step 552, it is determined that the gland should be made from modifying a finished gland, processing continues with step 554. In step 554, the system refers to the worksheet (FIG. 26) to determine which of the dimensions are to be modified. An example of some of the modifications which may be made to the standard gland follows. This example is only representative in nature and variations may occur based upon the seal model selected/recommended.

If slot 505C in FIG. 26 has a value in column 600, the system calculates the three dimensions affected. The L1 and L3 dimensions use the standard L1 and L3 dimension from FIG. 12 area 254 and 263, and adds the negative value of the 505C. The negative value is subtracted from the standard L2 dimension (FIG. 12, area 253).

If slot 508C has a value in column 600, the "S" dimension is replaced with the "S" dimension from the chart in FIG. 27, area 624 which corresponds with the bolting size of the pump.

If slot 509C has a value in column 600, the Special Slot ID graphic appears. The Slot ID dimension is calculated as follows:

bolt circle−(bolting size+slot clearance), where the bolt circle and bolting size dimensions are from FIG. 10, areas 191 and 189, and the slot clearance, is from FIG. 27, area 625.

If slot 511C has a value in column 600, the scallop shroud graphic appears and the following calculations are made:

bolt circle−(hex nut head shroud clearance+0.010) =special shroud ID

The bolt circle dimension is from FIG. 10, area 191 and the hex nut head shroud clearance dimension is from FIG. 27, area 623.

If the difference between the special shroud ID and the outside internal obstruction (from FIG. 12, area 279) is greater than zero, a heavy hex nut and the special shroud ID value are used. If this difference is less than zero, then the ID of the shroud hex nut is:

Bolt Circle−(Hex Nut Maximum Width Across Corners+0.010).

The Bolt Circle dimension is from FIG. 10, area 191, and the hex nut maximum width across corners is from FIG. 27, area 620.

If the difference between the ID of the shroud hex nut and the outside internal obstruction (from FIG. 12, area 279) is greater than zero, a hex nut and the ID Shroud Hex Nut value are used. If this difference is less than zero, the ID of the shroud cap screw is: bolt circle−(cap screw head diameter+0.010), where the bolt circle is from FIG. 10, area 191 and the cap screw head diameter is from FIG. 27, area 622.

If the difference between the ID of the shroud cap screw and the outside internal obstruction (from FIG. 12, area 279) is greater than zero, a socket head cap screw and the ID of the shroud cap screw value are used. If this difference is less than zero, then "*" and the negative value from the ID Shroud Cap Screw are printed.

If slot 516C has a value in column 600, the modified D3 dimension is calculated as follows: [Gland OD+(516C value−0.250)], where the Gland OD value is taken from FIG. 12, area 260.

After computing these changes, processing then continues with step 555 where the system pulls detail drawings, and processing continues with step 556.

In step 556, the special gland design print with dimensions is created, using the standard "A" graphics (from FIG. 25 area 590 and 591, depending upon the material). In step 569 the standard component drawing and the detail drawings as determined from the above calculations (step 554) are combined, and also the complete seal drawings with the detail drawings (from FIG. 25 area 590 or 591 depending upon the materials) with and without dimensions, are pulled to be used by the output forms are retrieved.

In step 570, the component drawings created and the detail drawings are combined to produce manufacturing prints for each stage of the manufacturing process showing different views of each component which are viewed by a machinist to produce the part.

If, in step 552, it is determined that a casted blank or bar stock is used, processing continues with step 553. In step 553, the dimensions for a special gland are calculated. Below is one example of a popular special gland which may be created using this method. Variations may be made to this process to accommodate any special gland designs.

For this example, a Gland 9 made from bar stock or a blank casting is designed. Each dimension is calculated because the piece is being created from scratch. Each dimension is calculated individually based upon the pump/process combination to ensure the seal is a direct fit for the application. Dimensions are calculated as follows:

D3 dimension: bolt circles+hex head shroud clearance=D3, where the bolt circle value is from FIG. 10, area 191 and the hex head shroud clearance value is from FIG. 27, area 623.

Slot ID Value: bolt circles−(bolting size+slot clearance) =Slot ID, where the bolt circles value is from FIG. 10, area 191, the bolting size value is from FIG. 10, area 189, and the slot clearance value is from FIG. 27, area 625.

The Counterbore Gasket OD Dimension is computed according to the "N" ID Pilot value. If "N" ID Pilot has a value, ID Pilot+Gasket Surface=Counterbore Gasket OD, where the ID Pilot value is from FIG. 10, area 196 and the Gasket Surface value is from FIG. 27, area 626. If "N" ID Pilot is blank or N/A, then "C" Box Bore+Gasket Surface=Counterbore Gasket OD, where the Box Bore value is from FIG. 10, area 184 and the Gasket Surface value is from FIG. 27, area 626.

The Counterbore Gasket OD dimension is then checked by computing: Slot ID−(Actual Gasket OD−0.050), where the Slot ID value is from FIG. 12, area 272, and the Actual Gasket OD value is from FIG. 12, area 274. If this result is positive, the counterbore gasket OD dimension calculated above is used. If this result is negative, the Slot ID becomes the Counterbore Gasket OD. Then the following computation is performed: Actual Slot ID−(ID Pilot if has a value, or Bore if ID Pilot was N/A or blank)/2, where the Actual Slot ID value is from FIG. 12, area 272, the ID Pilot value is from FIG. 10, area 196, and the Box Bore value is from FIG. 10, area 184. For seal sizes 1.000-2.500," if the result is less than 0.105, the Counterbore Gasket OD is replaced with "*," the result of this calculation and Gask/Side. For seal sizes 1.000-2.500", if the result is greater than or equal to 0.105, the Actual Slot ID Value is used. For seal sizes 2.501-5.000", if the result is less than 0.170, the Counterbore Gasket OD is replaced with "*," the result of this calculation and Gask/Side. For seal sizes 2.501-5.000", if the result is greater than or equal to 0.170, the Actual Slot ID Value is used.

The Slot/Hole Width, "S" Dimension is obtained from FIG. 27, area 624.

The L1, L2, and L3 dimensions are determined in the following manner:

If slot 505C has value in column 600 of FIG. 26, these dimensions are calculated as follows:

L1 dimension=Outside Length (from FIG. 12 area 254)+Special505C;

L2 dimension=Inside Length (from FIG. 12 area 253)−Special505C; and

L3 dimension=Bar Gland Length (from FIG. 12 area 261)+Special505C.

If slot 505C does not have a value in column 600, the standard L1 dimension from FIG. 12, area 254 and the standard L2 dimension from FIG. 12, area 253 are used, and the Bar Gland Length dimension from FIG. 12, area 264 is used for the L3 dimension.

The Modified Shroud Value is computed from:

(bolt circles−hex nut head maximum width across corners)−bar shroud OD, where the bolt circles value is from FIG. 10, area 191, the hex nut head maximum width across corners value is from FIG. 27, area 620, and the bar shroud OD value is from FIG. 12, area 276. If this result is positive, no graphic is needed. If this result is negative, the Scallop Shroud Graphic is displayed and the following calculations are performed:

bolt circle−(hex nut head shroud clearance+0.010)=ID Shroud, where the bolt circle value is from FIG. 10, area 191, and the hex nut head shroud clearance value is from FIG. 27, area 623.

The difference between ID Shroud and the outside internal obstruction (from FIG. 12, area 279) is calculated. If this difference is greater than zero, then print “Heavy Hex Nut” and the ID Shroud value. Otherwise, if the result is less than zero, then:

bolt circle−(hex nut width across corners+0.010)=ID Shroud Hex Nut, where the bolt circle value is from FIG. 10, area 191, and the hex nut width across corners value is from FIG. 27, area 620. The difference between the ID Shroud Hex Nut and the Outside Internal Obstruction (from FIG. 12, area 279) is then calculated. If the result is greater than zero, then print “Hex Nut” and the ID Shroud Hex Nut value. Otherwise, if the result is less than zero, then:

Bolt Circle−(Cap Screw Head Diameter+0.010)=ID Shroud Cap Screw, where the Bolt Circle value is from FIG. 10, area 191, and the Cap Screw Head Diameter value is from FIG. 27, area 622.

The difference between the ID Shroud Cap Screw and the Outside Internal Obstruction (from FIG. 12, area 279) is then calculated. If this difference is greater than zero, then print “Socket Head Cap Screw” and the ID Shroud Cap Screw value. Otherwise, if the result is less than zero, then print “*” and the negative value from the ID Shroud Cap Screw.

The D3 Dimension is then checked. If slot 516C has a value in column 600 of FIG. 26, the new “D3” Gland OD calculated above is compared to the Maximum Gland OD from FIG. 10, area 195. If the new “D3” Gland OD is larger, the D3 dimension is replaced with an asterisk and the negative value.

If slot 504C has a value in column 600 of FIG. 26, then the following changes to the standard L1, L2, and L3 dimensions are made:

L1 dimension=Outside Length (from FIG. 12 area 254)−Special504C;

L2 dimension=Inside Length (from FIG. 12 area 253)+Special504C; and L3 dimension=Bar Gland Length (from FIG. 12 area 264)−Special504C.

The D2 Dimension has a minimum value taken from a standard chart for the model/size combination. The maximum value may remain blank. Minimum bolting information may remain blank.

After the dimensions are calculated, processing continues with step 555 in FIG. 24. In step 555, the bar stock drawings are retrieved as indicated from FIG. 25. Based on the gland type recommended by the compatibility analysis or selected by the user, the “A” gland graphic is taken from either area 591 or 592 of FIG. 25. If the gland type is 9, the “A” gland graphics is taken from area 591. If any other gland type is present the “A” gland graphics takes the corresponding gland number graphic from area 592. Special details drawings may be shown based on the calculations in step 553.

In step 556, the dimensions calculated in step 553 and the drawings from step 555 may be combined into a special gland design print to be used for engineering checks before parts are manufactured in the manufacturing center. The component manufacturing prints then may be electronically stored.

In step 569, the casted blank or bar stock gland drawings and the special detail drawings as determined from the above calculations (step 555) are combined. The seal drawings with the special detail drawings are taken from FIG. 25 area 591 drawings “C,” “D,” and “F,” if the gland type recommended or selected was gland type 9 or area 592 drawings “Special C,” “Special D,” and “Special F” if any other special gland type was recommended by the compatibility analyzer or selected by the user. The drawings may be with and without dimensions to be used by each of the various output forms discussed above.

Figure 28:
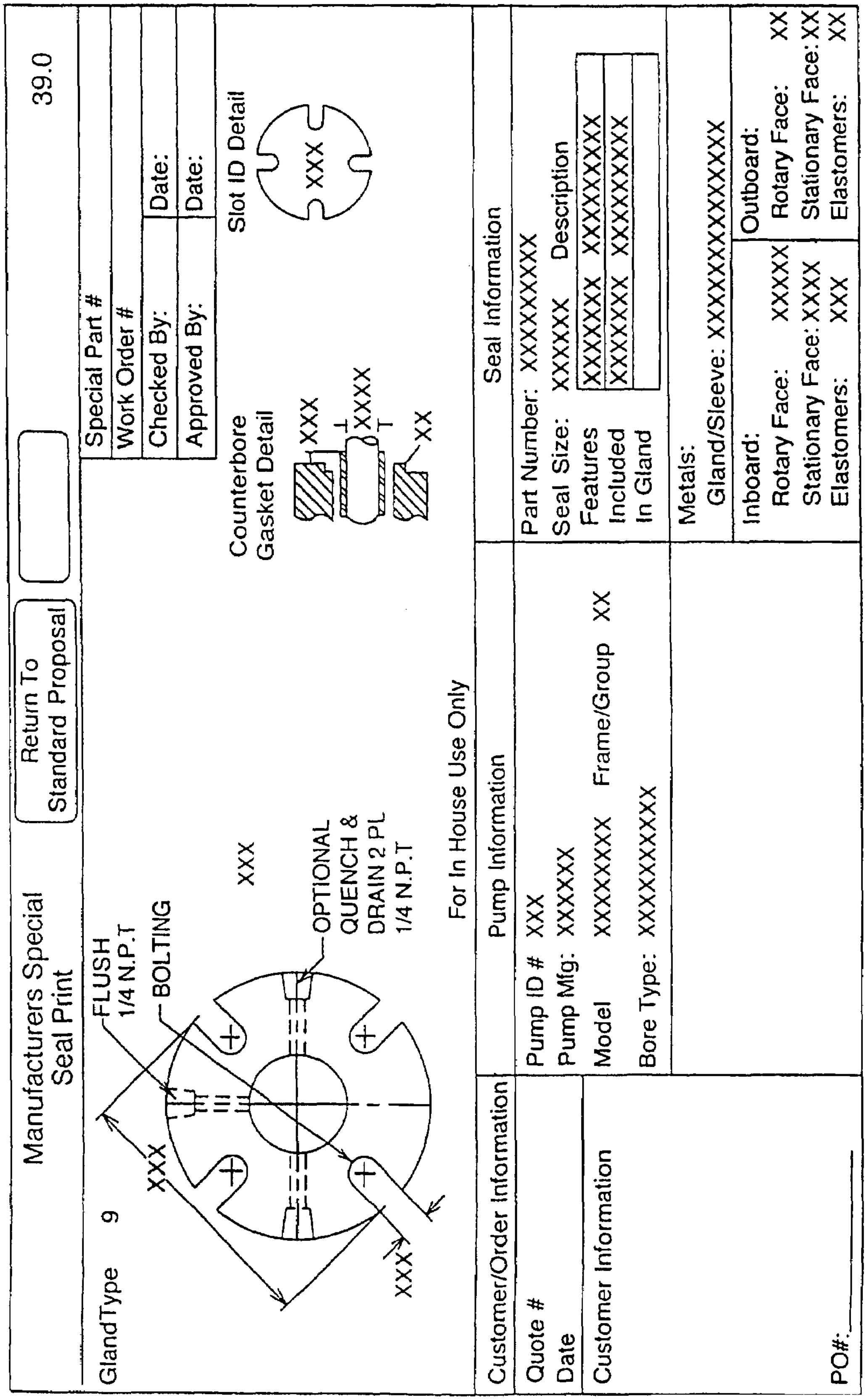
FIG. 28 is an example manufacturing special print which is generated by the design center.

In step 570 each component drawing created and the special detail drawings are combined to produce manufacturing prints for each stage of the manufacturing process showing different views of each component which are viewed by a machinist to produce the part. An example of a manufacturing print is shown in FIG. 28.

If in step 552, it is determined that a raw gland casting is to be used, processing continues with step 571. In step 571, the dimensions for the selected special gland features are calculated. The balance of the dimensions are taken from the standard dimensional charts for a standard seal. Processing then continues with step 555, where the standard gland drawings are selected, in the same manner as in step 567. In step 556, a design print is created using the dimensions calculated and the graphics selected for engineering review before parts are manufactured in the manufacturing center. The component manufacturing prints are then electronically stored. Steps 569 and 570 are performed in the same manner as described above.

If the result of step 551 is the manufacturing of a special sleeve design, processing continues with step 557. In step 557, each dimension for the sleeve is calculated individually based upon the pump dimensions to ensure an exact fit for the application. Various special sleeve designs may be accommodated. For example, a straight sleeve with non-standard ID, hook sleeve, step sleeve, sleeve extensions, special sleeve designs, special ID sleeves, sleeves with extra drive set screws, may be accommodated. The standard sleeve dimensions are stored as part of the seal dimensional profile in the seal styles file.

An example of some of the sleeve dimensions used in one of the more popular sleeve types is found in FIG. 29. Other dimensions not shown also may be included in the seal dimensional profile and are used for other sleeve types. In FIG. 29, the sleeve large OD is in area 630. Sleeve #1 o-ring OD is in area 631. Sleeve ID is in area 632. Sleeve Rotary Head Step ID is in area 634. Sleeve smaller OD is in area 633.

Sleeve #2 o-ring OD is in area 635. Sleeve snap ring OD is in area 636. Sleeve pumping feature OD is in area 637. Sleeve pumping feature under cut is in area 638.

If the compatibility analyzer has recommended a sleeve type 2 (FIG. 11 area 213) the following steps are performed. Sleeve type 2 is a popular sleeve type created when a non-standard shaft or sleeve size is used. For this sleeve type, two dimensions are calculated to accommodate the special shaft sleeve size, which are calculated as follows.

Dimension 1: If the shaft/sleeve size is less than 2.250, take the shaft/sleeve size+0.002. If the shaft/sleeve size is greater than or equal to 2.250, take the shaft/sleeve size+0.003.

Dimension 2 is calculated by subtracting the seal size from dimension 1 and then adding the sleeve #1 o-ring OD (from FIG. 29, area 631).

If the compatibility analyzer has recommended a sleeve type 3 or 4 (FIG. 11 area 213) or if the user has selected a type 3 or 4, the design center calculates the dimensions as follows. Sleeve types 3 and 4 are similar to sleeve type 2. They use the two dimensions calculated from sleeve type 2, and a third dimension calculated.

Dimension 3: If the shaft/sleeve size is less than 2.250, take the shaft seal size +0.002. If the shaft/sleeve size is greater than or equal to 2.250, take the shaft seal size +0.003.

Other sleeve types may be calculated in a similar manner.

With the dimensions calculated, processing continues with step 558. In step 558, the sleeve drawings stored in the seal styles file are selected in the same manner as the gland drawings.

In step 559, the dimensions obtained from step 557 and the drawings selected from step 558 are combined to create a sleeve design print for engineering review before parts are manufactured in the manufacturing center. Component manufacturing prints are electronically stored. Steps 569 and 570 are performed in the same manner discussed above.

If the result of step 551 is to manufacture special components, such as, stationary face holders, faces, lock collars and adapter plates used in or with a mechanical seal processing continues with step 560. In step 560, dimensions are calculated in a manner similar to steps 553 and 554 for glands, and step 557 for sleeves. In step 561 graphics are selected in the same manner as in steps 558 (for sleeves) and 555 (for glands). In step 562 special components design prints with dimensions are created for engineer review before parts are manufactured in the manufacturing center. The component manufacturing prints are then electronically stored. Steps 569 and 570 are performed in the same manner as discussed above.

An example of a seal component that may be designed by the design center is a special seal face design.

Some applications in industries such as petroleum refining, petro-chemical and power generation, use a special seal face balance to accommodate factors of low specific gravity, high vapor pressure and higher pressure/velocity conditions. The system may calculate seal face balance geometry and designs special seal faces (with and without holders) to accommodate the application.

Figure 31:
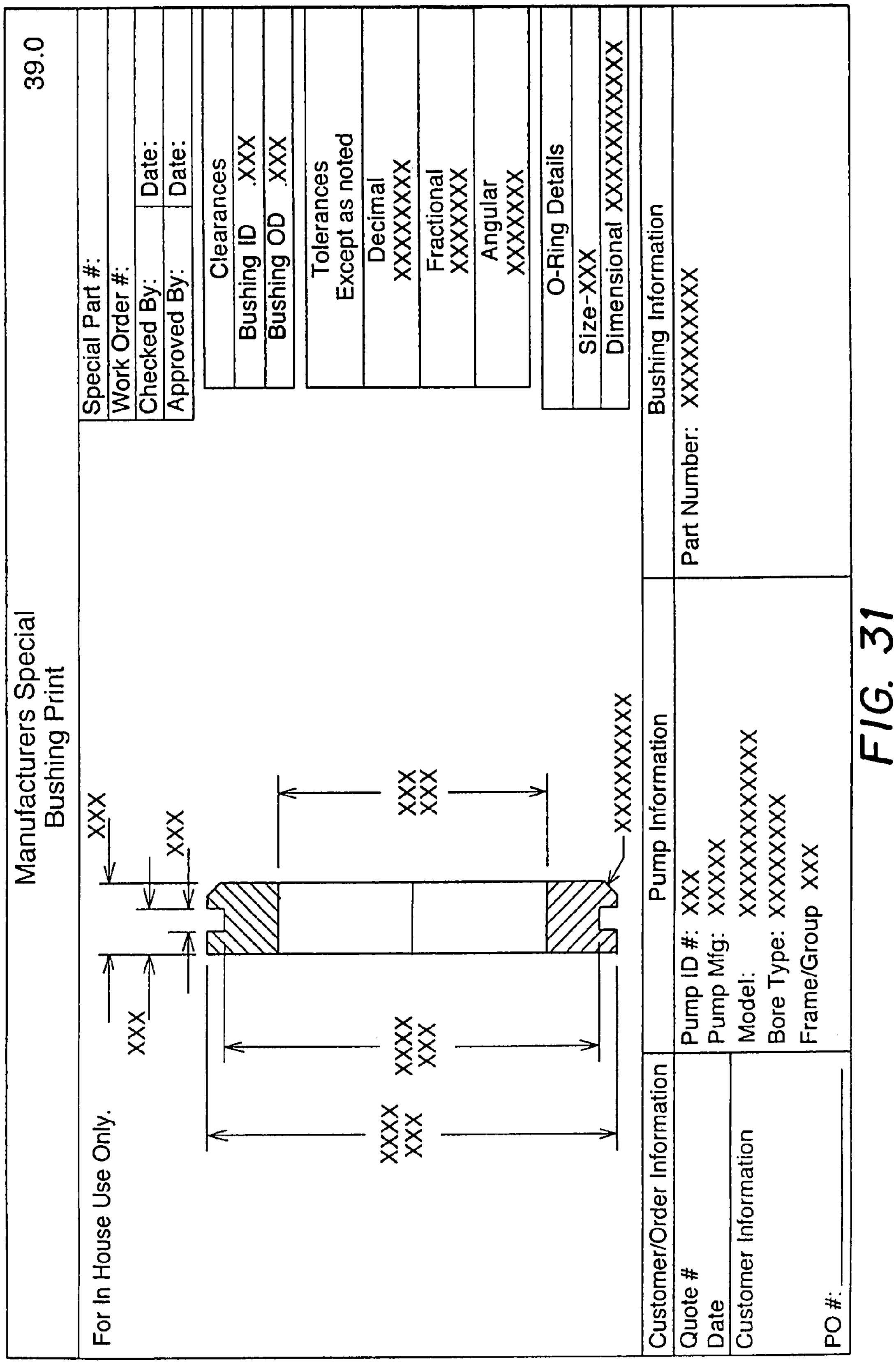
FIG. 31 is a representation of an example Manufacturers Special Bushing Print designed by the design center.
Figure 32:
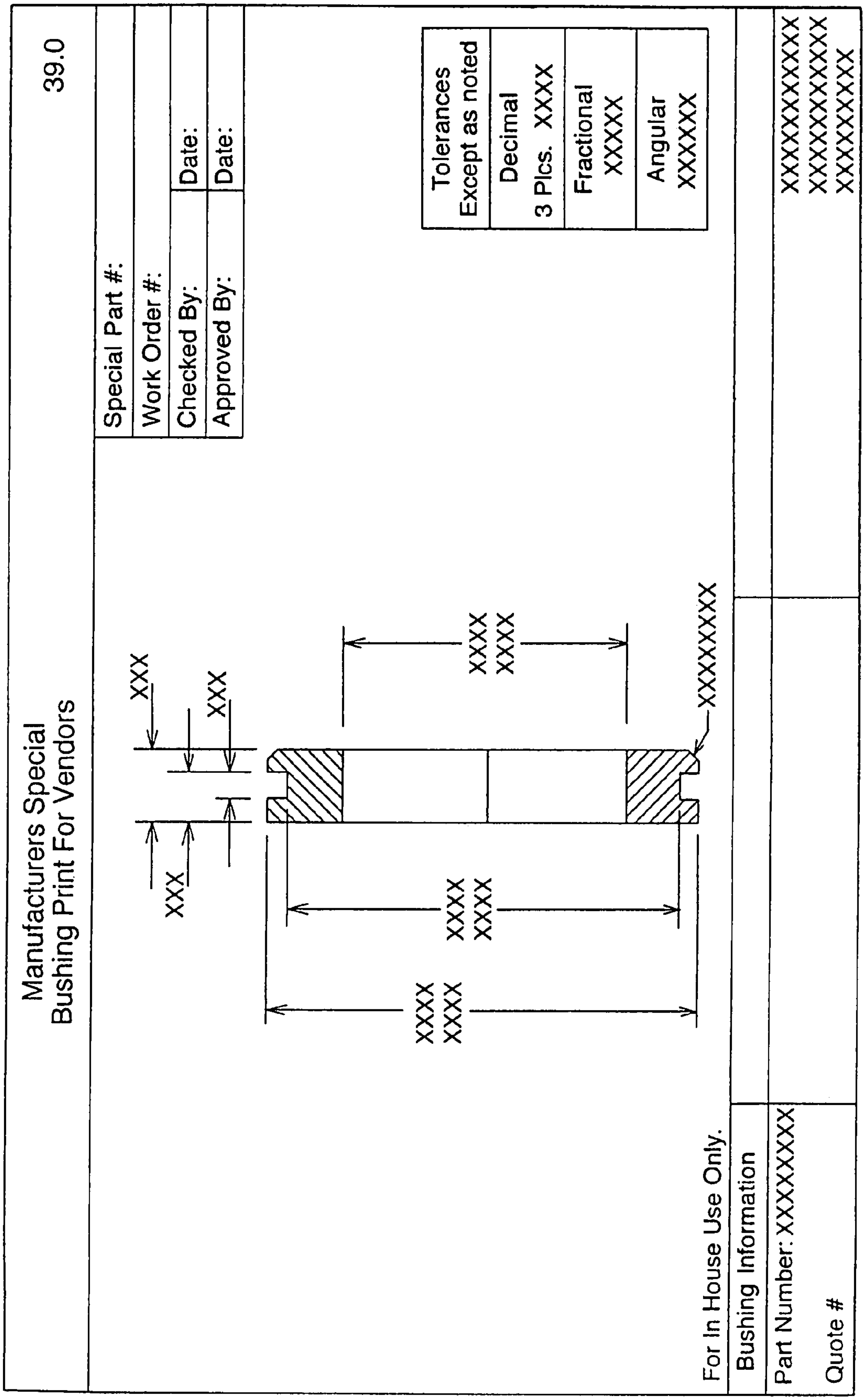
FIG. 32 is a representation of an example Manufacturers Special Bushing Print designed by the design center used when components are purchased from an outside source.

If in step 549 it is determined that an auxiliary product is to be designed, processing continues with step 563. In step 563, the system calculates dimensions for the auxiliary product, and in step 564 the system selects an appropriate graphic. In step 565 two design prints are created: one for internal use, showing customer information, pump and seal information, and the other for external use, for sending to an outside vendor for manufacture if the auxiliary product is not manufactured internally. This print may have only the graphic with dimensions, removing information a manufacturer would not want to provide to a third party. An example of each print is shown found in FIGS. 31 and 32. FIG. 31 represents the internal design print. FIG. 32 represents the external design print.

If a throat bushing (solid or split design) was recommended or selected by the user, the design center automatically calculates the dimensions, and draws the bushing manufacturing print so that this custom piece can be manufactured without the aid of an engineering/design department. Bushing types (with different shaft clearances) may be provided to accommodate operating conditions and flow requirements. The following is one example of a throat bushing that can be designed in the design center. The bushing length, o-ring groove, OD clearance and ID clearance are predetermined based on the seal size of the seal. Dimensional information stored in the pump data file also may be retrieved to provide engineered designs on an application by application basis. For example, a seal with a size of less than 2.125 has a length of 0.427, an o-ring groove of 0.156, OD clearance of 0.010, and an ID clearance of 0.012. The actual manufacturing dimensions may be calculated as follows:

Dimension A=(Length−O-ring groove)/2+o-ring groove

Dimension B=Seal size+ID clearance

Dimension C=Bore of Pump−OD clearance

Dimension D=Bore−0.226.

Steps 569 and 570 are performed in the same manner as discussed above.

A special part number may be created for each of the modified/custom (non-standard) component and auxiliary product. The part number is created to refer back to the pump it fits. An example of a part number follows. The first three digits reflect the component or auxiliary type. For example, 100=glands, 400=sleeves, and 160=throat bushings. The next four digits are the seal model number. For example, 3000, 3001, 3200, 3220. The next four digits select the pump record number. The last digit is a letter code reflecting the material needed. For example, a gland created to fit pump #1594 in alloy 20 for a seal model 3220 would have as its part number: 10032201594A. The part numbering system of the design center accommodates all items (standard, specials, etc.) and is fully integrated into the system to provide seamless computerized interface between the seal specifier, compatibility analyzer, design center, manufacturing center, proposal generator, purchasing, and order entry/processing.

The design center outputs a quote proposal, as indicated in step 80 of FIG. 3B, in response to the seal selection process defined above. The quote proposal may be generated in several different forms, depending upon the use. In general, the quote proposal includes information for the user and the customer providing a complete sealing solution. Each of FIGS. 30A and 30B is a view of a portion of an example standard proposal automatically generated by the system. Each of the blocks shown is discussed in detail below.

The quote identification number is a unique number assigned automatically for each quote generated. This quote number acts as an electronic retrieval reference number for all quotes, creating a historical file. The customer's contact information, such as the name, address, phone number and fax number, may be displayed using the information stored in the customer information file. The distributor or manufacturer's logo stored in the customer information file may be displayed providing customized output forms for the manufacturer/resaler. The distributor or manufacturer's contact information, such as the name, address, phone and fax numbers, also may be displayed.

The equipment specification section displays pump information based on the pump model selected by the user. The operating specifications section displays the primary process fluid, and any secondary or other process fluid, selected by the user along with the operating conditions provided by the user. The seal information section provides the part number of the seal selected or recommended along with a description and gland features of the seal. The seal construction section provides the materials of construction for the mechanical seal recommended or selected.

The seal dimensional information section includes dimensional information for a seal in a template graphic system. Depending upon the modification strategy selected by the user, the system may display the seal graphics with dimensions. If a standard seal was recommended, or the user selected to modify the equipment, the standard drawings with dimensions supplied by the design center may be displayed. If a modified seal was recommended, the system may display modified or custom seal drawings including detail drawings with dimensions.

The engineering specifications section includes notes generated by the compatibility analysis, such as shown in FIG. 11, areas 214 and 215, depending upon the modification strategy and seal type selected/recommended for the pump selected, such as modifications to equipment and verification notes.

The environmental controls section shows the graphic of the API plans and Heating and Cooling plan stored in the process fluid file as selected by the user or recommended by the system as shown in FIG. 18, areas 480-486.

The process fluid section displays notes associated with the process fluid selected, stored in the process fluid file (FIG. 18, area 495) which provide the user with valuable process fluid information.

The additional information section provides the user with warnings, such as when temperature, concentration, viscosity, shaft speed, box pressure, etc., are not entered by the user or if the system determines the value entered has exceeded the established limits for the seal or the materials of construction selected or recommended by the system. Such limitations are stored in the seal styles file for each seal model. The system also may analyze the pressure/velocity by comparing box pressure, seal size and shaft speed to determine if the pressure/velocity is acceptable for the application. If the user did not provide a box pressure, the system automatically calculates it based upon the suction and discharge pressure provided.

This system also may provide the customer with an alternate seal when the limitations of the seal or materials originally selected or recommended have been exceeded. The user also may be instructed by the system to consult the factory for more information before ordering the seal that was recommended, when an application cannot be handled by the seal styles offered by a given manufacturer.

The order information section provides pricing information for mechanical seals, optional features included in the seal and additional products with part numbers, description and list pricing including any applicable discounts obtained from the customer database. The user also may change the quantity of each item. The reference number also provides a link to the pump data file for identification of the pump/equipment being used. A database version number and seal version number also may be placed on the quote form for tracking.

The user now has information for quotation, enabling the factory to use electronic order processing. Another output form may be used to enable the user to obtain a quote proposal with the information listed above with the exception of pricing information. The proposal may be useful, for example, for maintenance and engineering files to supply the user with valuable information without providing pricing information which may become outdated.

Figure 33B:
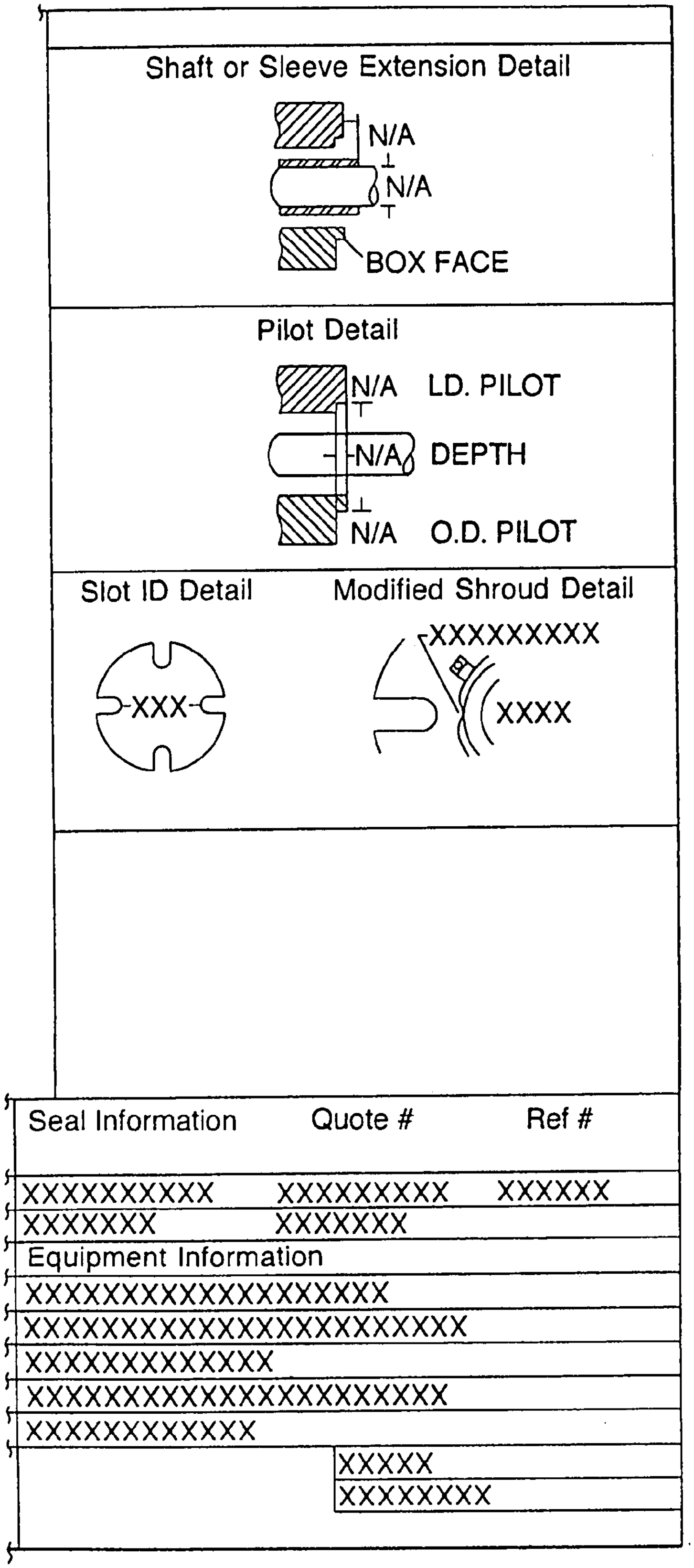
FIG. 33 is an example bill of materials including a definition of materials of the selected seal and a drawing of the seal.
Figure 33:
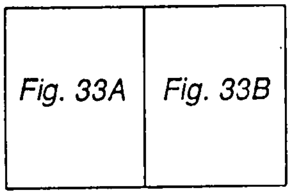

A bill of materials and engineering drawings may be printed out or displayed, as shown in FIG. 33. The bill of materials is a definition of details for the application. This sheet includes information on the pump, process fluid, operating conditions, the seal selected, its materials of constructions, and detailed drawings, etc. There are two versions of the bill of materials. The first version may be, for example, for resalers and end users. This version provides information regarding the seal, the pump, and the operating conditions, but does not contain pump dimensions. The second version contains information from the first version and the pump dimensions. This version may be used for internal purposes, for example.

The bill of materials sheet is divided into areas, each of which details one aspect of the application. The upper left hand corner of the page includes a listing of the materials of construction for the seal. This listing provides any customer with the identification of each component part by description, material and part numbers, for verification of the materials of the seal as ordered to prevent misapplication of the seal and for future reordering.

A front view of the gland and a bolting information chart is included to provide a customer with dimensions for fitting the seal gland to the pump bolting. This view assists the user to prevent misinstallation of the seal and to show features, such as flush ports, quench and drain, etc., for proper piping and installation.

A side view of the seal provides an actual representation of the seal construction with the dimensions which verify the seal fits the equipment and clearly identifies each part by a number which is shown in the materials of construction chart to verify proper materials of construction. Special details shown in the right hand column, such as shaft/sleeve extensions, pilot details, slot ID details, modified shroud detail, etc., provide a clear illustration of each detail with dimensions to verify the seal fits the equipment. Equipment modifications, notes and equipment verifications advise the customer about the equipment to ensure proper adaptability of the seal.

Additional notes may be provided to advise the customer of any application related factors that were not considered in the seal selection, recommendation and quotation construction process to ensure optimum seal performance life. The customer information section displays information such as the customer name, address, phone and fax numbers to verify correctness of the customer's identification.

The operating conditions section displays the process fluid and factors used in the selection/recommendation and quotation process for verification purposes to prevent misapplication of the seal. The chemical characteristic section provides the customer with information related to safety and to maintain system conditions which achieve maximum seal performance life. The environmental control section provides recommendations for piping plan systems which control the environment the seal is exposed to resulting in maximized seal performance life.

The seal information section provides the customer with a quotation number and complete seal part coding with special component part identification for future reordering or for verification of original data provided to construct the original quotation and for the customer's records. The equipment information section provides identification of the equipment by manufacturer, model, frame/group with bore type, equipment type and the customer's equipment tag, which verify the correctness of the equipment used to select the seal and for the customer's records. When double seals are used, the barrier fluid is identified for the customer to verify and ensure proper operation of the seal system.

A legend section may be used to display a manufacturer's logo, and contact information such as phone, fax and e-mail numbers.

As another option, an order form may be printed, as shown in FIG. 34. The order form of FIG. 34 is automatically generated by the seal selection system allowing a user to order the seal directly from the manufacturer. This form contains information used by a purchasing department to process an order. This form may be faxed, or electronically transmitted directly to the manufacturer or distributor for electronic ordering processing. Graphics, dimensions, notes or warnings may be eliminated from this form. The bill to information section of the quote form displays the specific customer location, address and quotation number for an invoice procedure and expediting the invoice payments. The ship to section displays the customer location/address to ensure proper delivery and receipt of the seal to prevent costly delays. The body of the quotation displays the purchase order number and shipping method to ensure proper order processing, invoicing and delivery of the seal. The items quoted are displayed with the quantities, part numbers and descriptions with pricing and delivery time frame. Other seal features and construction details provide description of special features and materials of major parts to clarify the seal part code. The distributor information may include address, other contact information and a logo.

A dimension verification form, as shown in FIG. 35, may be used to verify pump dimensions and to confirm that a pump has not been previously modified. The user also may use this form to confirm that a seal fits in the pump/equipment. For special seal designs, etc., the form acts as an approval form where the user may be asked to sign the form to confirm that the information on the form is correct, and that the user agrees the seal fits the equipment profiled and approves the seal design for order entry/processing. Another use of this form is that it allows the manufacturer to update new equipment profiles into the pump database as it contains equipment profile information.

This form may be used to educate field personnel enabling anyone to obtain and analyze dimensions from the pump/equipment and verify the seal fits the pump. The user then may visually check the pump dimensions to confirm the seal fits, for example, by using special help screens. If the user changes or adds a dimension, the compatibility analyzer may be re-executed and an updated accurate quote based on the new information may be generated. The dimension verification form may instruct the user to complete the verification and allows an electronic transmittal to a manufacturer along with the Order Form when an order is placed, ensuring that no errors result, and eliminating the need for dialogue. As with the bill of materials, there may be two versions of this form. One version may have equipment dimensions, for example for the OEM users and for internal purposes. The other version may be without equipment dimensions, for example, for use by resellers and end-users when the manufacturer does not wish to disclose proprietary dimensional information. On both versions, the user may be asked depending upon the equipment profile to confirm the equipment dimensions by measuring the equipment, inserting the dimensions on the worksheet and verifying that the seal fits the equipment. When dimensions are questionable or missing in the pump database, the system user may be asked to verify or obtain the dimensions, by inserting the word "verify" under each dimension which is not stored in the equipment profile. This information is activated by using the verification notes generated by the compatibility analyzer and stored in FIG. 11 area 214 and 215.

The user also may be asked to verify dimensions based on the dimension type selected in FIG. 11 area 230. If type A was selected by the system, no verification was needed. If type B was selected by the system, the one dimension may be verified for example by using help screens. If type C or D was selected, dimensions are verified and supplied to the manufacturer. This process enables the equipment information stored in the pump data file to be updated.

The dimensional verification form is divided into sections. Each section contains specific information relating to each area of the application.

The quote information section displays the quotation number and date constructed. The seal part code and selected/recommended features are shown with style numbers along with the gland and sleeve type selected/recommended. The customer information section displays customer name, location, address with contact numbers. The resaler information section displays the resaler name, location/address with contact numbers. The equipment details section displays the equipment identification by manufacturer, model, frame/group, bore type, sleeve type and pump sizes.

The operating conditions section provides process fluid identification and characteristics, such as temperature, specific gravity, viscosity, concentration, percentage of solids, etc., and other operating conditions related to the equipment design, such as shaft speed, box pressure, suction pressure, and discharge pressure.

The equipment information section provides clarification of possible equipment modification for the proper design of the seal and a method used to obtain the equipment dimensions.

The equipment drawing provides a cross-sectional view with dimensional lines for positive visual identification of dimensions for design engineering of any seal model and corresponds to the analysis section for equipment dimensions. The seal drawing section provides a cross sectional view with dimensional lines and dimension designations, which corresponds to each dimension in the seal dimension section. The special details section displays special design details with dimensions, which corresponds to the equipment dimensions provided on the dimensional verification form.

The second set of seal drawings displays the front view of the gland design and any features with dimensions to verify that the seal fits the equipment per the dimensions shown in the equipment dimension section. The second equipment drawing section provides a front view of the equipment with an orientation to the equipment bolting pattern. The bolting section displays the minimum bolt circle by stud/bolt size and slot width which allows the user to analyze the adaptability to the existing bolting dimensions provided below.

The seal dimensions section displays the seal dimensions for the seal model selected and allows the user to make a visual/engineering analysis to the actual equipment dimensions. A series of help buttons/screens are accessible enabling any user to identify, obtain and analyze the data using scientific methodologies. The equipment dimensions section displays dimensions stored in the pump data file or input by the user in the "Add a Pump" path for the equipment and indicates dimensions to be verified.

The graphics displayed on this form correspond directly to the seal model, gland type, sleeve type and equipment type based on the equipment profile and the results of the compatibility analyzer stored in the pump database file.

Figure 36:
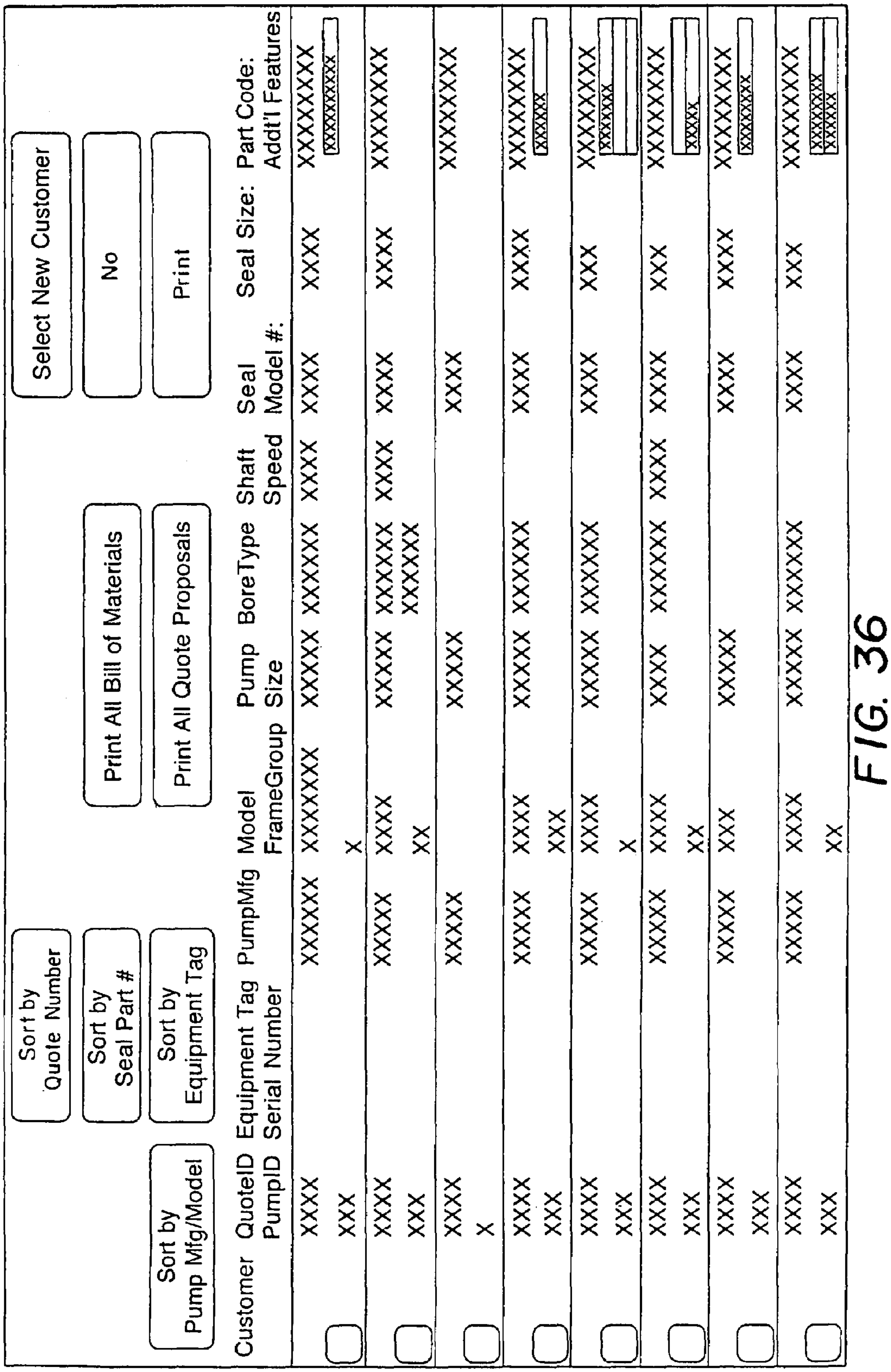
FIG. 36 is an example plant standardization survey which compiles quote information for a specific customer.

The Plant Standardization Survey, shown in FIG. 36, stores quote information for a particular customer. This survey is compiled from quotes generated for a specific customer. This information be sorted in many ways, such as by quote number, seal part number, pump manufacturer or equipment tag. This form tracks how many of what style seal are in use at the customer's plant. It also allows the user to standardize the materials of construction while allowing the consolidation of seal designs to be purchased. This form also may be used as a search engine by the user and the customer to retrieve any quote or output forms for a plant application.

The plant standardization survey displays columns of pertinent data such as the customer name, quote identification number and pump system identification number, equipment tag or serial number, pump manufacturer name, model and frame/group, pump size, bore type, shaft speed, seal model number, seal size, seal part code with special features, etc. This data allows the user to verify the data involved with duplication of the existing seal and equipment, which consolidates the number of seal models used in the plant. The user may sort this information by, for example, pump manufacturer, quote number, seal part number, or equipment tag number. This sorting capability provides for display for groupings of the same pumps/equipment, or seals by part number providing the system user with the ability to optimize the use of standardized seal designs for identical pieces of equipment.

The user may print bills of materials, quotations and the survey form currently displayed. This capability provides output forms for physical file records or use by plant maintenance or engineering personnel for verification or new purchase order placement or when computer systems are not available in that location. The system also allows the user to select a new customer by selecting the "Select New Customer" icon. This capability provides the manufacturer or resaler with the ability to display a new plant standardization form for any other customer in the system. A seal maintenance history survey also may be provided to analyze seal life for a given application.

Having now described the various outputs of the design center, referring again to FIG. 3B, in step 81, the order entry department exports the quote to an accounting package for processing. The quote details also may be sent to the manufacturing center (step 82) for production. In step 82 of FIG. 3B the manufacturing center uses the graphics and dimensions created by the design center to manufacture the item.

Figure 37A:
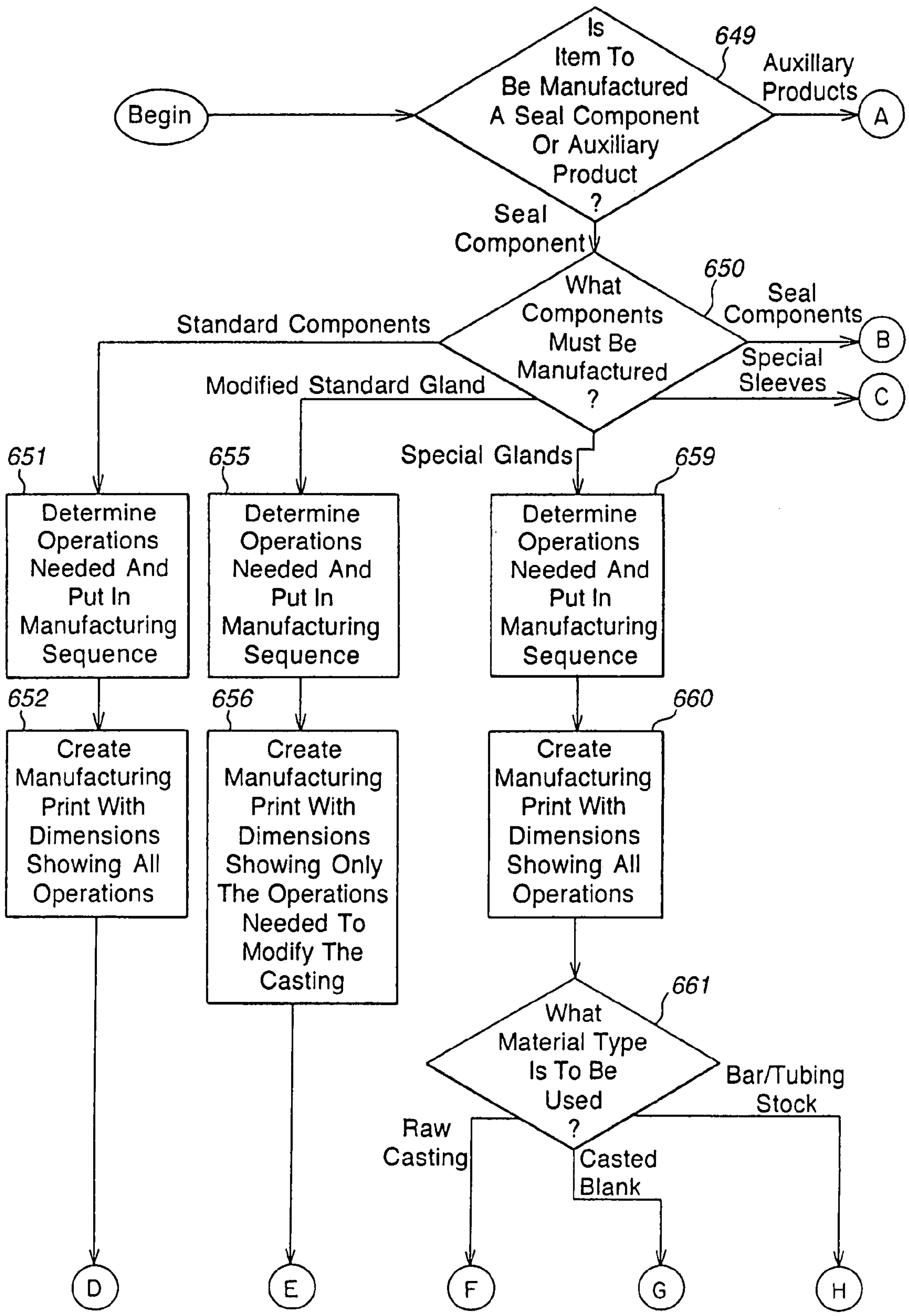
FIG. 37 is a flowchart describing operation of a manufacturing center.
Figure 37B:
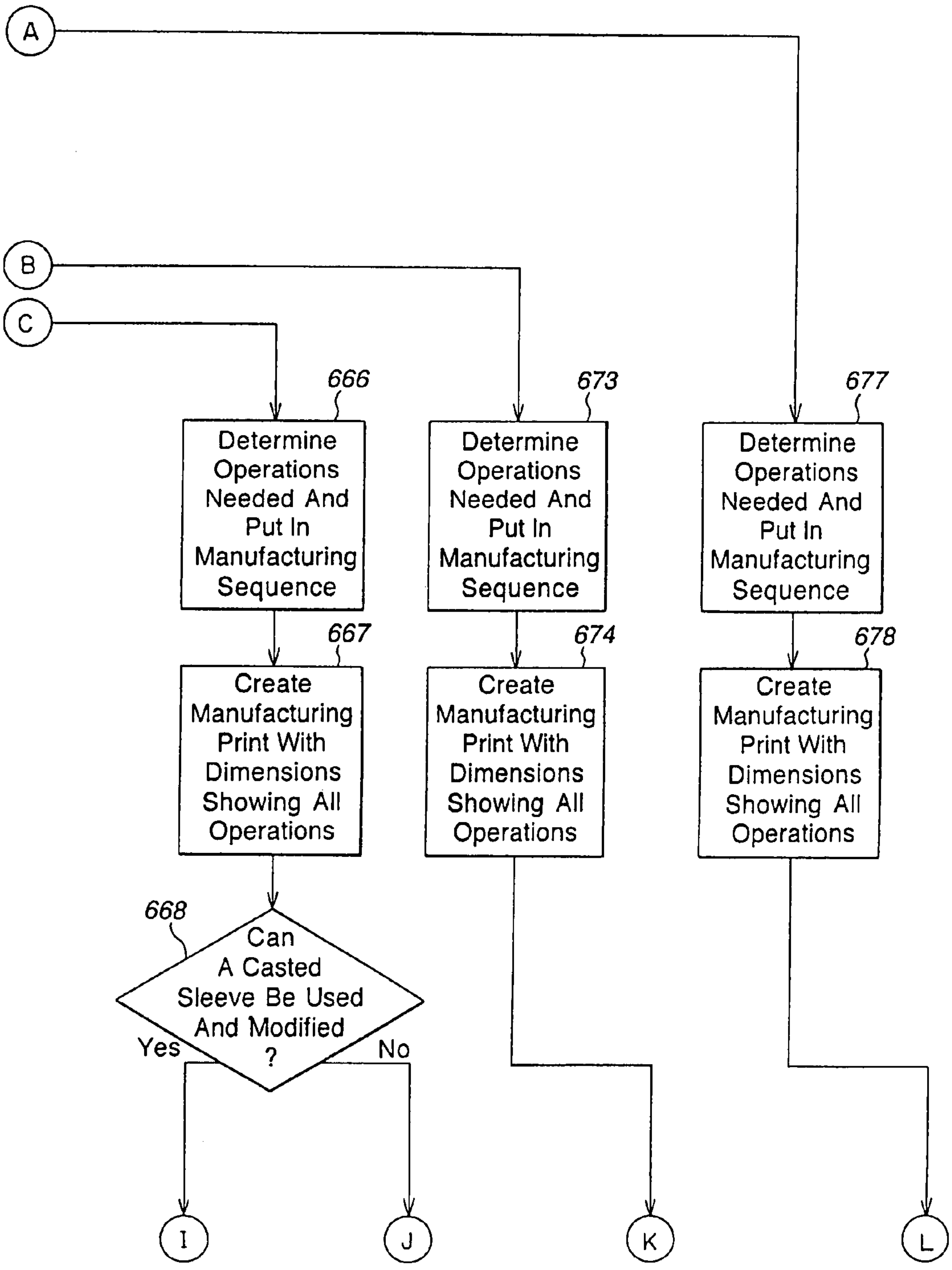
Figure 37C:
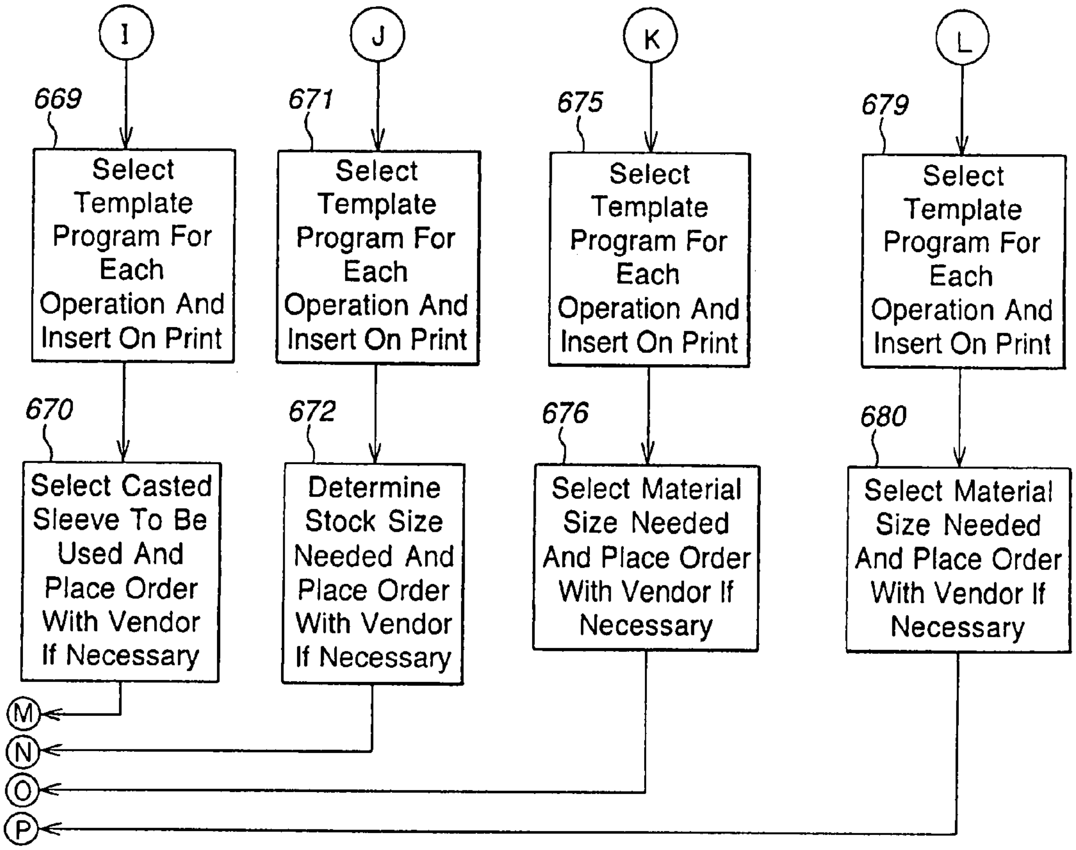
Figure 37:
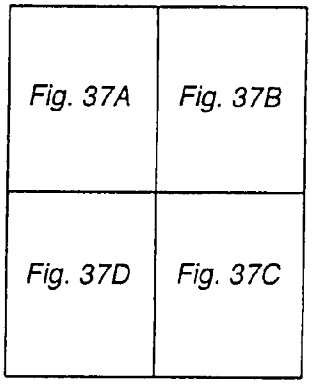
Figure 37D:
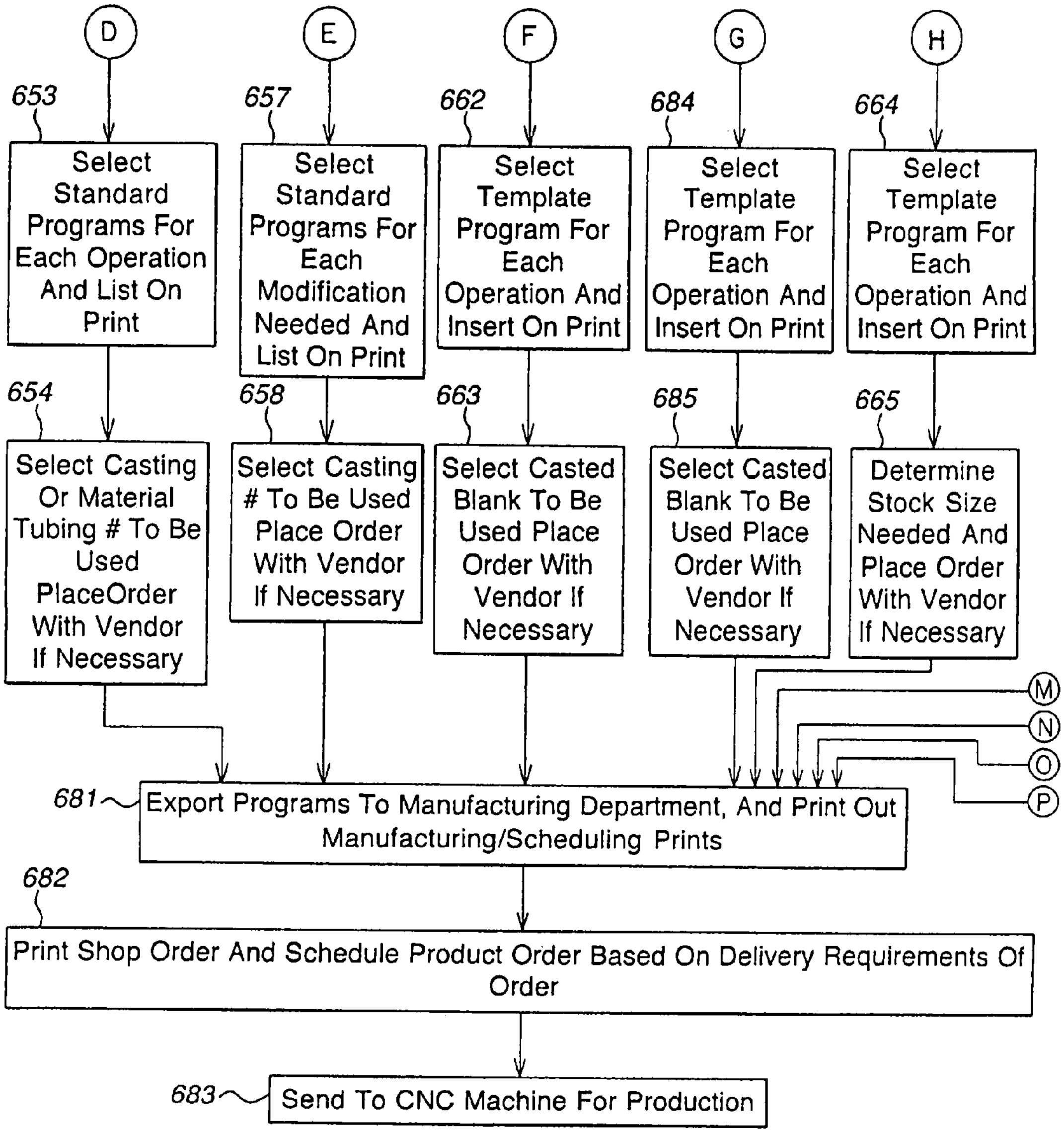

FIG. 37 is a flowchart describing the process performed by the manufacturing center part of the system. In step 649, it is determined whether the components to be manufactured are part of the seal or if they are auxiliary products. If it is determined that seal components are to be manufactured, processing continues with step 650. In step 650, it is determined what type of seal component is to be manufactured. If it is determined that standard components are to manufactured, processing continues with step 651.

In step 651, manufacturing operations are retrieved from the seal styles file and are set in a sequential order in which the manufacturing department schedules the work. For example, to produce a gland type 1 for a given seal model, there are four "CNC" operations (referred to as OP's).

1st OP: First operation: Turning (on a CNC turning center/lathe)

2nd OP: Second operation: Turning (on a CNC turning center/lathe)

3rd OP: Third operation: Milling (on a CNC milling center)

4th OP: Fourth operation: Milling (on a CNC milling center)

The sequence of the manufacturing steps is predetermined for each model/component and is stored in the system.

In step 652, manufacturing prints are created with dimensions retrieved from the design center. Each step is placed in sequential order on the manufacturing print to assist the machinist in producing the piece.

The prints may be segments or duplicates of the prints produced in the design center. For example, a drawing for a standard gland in the design center displays the gland in two distinct views, whereas in the manufacturing center shows six views tied to the manufacturing operations performed at each step. If a sleeve is being made the same view from the design center is displayed in the manufacturing center. Because of the simplicity of the drawing used in manufacturing a sleeve, there are only two turning operations and no CNC milling operations.

After the manufacturing prints have been created, in step 653 the manufacturing program numbers stored in the seal styles file are selected and listed on the prints adjacent each manufacturing operation.

Standard template CNC programs are stored in the seal styles file for each step of the manufacturing process. The standard component dimensions either are generated from the design center or are retrieved from the seal styles file and are inserted into the template CNC program with program number assigned at each step of the manufacturing process. After the manufacturing programs have been selected and listed, in step 654 the materials to be used are selected. If standard components are being made either casting, "tubing" or "bar stock," are used.

If a standard gland or sleeve is being made the casting part number is stored in the seal styles file and is listed on the manufacturing print. If a standard component is to be manufactured from tubing, the ID, OD, and length of the tubing is listed in a file along with a part number guiding the machinist to the material to be cut and sawed from a standard length. This information is also listed on the manufacturing print.

Tool numbers, fixture numbers, setup information, and cycle times for each program also are listed on the manufacturing prints. This information is stored in the seal styles files along with the programs. Digital photos of the machine tool pockets and fixture setups for the CNC machinery also are stored in this file. The machinist may use these photos as a visual reference to confirm tools and fixtures have been setup properly.

All standard components may be made from either castings, raw bar, tubing stock or other materials. Information about these materials may be stored in the seal styles database or in an inventory or other database. The system compares ID, OD and length of the part to be manufactured to the castings first and to the then bar and tubing materials to determine if the material is in stock. If a match is not found, a comparison between the part dimensions to be manufactured and information stored in a database about the various suppliers of standard raw materials tubing and bar stock dimensions may be performed to select the correct material and to generate a purchase order for the material, possibly without human intervention.

The manufacturing prints, complete with manufacturing program numbers, scheduling information, set up information and cycle times, may now exported to the main computer (step 681), for retrieval by an automated scheduling department.

In step 682, depending on the scheduling department priorities, the computer decides manufacturing priorities based on shipment dates, and order dates, etc. Depending on the priority, the manufacturing prints are created and manufacturing programs are downloaded directly and automatically to the CNC machinery for manufacturing (step 683).

If the result of step 650 was a modified standard gland, processing continues with step 655. In step 655, the information about the modification is taken from the design center and the manufacturing steps are sequenced. In step 656, the manufacturing print showing only the details of the modifications is created. The CNC programs for each modification are selected in step 657 and the program number are listed on the print. In step 658, the finished casting is selected out of inventory to be modified, stock is checked and a purchase order is created if necessary. In step 681, the CNC programs are exported to the main computer to be used in production. In step 682, the production is scheduled and in step 683 the program is downloaded to the CNC machinery for production.

If in step 650, it is determined that a special gland is to be manufactured, processing continues with step 659. In step 659, the operations are determined and production steps are sequenced. In step 660, the manufacturing prints are created using the graphics and dimensions created by the design center. In step 661, the material for manufacturing the gland is determined. If it is determined that a raw casting may be used, processing continues with step 662. In step 662, the special gland CNC template program is selected. Each seal model has a different template program stored in the seal styles file. The dimensions calculated by the design center are inserted into the program. In step 663, the raw casting is selected, or if the raw casting is not in stock, the purchase order is placed. In step 681, the CNC program is exported to the main computer. In step 682, the piece is scheduled into production schedule, and in step 683 the program is downloaded to the CNC machine for production.

If in step 661, it is determined that a casted blank is to be used, processing continues with step 684. In step 684, the template programs for manufacturing process are selected and the dimensions from the design center are inserted into the templates. In step 685, the casted blank number to be used is selected, stock level is checked, and the purchase order is created if necessary. Steps 681, 682 and 683 occur as discussed in the earlier path.

If in step 661, it is determined that bar stock or tubing is to be used, processing continues with step 664. In step 664, the template programs for manufacturing are selected and the dimensions from the design center are inserted into the templates.

In step 665, material to be used is selected, stock level is checked, and a purchase order may be created. Steps 681, 682 and 683 occur as discussed above.

If, in step 650, it is determined that a special sleeve is to be manufactured, processing continues with step 666. In step 666, the operations for manufacturing are determined and sequenced. In step 667, a manufacturing print is created using the graphics from the design center showing the steps of the manufacturing process. In step 668, it is determined if a casted sleeve may be used. If it is determined in step 668 that a casted sleeve may be used, processing continues with step 669. In step 669, the template programs for manufacturing are selected and the dimensions from the design center are inserted into the templates. In step 670, the sleeve casting number is selected and a purchase order is created if stock levels are low. Processing continues with steps 681, 682 and 683 in the same manner as discussed above for glands.

If, in step 668, it is determined that the sleeve is to be manufactured from raw stock, processing continues with step 671. In step 671, the template programs for manufacturing are selected and the dimensions from the design center are inserted into the templates. In step 672, the stock size is determined, inventory is checked and the materials may be purchased. Steps 681-638 are performed as discussed above.

If, in step 650, it is determined that a special seal component or component type seal part is to be manufactured, processing continues with step 673. In step 673 the manufacturing operations are determined and sequenced. In step 674, a manufacturing print is created using the graphics created in the design center. In step 675, the template programs for manufacturing are selected and the dimensions calculated by the design center are inserted into the templates. In step 676, the material is selected, stock is checked and purchase orders may be created. Steps 681, 682, and 683 are performed as discussed above.

If, in step 649, it is determined that an auxiliary product is to be manufactured, processing continues with step 677. In step 677, the operations are determined and sequenced. In step 678, the manufacturing prints are created using the graphics from the design center. In step 679, the template programs for each operation are selected and these program numbers are inserted on the manufacturing prints. In step 680, the materials are selected, stock is checked and the purchase order is created if necessary. In steps 681-683 are performed in the same manner as in the other paths.

This system also may be provided with promotion/advertising and post sales and service features. For example, the system user may be presented with the features of cartridge design seals and component seals and comparisons of the two types of seals. The system may present features of spring loaded stationary cartridge seals with comparative information about rotary and stationary metal bellows designs.

The system may present graphic presentations of single and double spring loaded stationary cartridge seals with features, benefits and design principles graphically explained. The system may present graphics of single and double cartridge seals with visible leakage points, conditions, causes and corrective actions for trouble shooting seals while installed on the equipment. Also, graphics of seal parts may be displayed with part conditions identified and failure analysis provided with causes of failure and corrective actions given for parts upon disassembly of the seal. The system may present policies and procedures for returning seals to a factory for exchange for other seals or repair at the factory. Forms include information about returning seals for repair and failure analysis that complied with regulatory agency requirements. The system user may present installation instructions for any seal model complete with piping diagrams for the seal features. The system may present application data forms to be sent to the factory when the process fluid is not found in the database. Such a form allows a user to collect data to select, quote and design a mechanical seal. The system may present a glossary of terms used in the system for various technical terms used in the sealing industry and by technical associations involved in the mechanical seal industry.

Such a system may be implemented as a computer apparatus, in hardware, software, or a combination thereof, to perform the functions of any of the previous embodiments. For example, the computer system may comprise a memory (such as a floppy disk, compact disk, or hard drive) which contains a computer program or data structure, for providing to a general purpose computer, instructions and data for carrying out the functions of the various aspects of the system.

An example, computer system with which the present invention can be used, may include a pointing device, an alphanumeric entry device, a display, a processor, a memory, and a removable storage device, all coupled together via a communications bus. It should be understood that this system is merely illustrative, and that the present invention is not limited to use with a system having this specific configuration, as other configurations are possible.

The pointing device may, for example, be a joystick, trackball or mouse. The alphanumeric entry device may include a keyboard which allows a user to provide textual numeric, or other keyed inputs into the system. The pointing device together with the alphanumeric entry device may be referred to as an input device, which may also include other provisions by which a user may enter data, such as a voice command input device. The display may be a CRT screen or similar device which allows the user to visualize interactions with the computer system, and includes a display controller to translate information from the communications bus into control information to control the display. The processor may be a general purpose computer. The memory may consist of memory devices such as hard disk drives or optical disk drives, RAM, ROM, or other memory devices and combinations thereof. The removable storage device may be a zip disk drive, a CD-ROM drive, a tape drive, or a diskette drive. The removable storage device is typically used to load, backup, or update the operating system of the computer system, and to load application software and data including the seal selection software and data.

This system may be developed using a number of computer programming tools, including general purpose programming languages and database programs. In one embodiment, the system of FIG. 2 is implemented using script files developed using a File Maker Pro software application running on a Windows95 operating system. The databases are implemented using database script files and the operations of the various modules also are implemented as scripts for accessing those data files. It should be understood that the present invention is not limited to a particular computer programming language or database programming system, or operating system. It also should be understood that the databases may be defined as a single data file, as a spreadsheet file, as a database script, or may be generated by more than one computer file.

Seal selection software, including computer programs which implement aspects of the system, may be stored on some type of removable computer-readable storage media such as a CD-ROM, tape, or diskette. The software may be copied to a permanent form of storage media on the computer system (e.g., a hard disk) to preserve the removable storage media for back-up purposes. When the seal selection software is in use, the software is generally at least in part stored in RAM within memory, and is executed on the processor. When running the modeling software on the computer system, a user typically gives commands and enters data via the input device.

Having now described an embodiment of the invention, it should be apparent to those skilled in the art that the foregoing is merely illustrative and not limiting, having been presented by way of example only. Numerous modifications and other embodiments are within the scope of one of ordinary skill in the art. It should be understood that the foregoing is merely an example of a system for selecting mechanical seals. The present invention also may be used to provide for a selection of bearings, o-rings, couplings, pump parts, labyrinth seals and lip seals. It also should be understood that, although the invention has been described in the context of a predetermined set of possible seals, that the system may be expanded to include seal designs, gland and sleeve designs, and designs for auxiliary products that may be developed. Accordingly, the present invention is not limited to any particular set of seals, pumps, equipment, or other parts related to such systems. These and other modifications are contemplated as falling within the scope of the invention as defined by the appended claims and equivalents thereto.

What is claimed is:

1. Apparatus for facilitating entry of data descriptive of a piece of equipment requiring a seal replacement for matching with a replacement mechanical seal, comprising:

a graphical user interface for displaying a template having fields and for receiving in said fields input data descriptive of dimensions of said piece of equipment requiring a seal replacement, said graphical user interface arranged to associate graphical information with fields of said template to guide the obtaining of said input data; and a first database comprising data representative of predetermined criteria for input data appropriate to be received in specific fields of said template, said criteria pertinent to identifying erroneous inputs of data for dimensional matching of said piece of equipment with said replacement mechanical seal;

said graphical user interface further arranged to utilize data from said first database to verify, that input data received in specific fields of said template regarding said piece of equipment requiring a seal replacement does not include erroneous inputs of data inconsistent with said predetermined criteria.

2. Apparatus as in claim 1, wherein said graphical user interface is arranged to associate graphical information with fields of said template, said graphical information comprising image data for providing an image viewable by a user to guide the obtaining of said input data.

3. Apparatus as in claim 1, additionally comprising:

a second database comprising profiles of mechanical seals suitable for use as replacements; and a selection module coupled to said second database and responsive to input data received in fields of said template and to data accessed from said second database to match a mechanical seal with said piece of equipment requiring a seal replacement.

4. Apparatus as in claim 1, additionally comprising:

a second database comprising profiles of mechanical seals suitable for use as replacements; and a selection module coupled to said second database and responsive to input data received in fields of said template and to data accessed from said second database to provide a profile of a compatible mechanical seal that is compatible for use with said piece of equipment requiring a seal replacement, when no profile of a compatible mechanical seal is available from said second database.

5. Apparatus, for facilitating description of a piece of equipment requiring replacement of an auxiliary product for matching with a replacement auxiliary product, comprising:

a graphical user interface for displaying a template having fields and for receiving in said fields input data descriptive of dimensions of said piece of equipment requiring replacement of an auxiliary product, said graphical user interface arranged to associate graphical information with fields of said template to guide the obtaining of said input data; and a first database comprising data representative of predetermined criteria for input data appropriate to be received in specific fields of said template, said criteria pertinent to identifying erroneous inputs of data for dimensional matching of said piece of equipment with said replacement auxiliary product;

said graphical user interface further arranged to utilize data from said first database to verify that said input data received in specific fields of said template regarding said piece of equipment requiring replacement of an auxiliary product does not include erroneous inputs of data inconsistent with said predetermined criteria.

6. Apparatus as in claim 5, wherein said graphical user interface is arranged to associate graphical information with fields of said template, said graphical information comprising image data for providing an image viewable by a user to guide the obtaining of said input data.

7. Apparatus as in claim 5, wherein said first database additionally comprises data representative of predetermined criteria pertinent to identifying errors regarding completeness and type of input data appropriate to be received in specific fields of said template for use in implementing said matching.

8. Apparatus as in claim 5, wherein said graphical user interface is arranged to receive in said fields input data descriptive of dimensions and other characteristics of said piece of equipment which are pertinent to said matching thereof with said replacement auxiliary product.

9. Apparatus as in claim 5, additionally comprising:

a second database comprising profiles of auxiliary products suitable for use as replacements, which products may be components; and a selection module coupled to said second database and responsive to said input data received fields of said template and to data accessed from said second database to match an auxiliary product with said piece of equipment requiring replacement of an auxiliary product.

10. Apparatus as in claim 5, additionally comprising:

a second database comprising profiles of auxiliary products suitable for use as replacements, which products may be components; and a selection module coupled to said second database and responsive to said input data received in fields of said template and to data accessed from said second database to provide a profile of a compatible auxiliary product that is compatible for use with said piece of equipment requiring replacement of an auxiliary product, when no profile of a compatible auxiliary product is available from said second database.

11. Apparatus as in claim 10, further comprising:

a design module responsive to said profile of a compatible auxiliary product to provide dimensions defining said compatible auxiliary product.

12. Apparatus as in claim 5, further comprising:

an equipment database comprising at least one equipment profile provided in response to said input data received in fields of said template for said piece of equipment, said equipment profile descriptive of said piece of equipment requiring replacement of an auxiliary product.

13. Apparatus as in claim 5, wherein the auxiliary product is one of a mechanical seal, a component of a mechanical seal and another auxiliary device usable with the piece of equipment.

14. A method, for facilitating description of a piece of equipment requiring replacement of an auxiliary product for matching with a replacement auxiliary product, comprising the steps of:

(a) providing a graphical user interface for displaying a template having fields;

(b) providing graphical information associated with fields of said template to guide the obtaining of input data;

(c) receiving in fields of said template input data descriptive of dimensions of said piece of equipment requiring replacement of an auxiliary product;

(d) providing a first database comprising data representative of predetermined criteria for input data appropriate to be received in specific fields of said template regarding description of said piece of equipment requiring replacement of an auxiliary product, said criteria pertinent to identifying erroneous inputs of data for said matching; and (e) utilizing data from said first database to verify that said input data received in specific fields of said template does not include erroneous inputs of data inconsistent with said predetermined criteria.

15. A method as in claim 14, wherein step (b) comprises providing graphical information comprising image data for providing an image viewable by a user to guide the obtaining of said input data.

16. A method as in claim 14, wherein step (c) comprises receiving input data descriptive of dimensions of said piece of equipment requiring replacement of an auxiliary product which are pertinent to said matching.

17. A method as in claim 14, further comprising the steps of:

(f) providing a second database comprising profiles of auxiliary products suitable for use as replacements , which products may be components; and (g) matching, responsive to said input data received in fields of said template and to data accessed from said second database, a replacement auxiliary product with said piece of equipment requiring replacement of an auxiliary product.

18. A method as in claim 14, further comprising the steps of:

(f) providing a second database comprising profiles of auxiliary products suitable for use as replacements, which products may be components; and (g) providing, responsive to said input data received in fields of said template and to data accessed from said second database, a profile of a compatible auxiliary product that is compatible for use with said piece of equipment requiring replacement of an auxiliary product, when no profile of a compatible auxiliary product is available from said second database.

19. A method as in claim 18, further comprising the step of:

(h) providing, in response to said profile of a compatible product provided in step (g), dimensions defining said compatible auxiliary product, said compatible auxiliary product being one of a mechanical seal, a component of a mechanical seal and another auxiliary device usable with the piece of equipment.

20. A method as in claim 14, further comprising the step of:

(f) providing, in response to said input data received in fields of said template, an equipment database comprising at least one equipment profile descriptive of said piece of equipment requiring replacement of an auxiliary product.

* * * * *